US008253529B2

(12) United States Patent  (10) Patent No.: US 8,253,529 B2
Gocho  (45) Date of Patent: Aug. 28, 2012

(54) IMAGE ACQUISITION SYSTEM AND METHOD OF AUTHENTICATING IMAGE ACQUISITION DEVICE IN THE IMAGE ACQUISITION SYSTEM

(75) Inventor: Nagahiro Gocho, Hachioji (JP)

(73) Assignee: Olympus Corporation, Tokyo (JP)

( * ) Notice: Subject to any disclaimer, the term of this patent is extended or adjusted under 35 U.S.C. 154(b) by 677 days.

(21) Appl. No.: 12/490,864

(22) Filed: Jun. 24, 2009

(65) Prior Publication Data

US 2009/0256673 A1   Oct. 15, 2009

Related U.S. Application Data

(63) Continuation of application No. PCT/JP2007/074718, filed on Dec. 21, 2007.

(30) Foreign Application Priority Data

Dec. 26, 2006  (JP) .................................. 2006-350212

(51) Int. Cl.
*G05B 19/00* (2006.01)

(52) U.S. Cl. .................. 340/5.22; 340/12.22; 340/13.24; 396/56; 396/59

(58) Field of Classification Search .................. 340/5.2, 340/5.22, 12.22, 12.23, 12.24, 13.24, 13.25, 340/13.26, 13.27, 13.28; 235/375; 348/211.1, 348/211.2, 211.5; 396/56, 57, 58, 59, 176, 396/177, 178

See application file for complete search history.

(56) References Cited

U.S. PATENT DOCUMENTS

| 7,570,283 B2 | 8/2009 | Sato et al. |
| 2005/0001024 A1 | 1/2005 | Kusaka et al. |

FOREIGN PATENT DOCUMENTS

| EP | 1 003 069 A2 | 5/2000 |
| JP | 2000-115624 A | 4/2000 |
| JP | 2005-42398 A | 2/2005 |
| JP | 3741713 B2 | 1/2006 |
| JP | 2006-157686 A | 6/2006 |
| JP | 2006-180140 A | 7/2006 |

OTHER PUBLICATIONS

Japanese Office Action dated Oct. 25, 2011 (and English translation thereof) in counterpart Japanese Application No. 2006-350212.
English Language International Search Report dated Feb. 26, 2008 issued in corresponding Appln. No. PCT/JP2007/074718.
International Preliminary Report on Patentability and Written Opinion of the International Searching Authority dated Jul. 9, 2009 (5 pages), issued in counterpart International application No. PCT/JP2007/074718.

*Primary Examiner* — Nabil Syed

(74) *Attorney, Agent, or Firm* — Holtz, Holtz, Goodman & Chick, PC

(57) ABSTRACT

An image acquisition system includes an image acquisition device and a commanding device configured as a member separate from an image acquisition device proper to transmit a command for controlling the image acquisition device to the image acquisition device proper. The image acquisition device includes an authentication command receiving unit which receives an authentication command transmitted from the commanding device and containing authentication information used by the image acquisition device to authenticate the commanding device, a general command receiving unit, arranged separately from the authentication command receiving unit, which receives a general command transmitted from the commanding device and not containing the authentication information, an authentication command recognition unit which recognizes the authentication command received by the authentication command receiving unit, and a function limiting unit which limits a function of the image acquisition device based on the authentication command recognized by the authentication command recognition unit.

28 Claims, 39 Drawing Sheets

| Authentication mode switching command | Corresponding operation |
|---|---|
| ZZAA | Switch to prohibit mode |
| ZZBB | Switch to limit mode |
| ZZCC | Switch to setting mode |
| ZZDD | Switch to permit mode |

F I G. 21

| Authentication mode | State of camera proper | Application |
|---|---|---|
| Prohibit mode | Unusable by other than remote controller | Safety assured when carried and not used, when stored (held separately from remote controller) or when out |
| Limit mode | Limit use of function | When lent |
| Setting mode | Set/change limit function | |
| Permit mode | Normally usable | When lent or used by owner in low-risk situation |

F I G. 22

| Power on | Setting |
|---|---|
| Prohibit mode | Forcibly set to prohibit mode regardless of mode memory |
| Mode memory storage mode | Set to mode stored in mode memory |

FIG. 23

| Function | | Limit flag | Purpose of limitation |
|---|---|---|---|
| Image acquisition | | 1: Possible, 0: Impossible | Image hiding, privacy protection |
| Play | | 1: Possible, 0: Impossible | In case of only image visible (album, etc.) |
| | Erase | 1: Possible, 0: Impossible | Image protection (willfully or negligently) |
| | Transfer | 1: Possible, 0: Impossible | Image distribution or theft prevention |
| | Print | 1: Possible, 0: Impossible | Image distribution or theft prevention |
| | Edit | 1: Possible, 0: Impossible | Image alteration prevention |
| Menu | | 1: Possible, 0: Impossible | Optimum condition change prevention |

FIG. 24

| Switch, button | Corresponding operation |
|---|---|
| Power switch | Initialize by turning on; end operation by turning off |
| Select switch | Change operation when switching |
| Shutter switch | Switch operation flag set |
| Menu button | Start, set, change and end menu |
| Zoom switch T, W | T, W switch operation flag set, operation command |
| Arrow switch/left, right, up, down | Each switch operation flag set |
| OK button | Switch operation flag set |
| Erase button | Display erase check menu, corresponding operation |
| Print button | Display print menu, corresponding operation |

F I G. 25

| Button | Corresponding operation |
|---|---|
| Remote controller image acquisition command button | Shutter operation, OK button function |
| Remote controller wide-angle button, telephoto button | Wide-angle button, telephoto button operation flag set, operation command |
| Remote controller (+) button, (−) button | Each switch operation flag set |
| Remote controller arrow switch/left, right, up, down | Each switch operation flag set |
| Remote controller OK button | Switch operation flag set |
| Remote controller information button | Information button operation flag set |
| Remote controller print button | Display print menu, corresponding operation |
| Remote controller menu button | Start, set, change and end menu |
| Remote controller erase button | Display erase check menu, corresponding operation |
| Remote controller protection button | Protection button operation flag set |
| Remote controller rotation button | Rotation button operation flag set |
| Remote controller limit button | Switch to limit mode |
| Remote controller prohibit button | Switch to prohibit mode |
| Remote controller setting button | Switch to setting mode |
| Remote controller permit button | Switch to permit mode |

F I G. 26

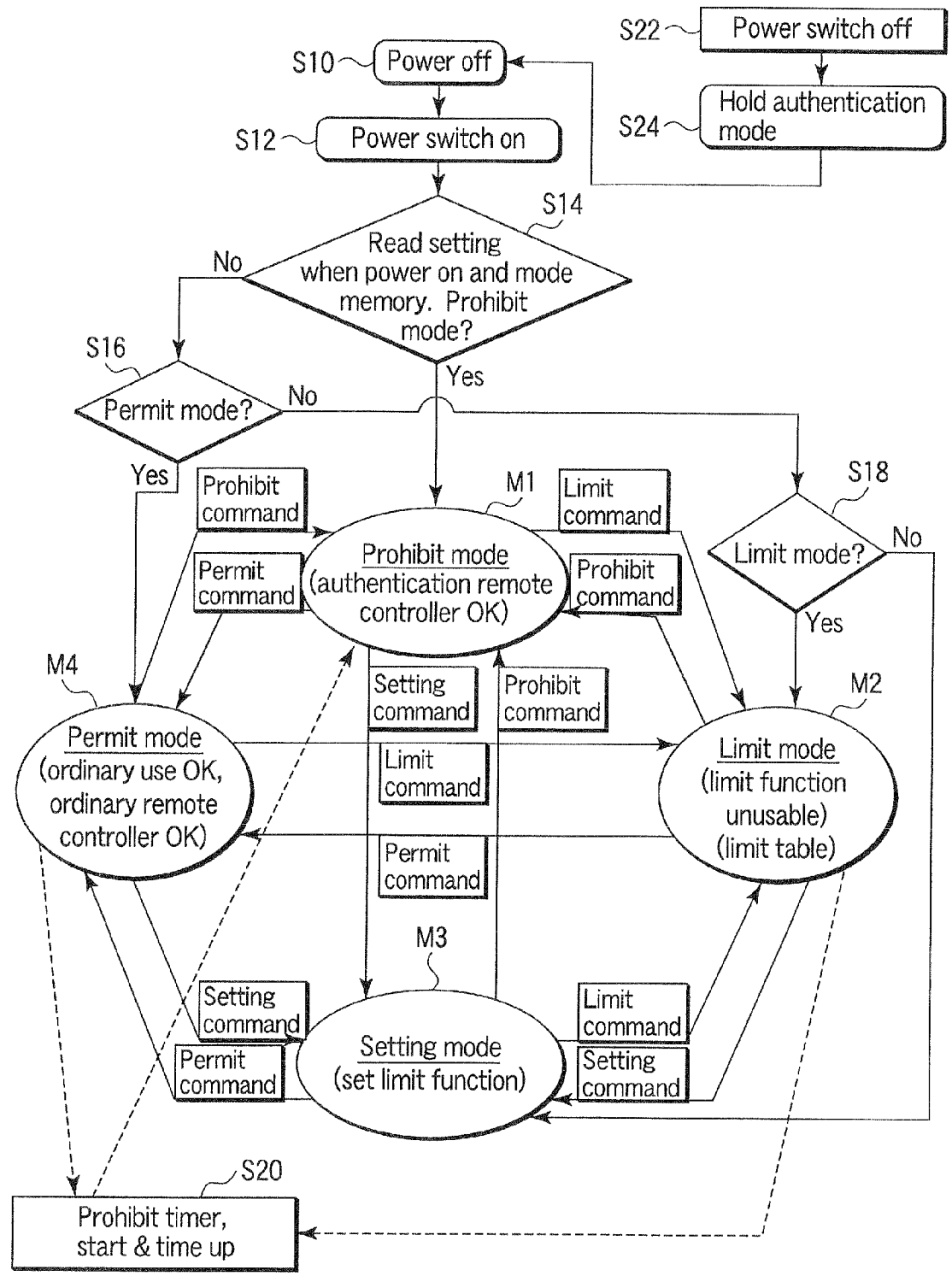
F I G. 27

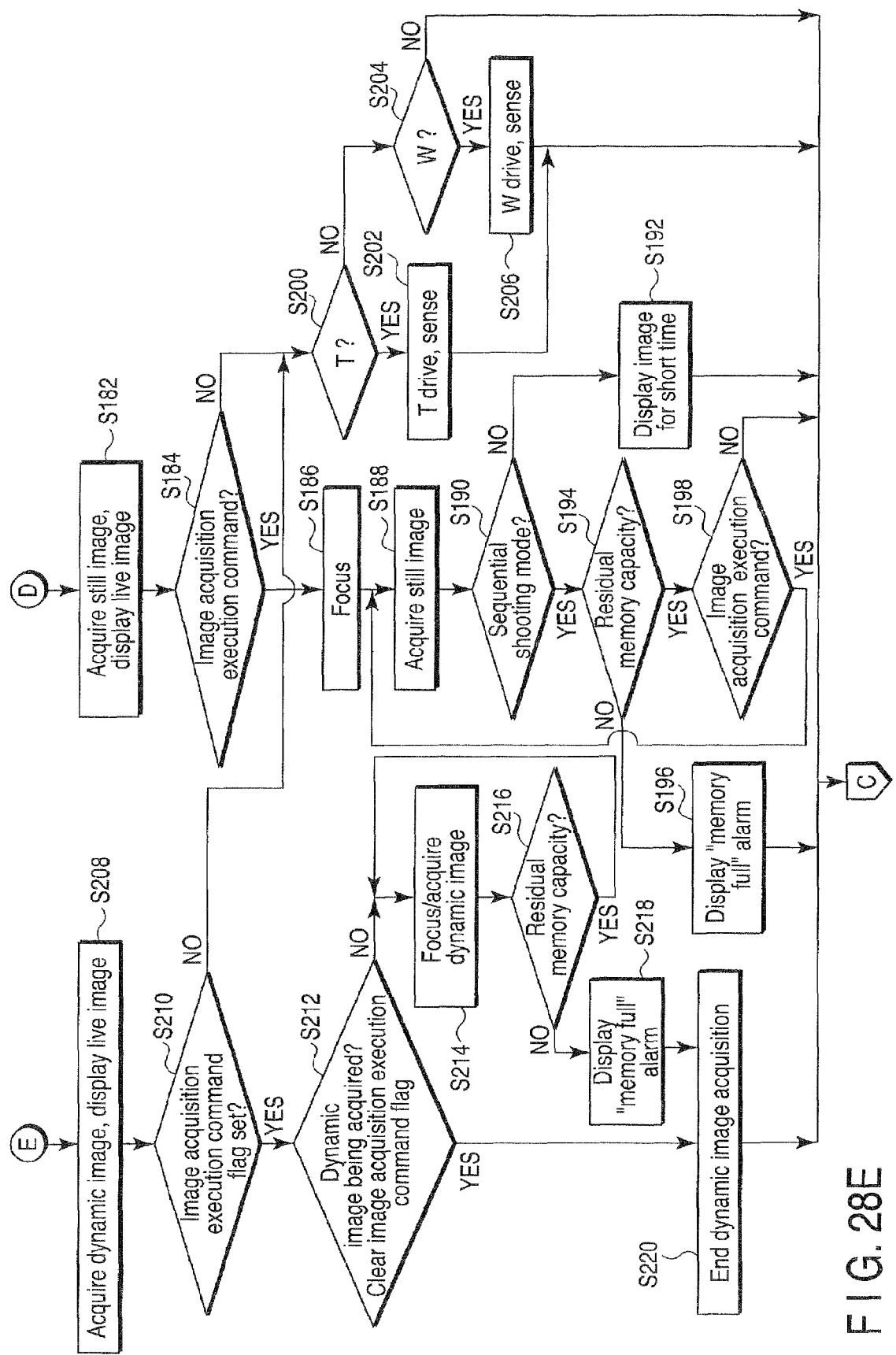
F I G. 28E

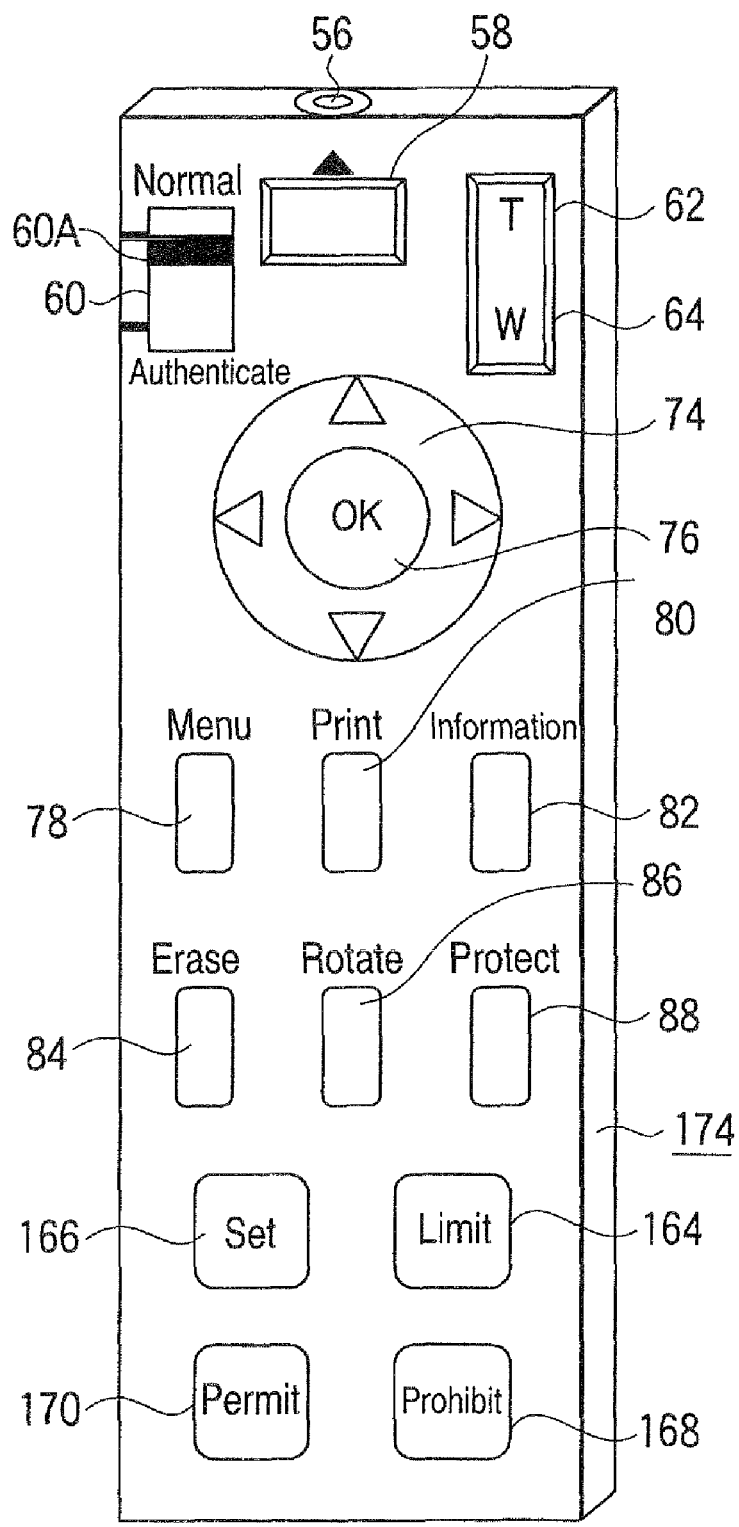
F I G. 31

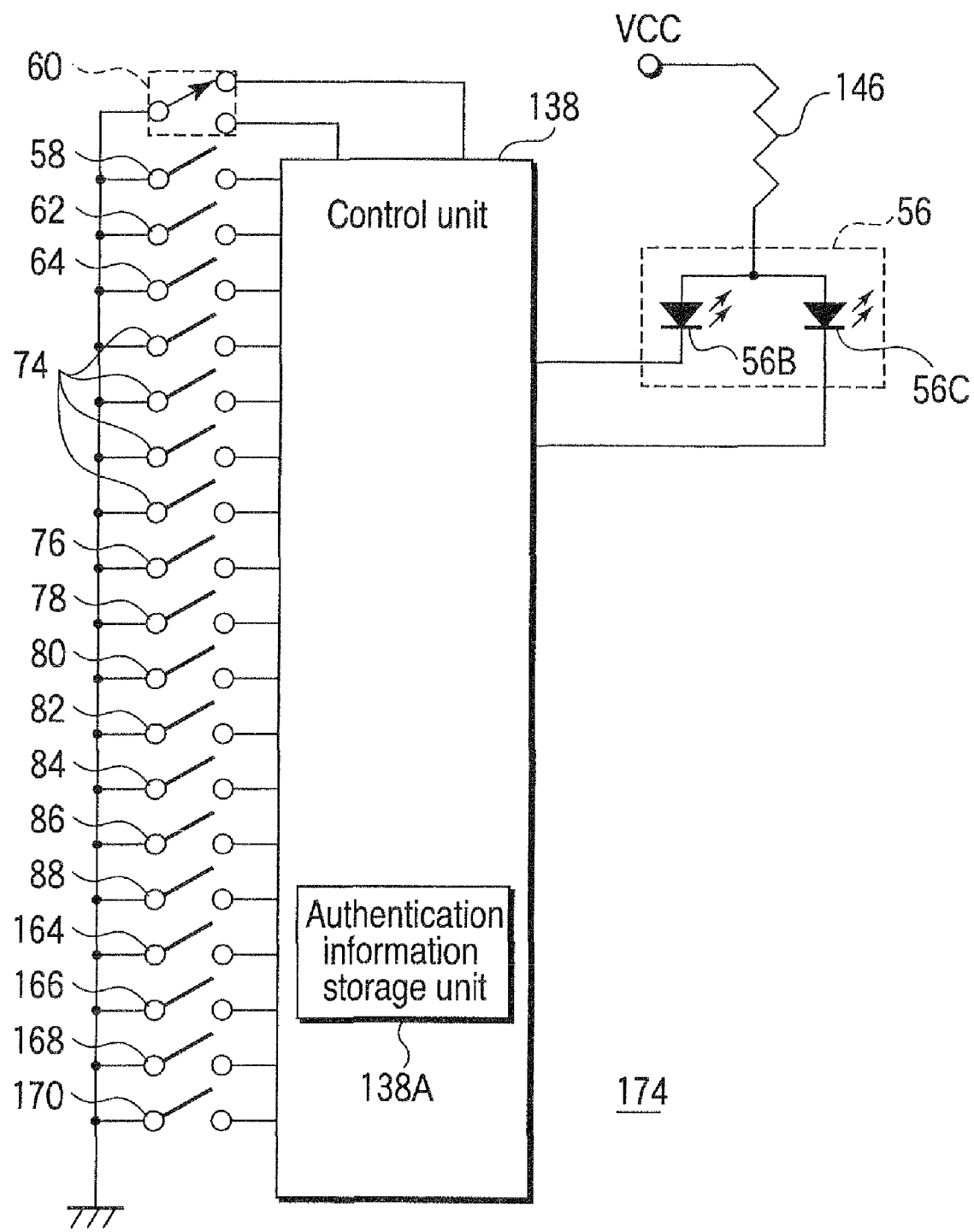
F I G. 32

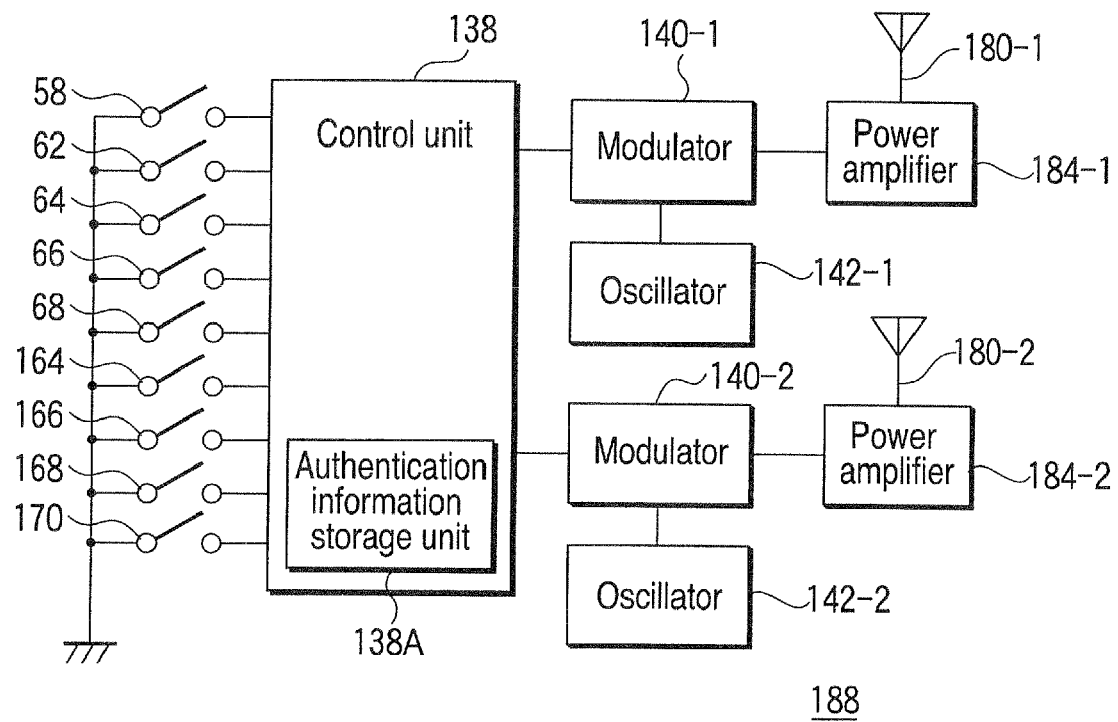
F I G. 37
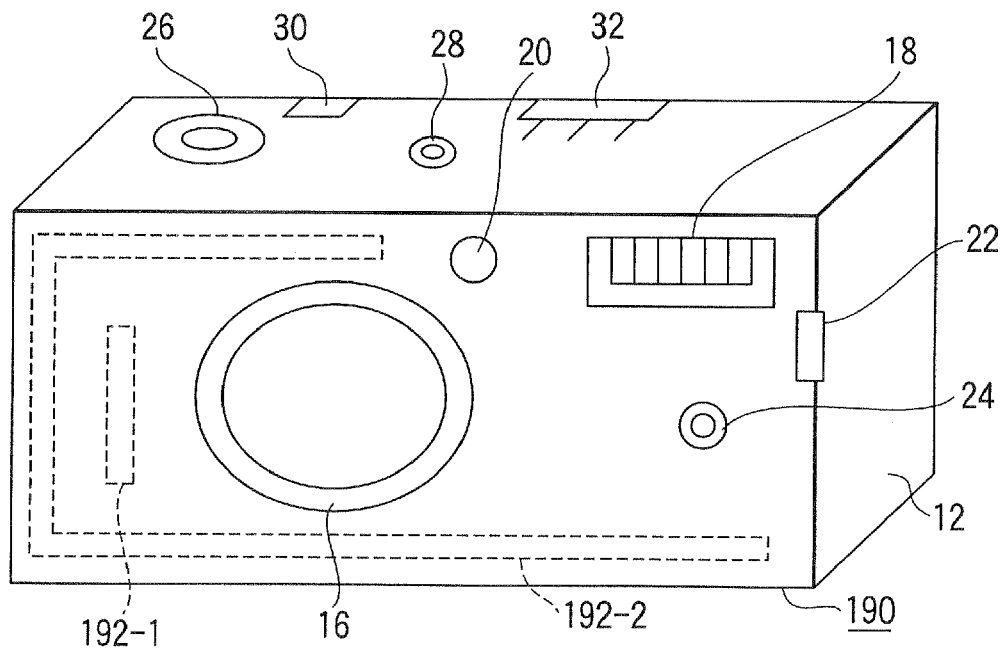
F I G. 38

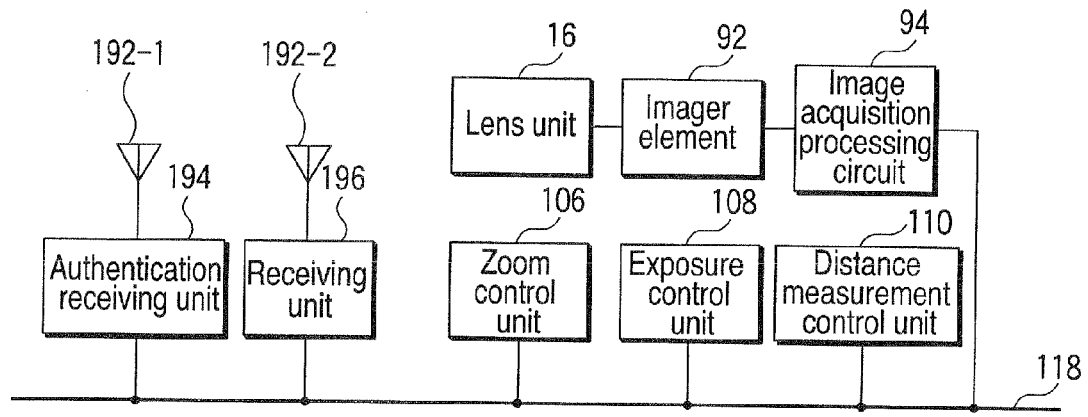
F I G. 39A
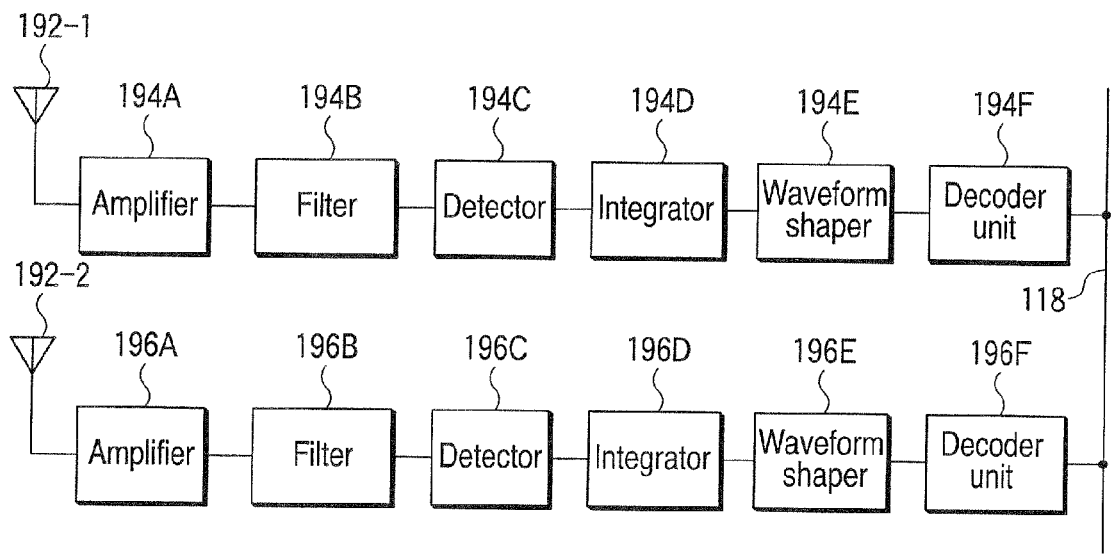
F I G. 39B

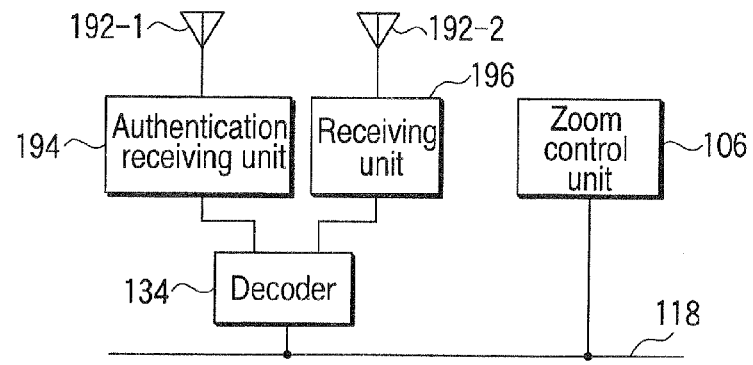
F I G. 40A
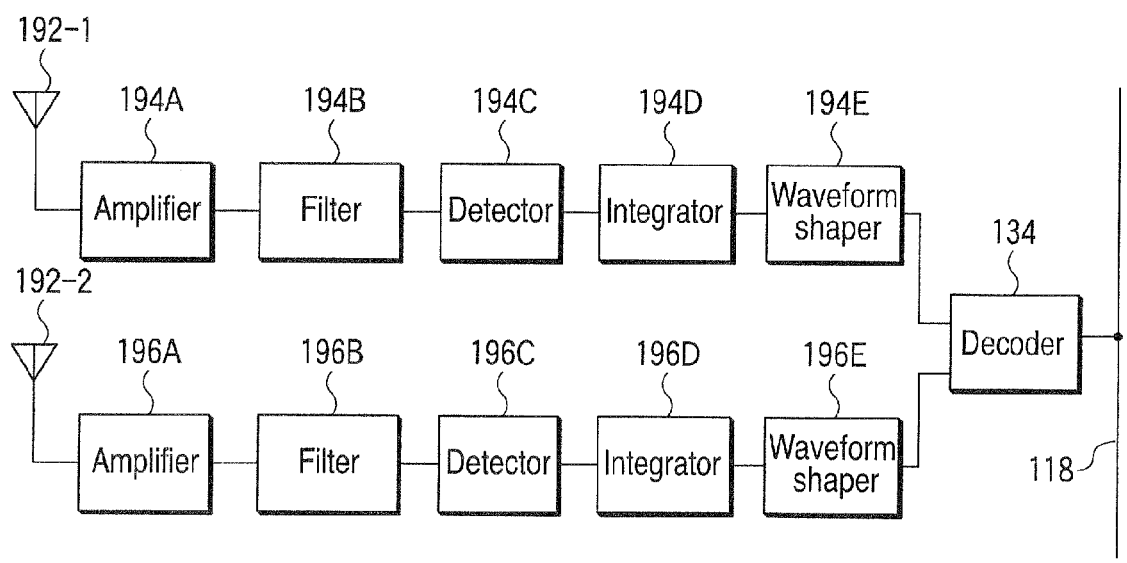
F I G. 40B

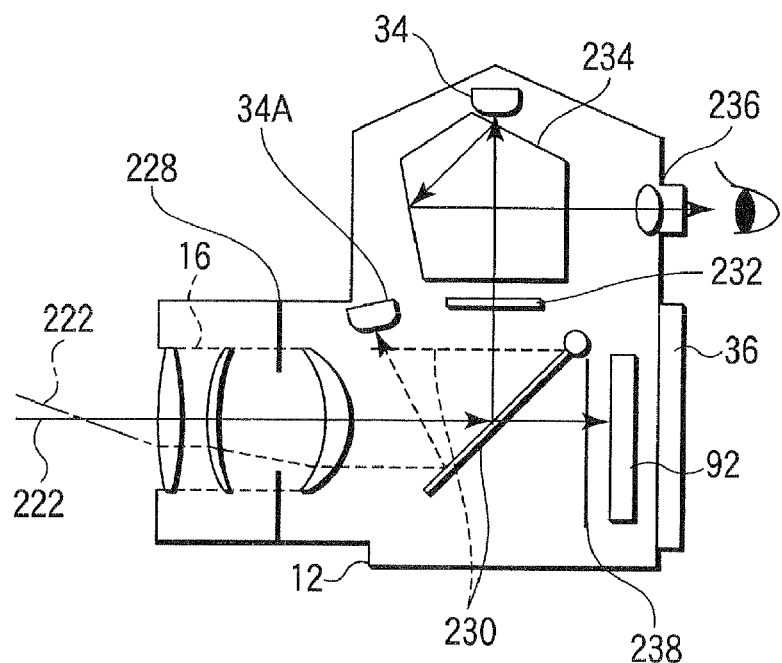
F I G. 49
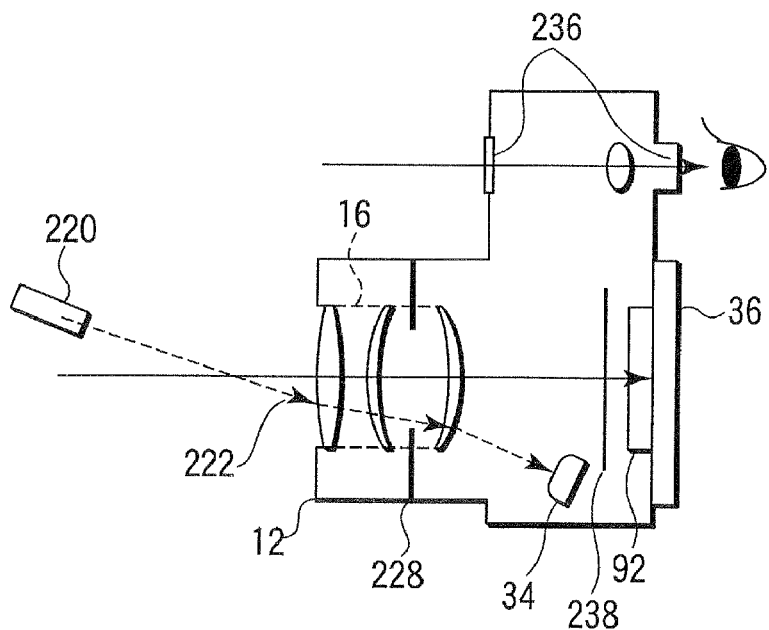
F I G. 50

IMAGE ACQUISITION SYSTEM AND METHOD OF AUTHENTICATING IMAGE ACQUISITION DEVICE IN THE IMAGE ACQUISITION SYSTEM

CROSS REFERENCE TO RELATED APPLICATIONS

This is a Continuation Application of PCT Application No. PCT/JP2007/074718, filed Dec. 21, 2007, which was published under PCT Article 21(2) in Japanese.

This application is based upon and claims the benefit of priority from prior Japanese Patent Application No. 2006-350212, filed Dec. 26, 2006, the entire contents of which are incorporated herein by reference.

BACKGROUND OF THE INVENTION

1. Field of the Invention

The present invention relates to an image acquisition system including an image acquisition device and a commanding device configured as a unit separate from the image acquisition device proper and a method of authenticating the image acquisition device in the image acquisition system.

2. Description of the Related Art

In recent years, concern about the protection of personal information and information security has become so high that, from the viewpoint of protection of personal information and privacy, even an image acquired by oneself must be carefully handled in an increased number of cases depending on the image contents, especially in the case where an image of another person is included.

In a conventional 35-mm film camera, the number of frames is 24 to 36, and should a camera loaded with a film of 36 frames imaged be lost or stolen, at most 36 images lost, this being a relatively small number compared with a digital camera. Depending on the contents, the less would of course be great and so would be the risk of the information leakage.

With the advent of the age of the digital camera, on the other hand, the acquired images are recorded in the internal memory of the camera as digital information. The images thus recorded can be easily copied on the one hand, and even if they are copied without permission of the owner, the original images remain as they are, and therefore, the owner may not be aware that the images have been copied on the other hand.

Recently, the storage capacity of the storage medium of the digital camera has been so increased that the memory card of even 4 gigabytes is now placed on the market. In the semiconductor market, Moor's Law is known, according to which the design rule is decreased from 90 to 65 mm and further to as small as 45 mm. In the future, the storage capacity of the semiconductor memory continues to be in upward tendency. The capacity of the compact hard disk is also on the increase, and even the hard disk in the size of a Compact Flash (registered trademark) card has reached several gigabytes in capacity. This tendency is expected to continue in the future.

In the case where the storage capacity per frame of image is one megabyte on the average, for example, 2000 frames of images can be recorded in the memory card of 2 gigabytes, and 6000 frames of images in the hard disk of 6 gigabytes. Under the circumstances, an enormous amount of personal information beyond comparison with the storage capacity for the film camera is now carried with each camera.

The image is recorded in the digital camera with the image acquisition date, etc. Some cameras can record even positional information by GPS. In other words, privacy information such as the behavior and the relationships of individual persons are stored in a great amount as images and data. If the camera is lost, a similar camera can be repurchased at several ten to several hundred thousand yen, but the lost images and information may invite the risk of a greater loss.

The image recording format of the digital camera is standardized, and by removing a removable memory card or a card-type hard disk from the camera and inserting it into the memory slot of the card reader or the personal computer (hereinafter sometimes referred to simply as PC), the images and the accompanying information can be easily viewed or copied.

With the increased memory capacity and the decreased price as a background, even a camera with a nonreplicable built-in memory of about 16 megabytes has appeared, with which images can still be recorded even if the removable memory is full or not installed. In view of this situation, a method has been realized to improve the security by increasing the capacity of the built-in memory and preventing the reproduction of the images from the built-in memory without meeting specified conditions, while at the same time making the conventional removable memory compatible with other cameras.

A considerable number of methods have so far been proposed to improve the security by prohibiting the use of the camera by other than the owner and thus preventing the information leakage and the illegal use.

According to EP 1003069 A2, for example, the ID information of the user is registered, and by reading and collating in advance, the use is permitted only in the case where the ID is coincident. Specifically, the function of verifying the retina pattern, the fingerprint or the voiceprint has been proposed. Also, a method has been proposed in which the ID information is input in the memory card in advance and required to be read. In still another method proposed, a keyboard is provided as an ID input unit to input the ID number.

On the other hand, US 2005/0001024 A1 proposes that a first electronic device held by the user and having stored the personal information of the user communicates with a second electronic device by radio, and the second electronic device is customized in accordance with the user by automatically reading the personal information of the particular user.

Further, Jpn. Pat. Appln. KOKAI Publication No. 2005-42398 proposes a car garage shutter system in which the identification data is stored in a remote controller. The use of a private key as the authentication information or the encrypted information has been proposed. The authentication of voice, iris or fingerprints has also been proposed.

To maintain the security of the information, devices and system, on the other hand, an electronic certificate based on a public key and the one-time password utilizing an authentication server and a network also find practical application as a method high in security.

BRIEF SUMMARY OF THE INVENTION

According to a first aspect of the present invention, there is provided an image acquisition system comprising an image acquisition device having an image acquisition unit and a commanding device configured as a member separate from an image acquisition device proper to transmit a command for controlling the image acquisition device to the image acquisition device proper so that the image acquisition device can perform an operation corresponding to the command, the image acquisition device including:

an authentication command receiving unit configured to receive an authentication command which is transmitted from the commanding device and contains authentication information used by the image acquisition device to authenticate the commanding device;

a general command receiving unit, arranged separately from the authentication command receiving unit, configured to receive a general command which is transmitted from the commanding device and not contains the authentication information;

an authentication command recognition unit configured to recognize the authentication command received by the authentication command receiving unit; and a function limiting unit configured to limit a function of the image acquisition device based on the authentication command recognized by the authentication command recognition unit.

According to a second aspect of the present invention, there is provided an authentication method for an image acquisition device, wherein authentication is carried out between the image acquisition device having an image acquisition unit and a commanding device configured as a member separate from the image acquisition device to transmit a command to the image acquisition device proper to control the image acquisition device in such a manner that the image acquisition device can perform an operation corresponding to the command, the method comprising, in the image acquisition device:

receiving an authentication command, which is transmitted from the commanding device and contains authentication information used by the image acquisition device to authenticate the commanding device, by an authentication command receiving unit configure to receive the authentication command, the authentication command receiving unit being separate from a general command receiving unit configured to receive a general command which is transmitted from the commanding device and not contains the authentication information;

recognizing the authentication command thus received; and limiting a function of the image acquisition device based on the authentication command thus recognized.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 21 is a diagram showing an example of the character string used as authentication mode switching command data.

FIG. 22 is a diagram showing the authentication mode of the camera proper.

FIG. 23 is a diagram for explaining the selection as to the designation of the authentication mode setting at the time of switching on the power of the camera proper.

FIG. 24 is a diagram for explaining the functions available in the limiting mode.

FIG. 25 is a diagram showing the outline of the operation in the case where the switches or the buttons of the camera proper are depressed.

FIG. 26 is a diagram showing the outline of the corresponding operation of the camera proper in the case where the switches or the buttons of the camera proper are depressed.

FIG. 27 is a diagram for explaining the transition of the authentication mode.

FIG. 28E is a diagram showing a fifth part of a series of flowcharts for explaining the process and the status transition in the image acquisition device.

FIG. 31 is a perspective view showing the outer configuration of the optical remote controller as another example of the commanding device according to the second embodiment.

FIG. 32 is a block diagram showing the electrical configuration of the optical remote controller shown in FIG. 31.

FIG. 37 is a block diagram showing the electrical configuration of the radio remote controller shown in FIG. 36.

FIG. 38 is a perspective view showing the outer configuration of the digital camera as an example of the image acquisition device of the image acquisition system according to the third embodiment of the invention.

FIG. 39A is a diagram showing a part of the block configuration of the digital camera shown in FIG. 38.

FIG. 39B is a block diagram showing the configuration of the authentication receiving unit and the receiving unit of the digital camera shown in FIG. 38.

FIG. 40A is a diagram showing the configuration of a common decoder shared by the decoder unit of the authentication receiving unit and the decoder unit of the receiving unit.

FIG. 40B is a block diagram showing the configuration of the authentication receiving unit and the receiving unit with a common decoder shared by the decoder unit of the authentication receiving unit and the decoder unit of the receiving unit.

FIG. 49 is a diagram showing the layout of the photodetector element of the image acquisition device of the single-lens reflex type for receiving the authentication command light in an image acquisition system according to an eighth embodiment of the invention.

FIG. 50 is a diagram showing the layout of the photodetector element of the image acquisition device of the lens shutter type for receiving the authentication command light according to the eighth embodiment.

DETAILED DESCRIPTION OF THE INVENTION

The best mode for carrying out the invention will be explained below with reference to the drawings.

[First Embodiment]

Figure 1:
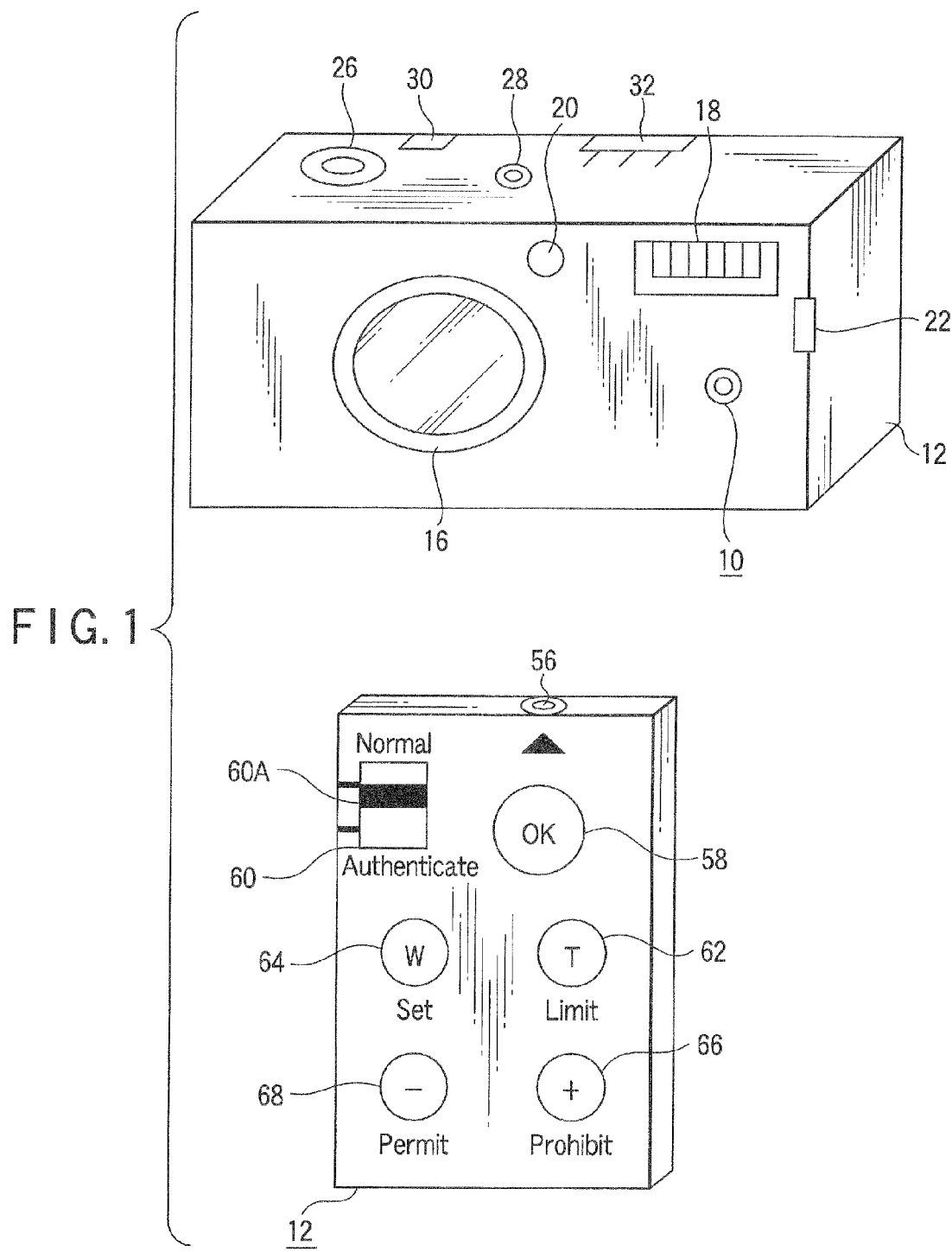
FIG. 1 is a perspective view showing the appearance of the configuration of a digital camera as an example of an image acquisition device and an optical remote controller as an example of a commanding device with an authentication function of an image acquisition system according to a first embodiment of the invention.

The image acquisition system according to the first embodiment of the invention, as shown in FIG. 1, includes an image acquisition device such as a digital camera 10 and a commanding device such as an optical remote controller 14 configured, as a member separate from the image acquisition device (a camera proper 12), to transmit an image acquisition execution command to the image acquisition device proper thereby to permit the latter to perform the image acquisition operation.

On the front surface of the camera proper 12 of the digital camera 10, there are arranged a lens unit 16, a flash 18 for emitting auxiliary image acquisition light, a photodetector element 20 for receiving the light of the command having no authentication information (hereinafter referred to as the general command) such as an image acquisition execution command from a commanding device such as the optical remote controller 14, a light-emitting element 22 for giving an advance notice of the image acquisition operation with the timer or confirming the command from the commanding device, and a microphone 24 used for sound recording during the image acquisition operation or adding a voice message after the image acquisition operation.

Also, a shutter switch 26 is arranged on the upper surface of the camera proper 12. This shutter switch 26, which is a two-stage motion switch in still image acquisition mode, can focus the image by half push and snap the shutter by full push. In dynamic image acquisition mode, on the other hand, the image acquisition operation is started by a first push and stopped by a second push. On the upper surface of the camera proper 12, there also arranged a power switch 28 for switching on/off the power supply, a power lamp 30 that lights when the power is on, and a three-way slide switch 32 for selecting the still image acquisition mode, the dynamic image acquisition mode and the image play mode.

Figure 2:
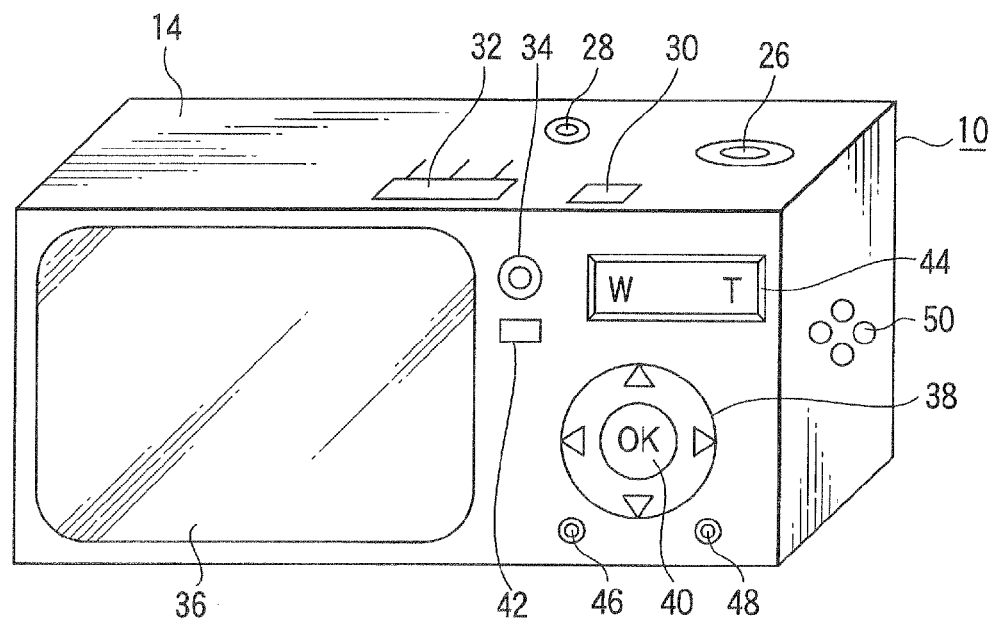
FIG. 2 is a perspective view of the digital camera as taken from the rear side in FIG. 1.

On the rear surface of the camera proper 12, on the other hand, there is arranged, as shown in FIG. 2, a photodetector element 34 making up a sensor for receiving the command with the authentication information (hereinafter referred to as the authentication command) containing the authentication information for the camera proper 12 to authenticate the commanding device. Also, a monitor 36 is arranged on the rear surface of the camera proper 12. This monitor 36 is formed of a liquid crystal display unit 1.8 to more than 3 inches in size and having 110 to more than 230 thousand pixels. The fields of application of the monitor 36 include the image confirmation at the time of the image acquisition operation, the image display after the image acquisition operation, the display examples of acquired images for selecting the image acquisition scene, and the display of the setting menu such as the image acquisition conditions, the number of frames of acquired images and the residual capacity of the battery.

Further, an arrow switch 38, an OK button 40, a menu button 42, a zoom switch 44, an erase button 46, a print button 48, etc., are arranged on the back of the camera proper 12. The arrow switch 38 is four-way seesaw switch adapted for depression in four directions, up, down, left and right and used to move the selection items up, down, left or right at the time of selecting a plurality of items displayed on the monitor 36 or to feed the frames of the reproduced images longitudinally. The OK button 40 is a switch to determine the selection items on the monitor 36 at the time of setting conditions, and the menu button 42 is a switch for causing the various menu to be displayed for setting conditions. The zoom switch 44 is a left-right two-way seesaw switch in which the depression of T side moves the zoom lens of the lens unit 16 toward the telephoto side, while the depression of the W side drives the zoom lens to wide-angle side. Also, in play mode, the zoom switch 44 is used also to enlarge or reduce the image or to control the multiscreen display. When the erase button 46 is depressed in play mode, the erase execution confirmation is displayed on the monitor 36, and upon depression of the OK button 40 by selecting the erase by the arrow switch 38, the image being displayed is erased. Also, assuming that the print button 48 is depressed in play mode, the print menu is displayed on the monitor 36, and as long as the digital camera 10 and the printer (not shown) are connected to each other, the image in the digital camera 10 can be printed.

Also, a speaker 50 for producing the alarm sound or the confirmation sound or reproducing the recorded sounds in play mode is arranged on the side surface of the camera proper 12.

Figure 3:
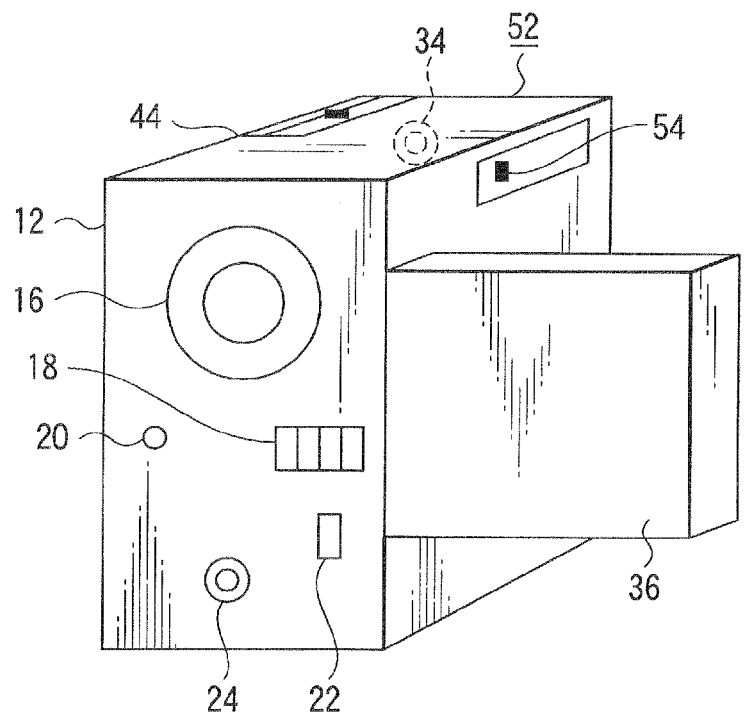
FIG. 3 is a perspective view showing the appearance of the configuration of a digital movie camera as another example of the image acquisition device according to the first embodiment.

FIG. 3 is a perspective view showing the outer configuration of a digital movie camera 52 as another example of the image acquisition device. In this configuration, the functional members similar to those of the digital camera 10 described above are designated by the same reference numerals, respectively. Specifically, in this digital movie camera 52, the front surface of the camera proper 12 has arranged thereon a lens unit 16, an auxiliary image acquisition light-emitting flash 18, a photodetector element 20 for receiving the general command from the commanding device, a light-emitting element 22 for giving an advance notice of the image acquisition operation performed with timer or confirming the command from the commanding device, and a microphone 24 used to record the sound during image acquisition or add a voice message after image acquisition.

Also, the side surface of the camera proper 12 has a monitor 36 rotatably mounted thereon to display the image being acquired or the reproduced image after image acquisition operation. The monitor 36, when out of use, can be closely accommodated in the camera proper 12. Further, the side surface of the camera proper 12 has arranged thereon a power mode switch 54 adapted to turn on/off the power supply or switch the image acquisition mode and the play mode.

A zoom switch 44 is arranged on the upper surface of the camera proper 12. The zoom switch 44 is a left-right two-way seesaw switch in which the depression on T side moves the zoom lens toward telephoto side, while the depression on W side drives the zoom lens to wide-angle side. Also, in play mode, the zoom switch 44 is used also to enlarge or reduce the image or to control the multiscreen display on the monitor 36.

On the rear surface of the camera proper 12, there is arranged a photodetector element 34 constituting a sensor for receiving the authentication command from the commanding device. In addition, though not specifically shown, various connectors, menu button and shutter buttons are arranged on the side and back surfaces of the camera proper 12.

Incidentally, the commanding device is classified as either a commanding device with the authentication function for transmitting the command having the authentication information (authentication command) or a general commanding device for transmitting the command without the authentication information (general command). The authentication command is classified as an image acquisition command with the authentication information (for image acquisition or reproduction) and the authentication mode switching command. The general command is an image acquisition command for image acquisition or reproduction and contains no authentication information. The general command from the general commanding device includes the commands for all the functions in permit mode and the commands for the functions not limited in limit mode as described later. The authentication information, in addition to the fixed remote controller identification information described later, can use variable remote controller identification information (random number and count), ID information and function range information.

As shown in FIG. 1, the optical remote controller 14 for the camera, as an example of the commanding device with the authentication function, is configured, on the end surface thereof, of a light-emitting unit 56 for transmitting the authentication command. The optical remote controller 14, by way of this light-emitting unit 56, transmits the authentication command to the digital camera 10 or the digital movie camera 52 constituting the image acquisition device.

Also, the upper surface of the optical remote controller 14 has arranged thereon an image command button 58, an authentication setting switch 60, a telephoto button 62, a wide-angle button 64, a plus button 66, a minus button 68, etc. The optical remote controller 12, upon depression of the image acquisition command button 58, transmits an image acquisition execution command to the image acquisition device as an image acquisition command. The authentication setting switch 60 switches between the normal position and the authentication position in accordance with the position of the operating unit 60A thereof, and the functions of other switches 62 to 68 are switched by the position thereof.

The authentication setting switch 60 is a two-position change-over switch. The normal position is assumed when the operating unit 60A of the authentication setting switch 60 is located at the normal position 60B above in FIG. 4A, and the authentication position is assumed when the operating unit 60A is located at the lower authentication position 60C as shown in FIG. 4B.

Specifically, the optical remote controller 14, upon depression of the telephoto button 62 at normal position 60B of the authentication setting switch 60, transmits to the image acquisition device a T button command as an image acquisition command to drive the lens unit 16 to the telephoto side. On the other hand, the optical remote controller 14, upon depression of the telephoto button 62 at authentication position 60C of the authentication setting switch 60, transmits to the image acquisition device an authentication mode switching command (a limiting command) as an authentication mode switching command to switch the image acquisition device to the limiting mode.

Similarly, upon depression of the wide-angle button 64 at normal position 60B of the authentication setting switch 60, the optical remote controller 14 transmits the W button command as an image acquisition command to drive the lens unit 16 to the wide-angle side. On the other hand, upon depression of the wide-angle button 64 at authentication position 60C of the authentication setting switch 60, the optical remote controller 14 transmits an authentication mode switching command (a setting command) as an authentication mode switching command to switch the image acquisition device to the setting mode.

Also, upon depression of the plus button 66 at normal position 60B of the authentication setting switch 60, the optical remote controller 14 transmits an image acquisition command to feed the frame in play mode or move the selection items for menu selection. On the other hand, upon depression of the plus button 66 at authentication position 60C of the authentication setting switch 60, the optical remote controller 14 transmits an authentication mode switching command (a prohibit command) as an authentication mode switching command to switch the image acquisition device to the prohibit mode.

Further, upon depression of the minus button 63 at normal position 60B of the authentication setting switch 60, the optical remote controller 14 transmits an image acquisition command to feed the frame or move the selection items for menu selection. On the other hand, upon depression of the minus button 68 at authentication position 60C of the authentication setting switch 60, the optical remote controller 14 transmits an authentication mode switching command (permit command) as an image acquisition command to switch the image acquisition device to permit mode.

Incidentally, each mode of the image acquisition device will be described in detail later.

Figure 5:
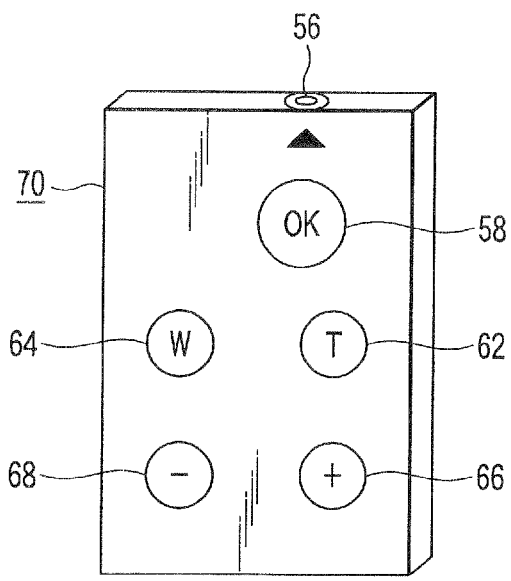
FIG. 5 is a perspective view showing the outer configuration of the optical remote controller as an example of the commanding device for the general command according to the first embodiment.

The optical remote controller 70 for the camera is shown in FIG. 5 as an example of the general commanding device. The functional members similar to those of the optical remote controller 14 are designated by the same reference numerals, respectively. Specifically, the optical remote controller 70 not having this authentication function can transmit only the general command and has no authentication setting switch 60. As described later, therefore, the commands for the functions of the image acquisition device in permit mode or the functions permitted for the image acquisition device in limit mode can be transmitted.

On the end surface of this optical remote controller 70, a light-emitting unit 56 for transmitting the general command is configured, and the general command is transmitted from the light-emitting unit 56 to the digital camera 10 or the digital movie camera 52 constituting the image acquisition device.

Also, on the upper surface of the optical remote controller 70, an image acquisition command button 58, a telephoto button 62, a wide-angle button 64, a plus button 66, a minus button 68, etc. are arranged. The optical remote controller 70, upon depression of the image acquisition command button 58, transmits the image acquisition execution command to the image acquisition device as an image acquisition command. Upon depression of the telephoto button 62, the T button command for driving the lens unit 16 to the telescope side is transmitted to the image acquisition device as an image acquisition command. Upon depression of the wide-angle button 64, the W button command for driving the lens unit 16 to the wide angle side is transmitted to the image acquisition device as an image acquisition command. Upon depression of the plus button 66, the command to feed the frame at the time of reproduction or move the selection items at the time of menu selection is transmitted as an image acquisition command. Upon depression of the minus button 68, the command to feed the frame at the time of reproduction or move the selection items at the time of menu selection is transmitted as an image acquisition command.

Figure 6:
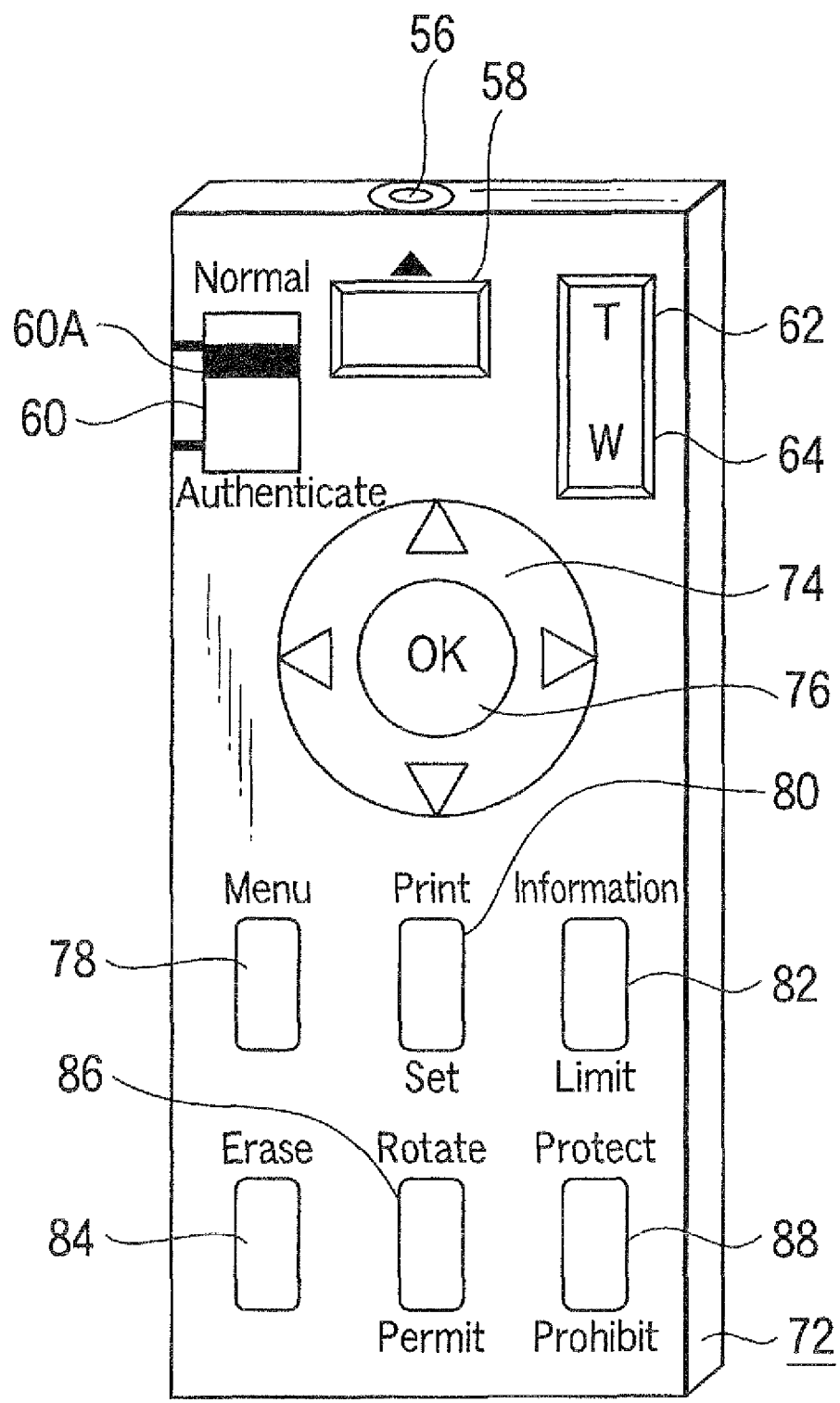
FIG. 6 is a perspective view showing the outer configuration of another optical remote controller as another example of the commanding device with the authentication function according to the first embodiment.

As another example of the commanding device with the authentication function, another optical remote controller 72 for the camera as shown in FIG. 6 is available. The functional members similar to those of the optical remote controller 14 are designated by the same reference numerals, respectively. Specifically, also in the optical remote controller 72, the light-emitting unit 56 for command transmission is arranged on the end surface thereof, and from this light-emitting unit 56, the authentication command is transmitted to the image acquisition device. On the upper surface of the optical remote controller 72, on the other hand, there are arranged an image acquisition command button 58, an authentication setting switch 60, a telephoto button 62, a wide-angle button 64, an arrow switch 74, an OK button 76, a menu button 78, a print button 80, an information button 82, an erase button 64, a rotation button 86, a protection button 88, etc.

The optical remote controller 72, upon depression of the image acquisition command button 58, transmits an image acquisition execution command to the image acquisition device as an image acquisition command. Also, the telephoto button 62 and the wide-angle button 64 make up a seesaw switch. Upon depression of the telephoto button 62, a T button command is issued, and the image acquisition device that has received it drives the lens unit 16 to the telephoto side during the image acquisition operation, or enlarges the image or controls the multiscreen display in the monitor 36 during the play mode. In similar fashion, upon depression of the wide-angle button 64, a W button command is issued, and in the image acquisition device that has received the W button command, the lens unit 16 is driven to the wide-angle side during the image acquisition operation, while the image is reduced or the multiscreen display is controlled in the monitor 36 during the play mode.

Also, the arrow switch 74 is a four-way seesaw switch adapted to be depressed at any of four points including up, down, left and right, and transmits an operation command corresponding to the direction actually depressed. This switch is used to designate the selection items to the positions up, down, left or right at the time of selecting a plurality of items displayed on the monitor 36 of the image acquisition device or to feed the frames before and after the reproduced image. The OK button 76 is a switch for determining the selection item on the monitor 36 at the time of setting conditions, and upon depression thereof, transmits an OK command. The menu button 78 is a switch for displaying the various condition setting menus on the monitor 36, and upon depression thereof, issues a menu command.

Also, upon depression of the erase button 84, the erase command is transmitted, so that as long as the erase function is not limited in play mode at the time of reception thereof in the image acquisition device, the erase execution confirmation is displayed on the monitor 36. In the case where the OK button 76 is depressed after selecting the erasure on the arrow switch 74, the image acquisition device receives the OK command and erases the image on display.

Figure 4A:
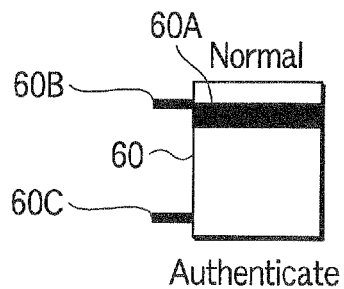
FIG. 4A is an enlarged view of an authentication setting switch at the normal position.
Figure 4B:
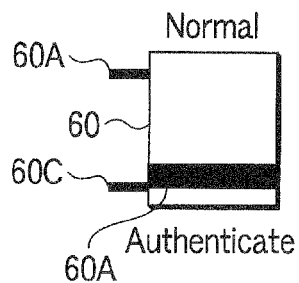
FIG. 4B is an enlarged view of an authentication setting switch at the authentication position.

The authentication setting switch 60, like in FIGS. 4A and 4B, is to switch between the normal position 60B and the authentication position 60C of the operation unit 60A. In accordance with the position of the operation unit 60A, the functions of other buttons 80, 82, 86, 86 are switched.

Specifically, upon depression of the print button 80 at normal position 60B of the operation unit 60A, a print command is issued as an image acquisition command, and in the image acquisition device that has received the print command, the print menu is displayed on the monitor 36, and if the image acquisition device and the printer are connected to each other, the image in the image acquisition device can be printed out. Upon depression of the print button 80 at authentication position 60C of the operation unit 60A, on the other hand, a setting command is issued as an authentication mode switching command, and upon receipt thereof, the image acquisition device switches to the setting mode.

Also, in the case where the information button 82 is depressed at normal position 60B of the operation unit 60A, an information display command is issued as an image acquisition command, and in the image acquisition device that has received it displays the information of the display image on the monitor 36. In the case where the information button 82 is depressed at authentication position 60C of the operation unit 60A, on the other hand, the control command is issued as an authentication mode switching command, and in accordance with the reception thereof, the image acquisition device switches to the limiting mode.

In the case where the rotation button 86 is depressed at normal position 60B of the operation unit 60A, a rotation command is issued as an image acquisition command, and in the image acquisition device that has received it, the display image of the monitor 36 is rotated by 90 degrees. In the case where the rotation button 86 is depressed at authentication position 60C of the operation unit 60A, on the other hand, a permit command is issued as an authentication mode switching command, and in accordance with the reception thereof, the image acquisition device is switched to the permit mode.

Upon depression of the protection button 88 at normal position 60B of the operation unit 60A, a protection command is issued as an image acquisition command, and in the image acquisition device that has received it, the image displayed on the monitor 36 is protected from erasure by attaching a protective flag thereto. Incidentally, this protective flag can be cleared on the menu displayed by the operation of the menu button 73. In the case where the protection button 88 is depressed at authentication position 60C of the operation unit 60A, on the other hand, a prohibit command is issued as an authentication mode switching command, and in accordance with the reception thereof, the image acquisition device is switched to the prohibit mode.

Figure 7:
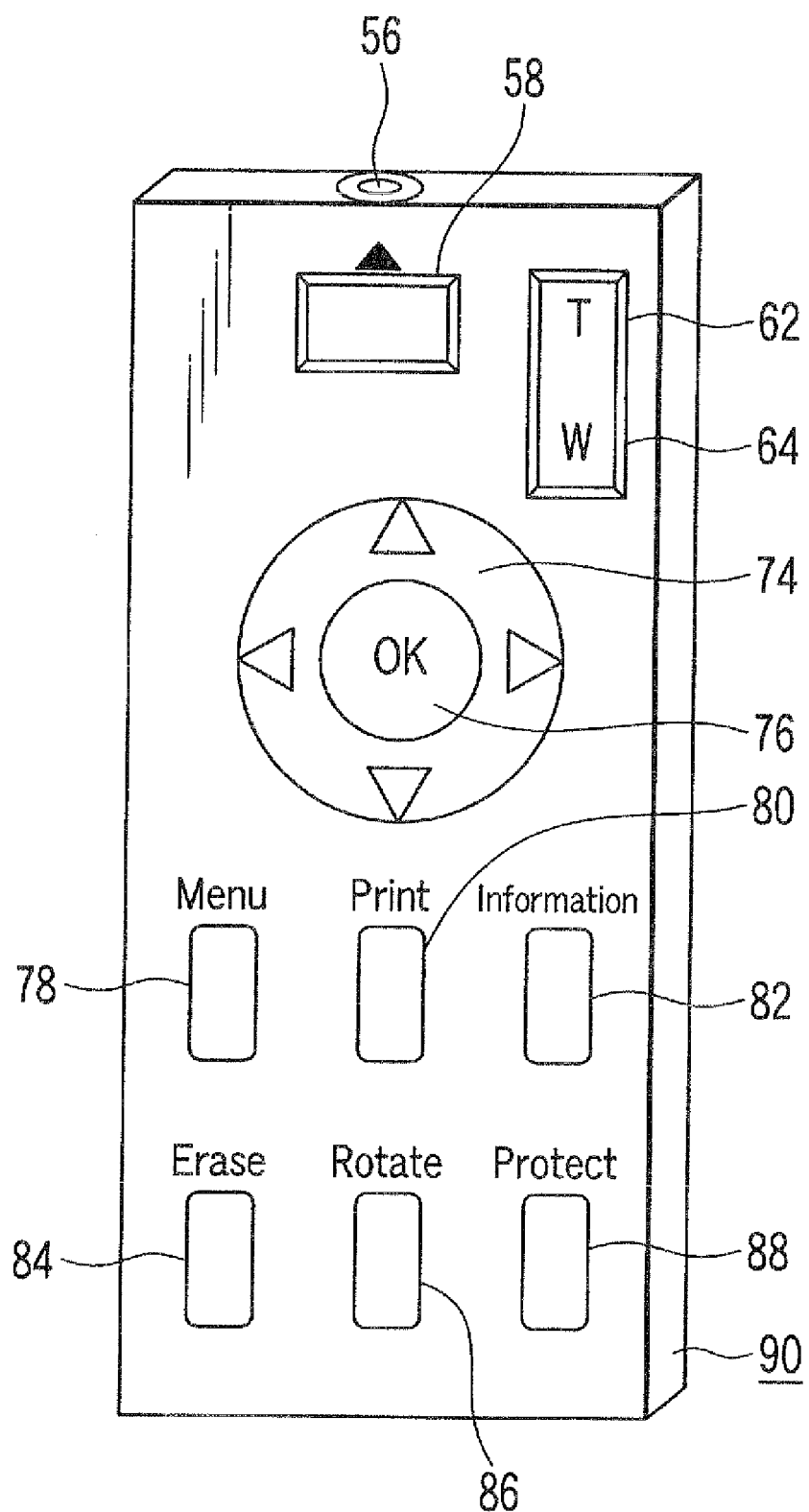
FIG. 7 is a perspective view showing the outer configuration of another optical remote controller as another example of the commanding device for the general command according to the first embodiment.

Another optical remote controller 90 for the camera is shown in FIG. 7 as another example of the general commanding device. The functional members similar to those of the optical remote controller 72 are designated by the same reference numerals, respectively. Specifically, the optical remote controller 90 having no authentication function can transmit only the general command and has no authentication setting switch 60. As described later, the command for the function in permit mode or the function permitted for the image acquisition device in limit mode can be transmitted.

Also, this optical remote controller 90 has on the end surface thereof a light-emitting unit 56 for command transmission, and the general command is transmitted from this light-emitting unit 56 to the image acquisition device. On the upper surface, on the other hand, there are arranged an image acquisition command button 58, a telephoto button 62, a wide-angle button 64, an arrow switch 74, an OK button 76, a menu button 78, a print button 80, an information button 82, an erase button 84, a rotation button 86, a protection button 88, etc.

The optical remote controller 90, upon depression of the image acquisition command button 58, transmits the image acquisition execution command as an image acquisition command to the image acquisition device. Also, upon depression of the telephoto button 62, a T button command is transmitted, while upon depression of the wide-angle button 64, a W button command is transmitted. The arrow switch 74 is a four-way seesaw switch adapted to be depression at any of four points including up, down, left and right, and in accordance with the depression direction, transmits an operation command. Upon depression of the OK button 76, an OK command is transmitted. Upon depression of the menu button 78, a menu command is transmitted. Also, upon depression of the erase button 84, an erase command is transmitted.

Also, upon depression of the print button 80, a print command is transmitted as an image acquisition command. Upon depression of the information button 82, an information display command is transmitted as an image acquisition command. Upon depression of the rotation button 86, a rotation command is transmitted as an image acquisition command. Upon depression of the protection button 88, a protection command is transmitted as an image acquisition command.

Figure 8:
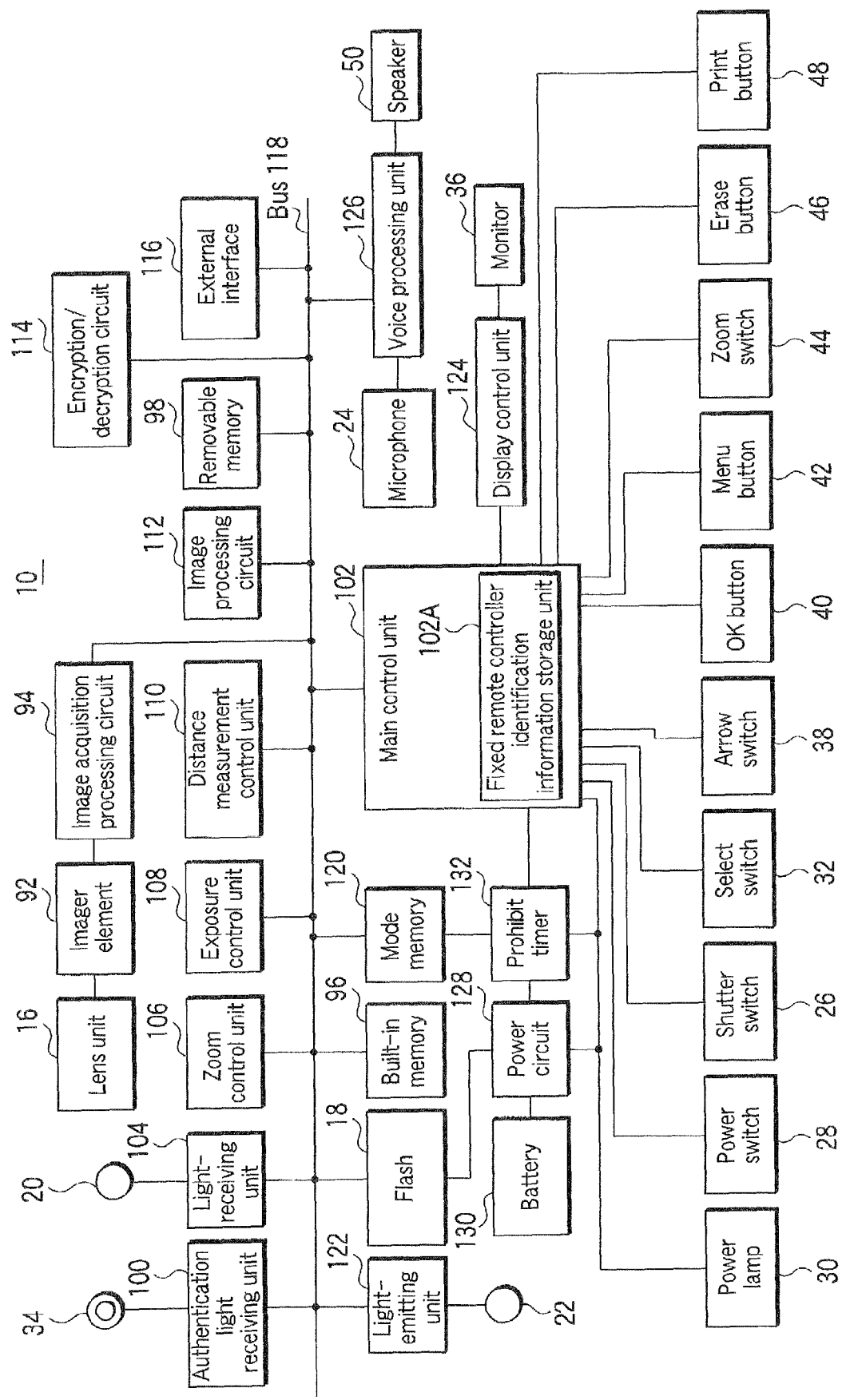
FIG. 8 is a block diagram showing an electronic configuration of the digital camera.

The electrical configuration of the digital camera 10 is as shown in FIG. 8. Specifically, the lens unit 16 focuses the image of the object on an imager element 92. The image acquisition device is of the single-lens reflex type or lens shutter type. This lens unit 16 includes a zoom function, an auto focus function and a brightness reduction function. The imager element 92 is for converting the image of the object into an electrical signal and of CCD type or CMOS type. The number of pixels is on the order of one to ten million or more. The image acquisition processing circuit 94 processes the signal from the imager element 92, and by analog-to-digital conversion, records it in the built-in memory 96 or the removable memory 98 in a predetermined format set in the menu or the like. As such a format, the RAW data format with the image not compressed, the JPEG format based on the standard compression scheme, or in the case of dynamic images, the motion JPEG format, the MPEG2 or MPEG4 format, is used.

In the authentication light-receiving unit 100, the command light from the optical remote controller 14 or 72 with the authentication function is converted into an electrical signal by the photodetector element 34, amplified and demodulated. Then, in collaboration with the main control unit 102, only the authentication command is decoded and converted into the command data. Although the general command or other light may enter the photodetector element 34 in addition to the authentication command, only the authentication command is decoded and converted into the command data. Also, in the light-receiving unit 104, the general command received from the optical remote controller 70 or 90 without the authentication function is converted into an electrical signal by the photodetector element 20, amplified and demodulated, and then, in collaboration with the main control unit 102, decoded and converted into the command data. Although the authentication command or other light may enter the photodetector element 20 in addition to the general command, only the general command is decoded and converted into the command data.

In the case where a still image or a dynamic image can be acquired, the zoom control unit 106 drives the lens unit 16 by operating the zoom switch 44 of the camera proper 12 or the telephoto button 62 or the wide-angle button 64 of the remote controller 14, 70, 72 or 90. The exposure control unit 108, in accordance with the image acquisition conditions set in the digital camera 10, controls the diaphragm or the imager element 92 in accordance with the brightness of the object. The distance measurement control unit 110 controls the operation of driving the lens unit 16 and the detection of the focal point using the signal from the imager element 96.

The image processing circuit 112, in collaboration with the program and the CPU of the main control unit 102, executes such processes as the enlargement/reduction, compression/expansion, distortion correction, color correction, noise removal, synthesis and rotation of the image. The removable memory 98 for recording the image is configured of a semiconductor memory card and a hard disk drive, and can be mounted on or demounted from the connector (not shown) of the camera proper 12. This removable memory 98 has the capacity of several tens of megabytes to several gigabytes to record the image and the attribute information thereof. The encryption/decryption circuit 114 is used to encrypt the image recorded and to decrypt the encrypted image in the removable memory 98. This process can be omitted, however, and can alternatively be executed according to a program by the CPU of the main control unit 102. The external interface 116 includes the signal conversion function and the connector for connecting the digital camera 10 to the printer or the personal computer, the external storage device such as the hard disk or the TV receiver (hereinafter referred to simply as TV). The connection with the printer can use the PictoBridge, while the personal computer or the external storage device can be connected using USB, and with the TV using the video cable or the like.

The bus 118 is a group of common signal lines connecting the units, and includes the data bus, the address bus and the control bus. The main control unit 102, though not specifically illustrated, is a microcomputer system including CPU, ROM, RAM, register, counter, timer and the rewritable nonvolatile memory to take charge of control, display and the data processing of the digital camera 10 as a whole. Further, this main control unit 102 has fixed remote controller identification information storage unit 102A with a nonvolatile memory for recording the fixed remote controller identification information to identify the remote controller with the authentication function corresponding to the digital camera 10. Incidentally, the fixed remote controller identification information is recorded preferably before the factory shipment or sales of the digital camera 10. Further, the fixed remote controller identification information is desirably encrypted to prevent illegal use.

The built-in memory 96 is the one that cannot be taken out of the digital camera 10. The built-in memory 96 can record the acquired image selectively designated to be recorded only in the built-in memory 96, the image acquired in prohibit mode, or the image acquired in limit or permit mode with the removable memory 98 full or absent. A suitable built-in memory 96 is a semiconductor memory of several tens of megabytes to several gigabytes or a miniature hard disk of the order of several hundred megabytes to ten gigabytes.

The mode memory 120 is configured of a nonvolatile memory and can store and hold the authentication mode. The stored data is held even when power is off, so that even in the case where the battery is removed and left either willfully or negligently, the set mode such as the prohibit mode is held and maintained at the next time of power on.

The flash 18 emits flash light in accordance with the flash mode set on the menu at the time of acquisition of a still image. The flash mode includes modes for automatically emitting light in a dark environment or back-lighting conditions, a soft light emission mode for emitting weak light, a red-eye reduction mode for emitting light several times preliminarily before the main light emission, a forced light emission mode for emitting light without fail, a light-emission prohibit mode for emitting no light, etc. The light-emitting unit 122 controls the lighting of the light-emitting element 22. The display control unit 124 controls the display of the acquired image, reproduced image, the menu, the information or the alarm characters or symbols on the monitor 36. The voice processing unit 126 processes and records the sound acquired by the microphone 24 during the image acquisition operation, reproduces and supplies the recorded sound to the speaker 50 during the play mode, or supplies the alarm sound or the like to the speaker 50.

In the power circuit 128, the power from the battery 130 or an external power supply (not shown) is converted into a required voltage and supplied to each part. The battery 130 is replaceable and includes a lithium ion rechargeable battery or a dry cell.

The prohibit timer 132 is such that as soon as the time runs out upon lapse of a preset time after starting the timer, the authentication mode of the mode memory 120 is set to the prohibit mode. Even in the state where the power supply of the camera proper 12 is in off state, power continues to be supplied to the prohibit timer 132 in collaboration with the battery 130 and the power circuit 128 and thus the counting operation can be continued. Upon lapse of the preset time, the time runs out, and the authentication mode of the mode memory 120 is set to the prohibit mode. In the process, the prohibit mode may be set according to a program after power is supplied to the main control unit 102 and the mode memory 120 for a short time. As an alternative, the arrangement may be made for the prohibit timer 132 itself to set the mode memory 120 in prohibit mode without the intermediary of the main control unit 102. In this way, the mode memory 120 can be set in the prohibit mode by generating the prohibit mode set address, generating the prohibit mode data and driving the control bus for a short time. Also, the power circuit 128 may be assigned the voltage monitor function to set the prohibit mode before the voltage reaches an insufficient level for the circuit operation. In the case where the battery 130 is pulled off, the prohibit mode may be forcibly set upon lapse of a preset time taking the presence or absence of the backup battery or capacitor into consideration.

By employing this method, the situation can be prevented in which the battery 130 is pulled off willfully or negligently or left consumed up, while at the same time consuming up the backup battery or capacitor, and the prohibit timer 132 cannot perform the counting operation. As a result, the problem can be prevented in which the prohibit mode cannot be set, thus the digital camera 10 can be used even upon the elapse of the preset time.

The power of the camera proper 12 is switched on/off by the power switch 28, and while the power is on, the power lamp 30 is lighted. The shutter switch 26 and the select switch 32 are similar to those explained with reference to FIG. 1. The arrow switch 38, the OK button 40, the menu button 42, the zoom switch 44, the erase button 46 and the print button 48 operate in the same way as explained above with reference to FIG. 2. Each switch and button are connected to the interrupt line of the CPU of the main control unit 102 and/or the input/output port.

The digital movie camera 52 shown in FIG. 3 is formed to have the appearance in the shape taking the operability for the protracted dynamic image acquisition operation into consideration. The basic functional configuration, however, is similar to that of the digital camera 10 shown in FIG. 8.

Figure 9:
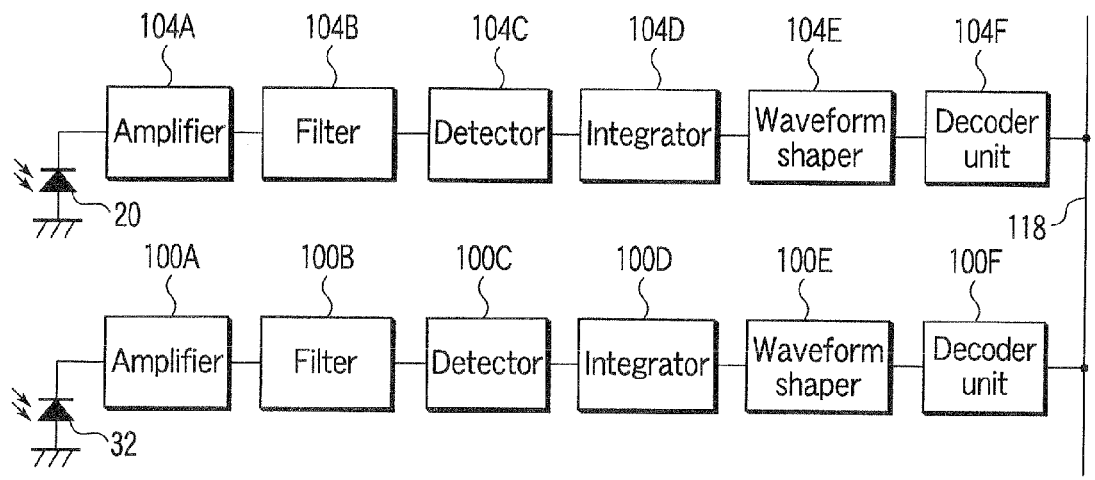
FIG. 9 is a block diagram showing the configuration of an authentication light-receiving unit and a light-receiving unit of the digital camera.

The authentication light-receiving unit 100 and the light-receiving unit 104 in the digital camera 10 are configured as shown in FIG. 9. The photodetector element 20 converts the light from the optical remote controller 70 or 90 without the authentication function into an electric current. Incidentally, the photodetector element 20 preferably has, on the front surface thereof, an optical filter (not shown) for passing the light conforming with the wavelength involved thereby to remove the effect of the external light disturbance. The current converted by the photodetector element 20 is amplified by the amplifier 104A and, after the band conforming to the carrier frequency is passed by the filter 104B, detected by the detector 104C. Thus, the carrier frequency component is removed by the integrator 104D thereby to reproduce the signal component. The signal component thus reproduced is shaped by the waveform shaper 104E, and input to the decoder unit 104F, so that the general command is decoded by the decoder unit 104F.

In similar fashion, the photodetector element 34 converts the light from the optical remote controller 14 or 72 with the authentication function into an electric current. The photodetector element 34 preferably has, on the front surface thereof, an optical filter (not shown) for passing the light conforming with the wavelength involved thereby to remove the effect of the external light disturbance. The current converted by the photodetector element 34 is amplified by the amplifier 100A and, after the band conforming to the carrier frequency is passed by the filter 100B, detected by the detector 100C. Thus, the carrier frequency component is removed by the integrator 100D thereby to reproduce the signal component. The signal component thus reproduced is shaped by the waveform shaper 100E, and input to the decoder unit 100F, so that the authentication command is decoded by the decoder unit 100F. A configuration conforming with the specification of the image acquisition device can be selected, that is, a configuration for decoding, of all the authentication commands described later with reference to FIG. 21, only the authentication mode switching command to switch the four authentication modes, a configuration for decoding also the commands relating to the reproduction or setting the limiting function, or a configuration for decoding all the commands with the authentication function including the image acquisition command.

By providing the sensor, the signal processing circuit and the decoder for the general command separately from these for the authentication command as described above, only the selected one of the authentication commands is decoded by the decoder unit 100F and notified to the main control unit 102 through the bus 118.

Figure 10A:
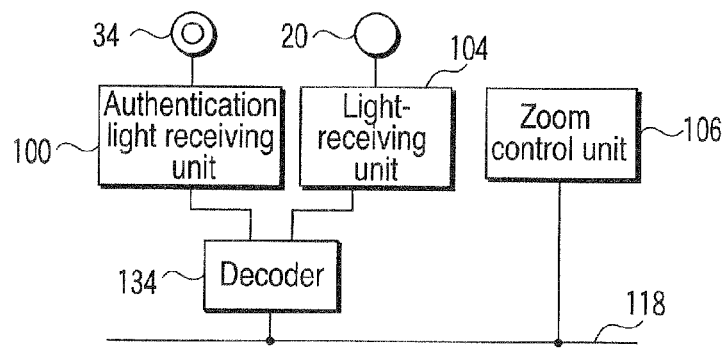
FIG. 10A is a diagram showing the configuration with a decoder shared by the decoder unit of the authentication light-receiving unit and the decoder unit of the light-receiving unit.
Figure 10B:
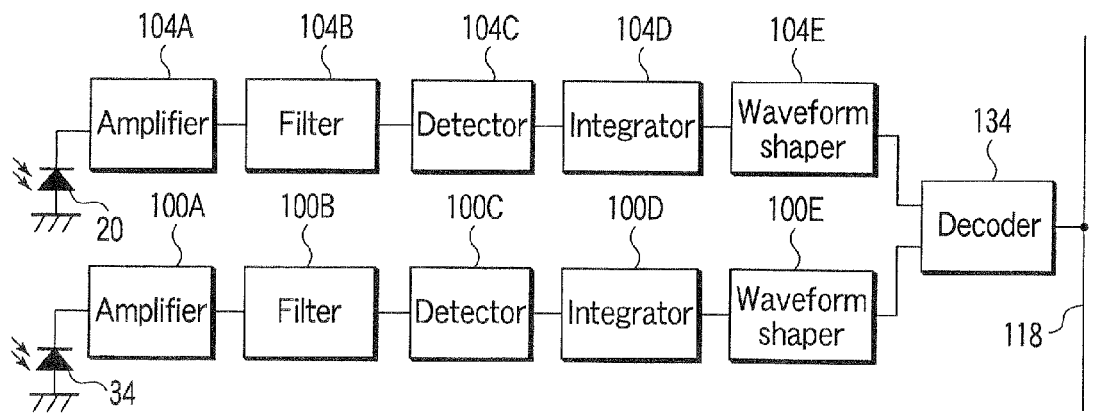
FIG. 10B is a block diagram showing the configuration of the authentication light-receiving unit and the light-receiving unit with a decoder shared by the decoder unit of the authentication light-receiving unit and the decoder unit of the light-receiving unit.

Incidentally, as shown in FIGS. 10A and 10B, the decoder 134 may be shared by the decoder units of the authentication light-receiving unit 100 and the light-receiving unit 104. In this case, the decoder 134 has both decode algorithms for the authentication command and the general command. The signals passed through the waveform shapers 100E, 104E of the light-receiving units 100, 104, respectively, are produced as digital signals. Therefore, the decoder 134 attempts to perform the decode operation using the two algorithms, and the command that can be decoded is input to the main control unit 102. In this way, the decoder units can share the same decoder.

Figure 11A:
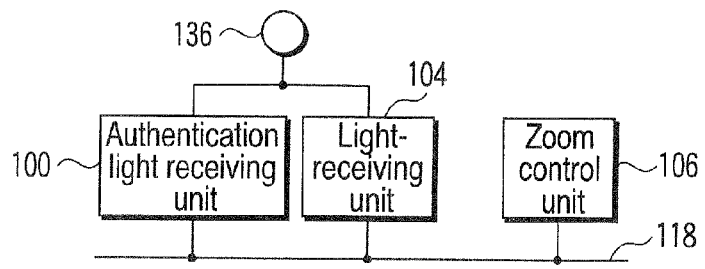
FIG. 11A is a diagram showing a configuration with one photodetector element used both as the photodetector element for the authentication command and as the photodetector element for the general command.
Figure 11B:
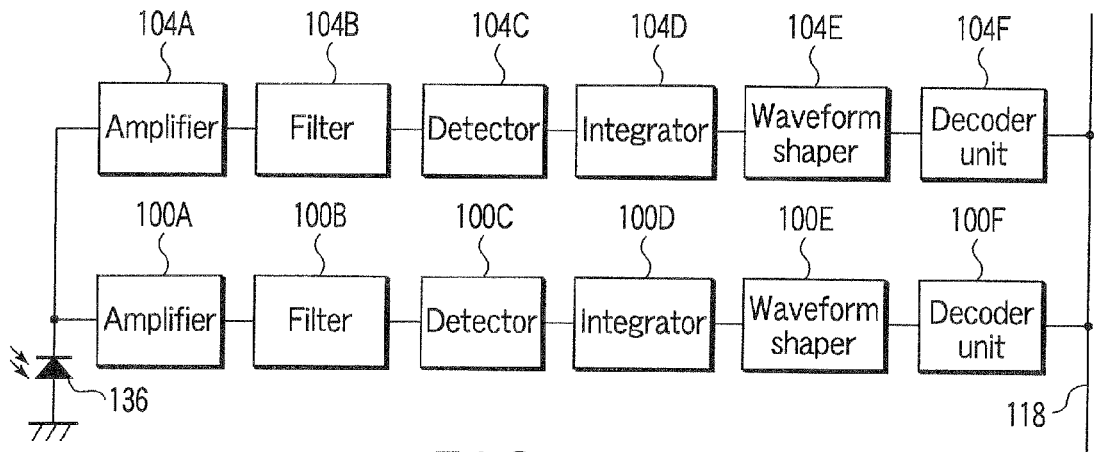
FIG. 11B is a block diagram showing a configuration of the authentication light-receiving unit and the light-receiving unit with one photodetector element used both as the photodetector element for the authentication command and as the photodetector element for the general command.

Also, as shown in FIGS. 11A and 11B, the photodetector element 34 for the authentication command and the photodetector element 20 for the general command may share a single photodetector 136. In this case, as long as the wavelength sensitivity of the photodetector element 136 is sufficiently high for the wavelength of the photodetector element in the light-emitting unit 56 of the optical remote controller 14 or 72, the photodetector element can be shared even in the case where the wavelength of the authentication command is different from that of the general command. In the case where the photodiode is used as the photodetector element 136, the spectral sensitivity characteristic can cover a wide range, from visible light to infrared light. In the case where the photodetector element is shared, one of the two wavelengths involved which is higher in transmittance is used as the characteristic of the optical filter conforming with the wavelength. Nevertheless, the optical filter may be done without.

Figure 12:
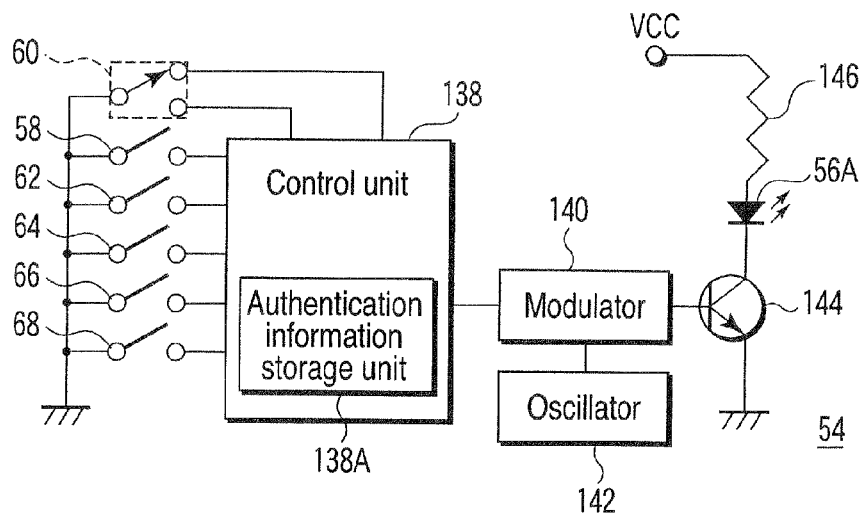
FIG. 12 is a block diagram showing the electrical configuration of the optical remote controller with the authentication function shown in FIG. 1.

The electrical configuration of the optical remote controller 14 with the authentication function is as shown in FIG. 12. The control unit 138 reads the state of the authentication setting switch 60 when any of the buttons 58, 62 to 68 is turned on and produces a command signal corresponding to the particular state. Also, the control unit 138 has an authentication information storage unit 138A with a nonvolatile memory for recording the fixed remote controller identification information as authentication information to identify the remote controller having the authentication function corresponding to the image acquisition device. The fixed remote controller identification information is recorded in the authentication information storage unit 138A desirably before factory shipment or distribution. Further, the fixed remote controller identification information is desirably encrypted to prevent illegal use.

The control unit 138 produces the signal as long as the button is kept depressed for a preset length of time. In the modulator 140, the carrier wave produced by the oscillator 142 is modulated by the signal from the control unit 138 thereby to drive the transistor 144 and a blink light-emitting element 56A the light-emitting unit 56. The resistor 146 is for limiting the current. The light-emitting element 56A is constituted of the infrared light-emitting diode having the wavelength of 900 to 950 nm in many cases. Nevertheless, the light of other wavelength or visible light may be used.

Incidentally, the electrical configuration of the optical remote controller 70 without the authentication function is similar to that of the optical remote controller 14 with the authentication function shown in FIG. 12, and therefore, is neither illustrated nor described. The optical remote controller 70 without the authentication function, however, is not provided with the authentication information storage unit 138A in the control unit 138.

Figure 13:
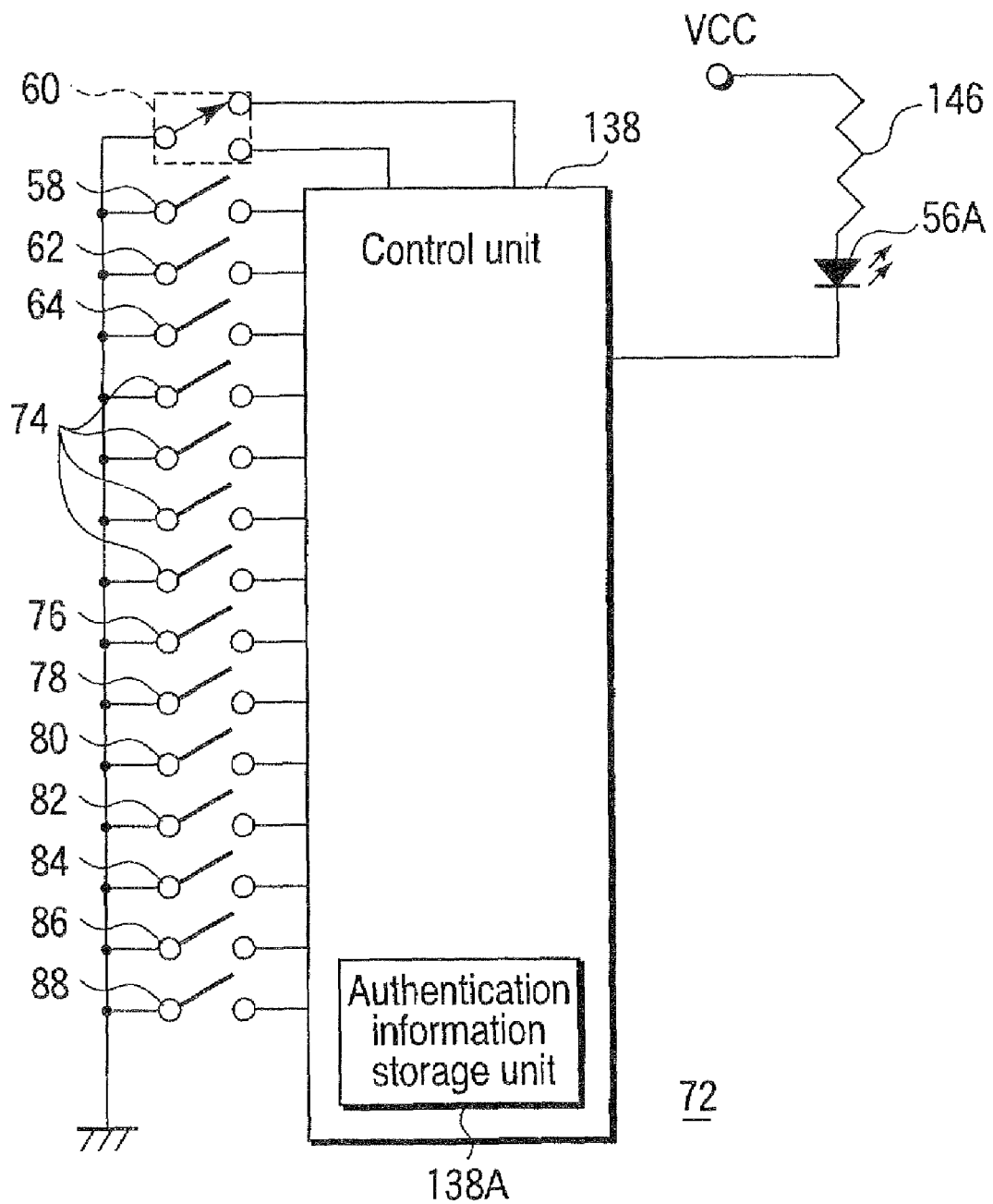
FIG. 13 is a block diagram showing the electrical configuration of the optical remote controller with the authentication function shown in FIG. 6.

The electrical configuration of the optical remote controller 72 with the authentication function is as shown in FIG. 13. Specifically, in the optical remote controller 72, the control unit 138 reads the state of the authentication setting switch 60 when any of the buttons and switches 58, 62, 64, 72 to 86 is turned on, and produces a command signal corresponding to the particular state. Also, the control unit 138 has an authentication information storage unit 138A with a nonvolatile memory to record the fixed remote controller identification information as authentication information for identifying the remote controller having the authentication function corresponding to the image acquisition device. The fixed remote controller identification information is recorded in the authentication information storage unit 138A desirably before factory shipment or distribution. Further, the fixed remote controller identification information is desirably encrypted to prevent illegal use.

The control unit 138 produces the signal as long as a button or switch is kept depressed for a preset length of time. In the case of the carrier frequency of 40 kHz, the use of a one-chip microcomputer as the control unit 138 capable of driving the light-emitting element 56A directly can generate a high-frequency modulation signal according to a program. As a result, the modulator 140, the oscillator 142 and the transistor 144 are omitted, and the light-emitting unit 56 connected to the power supply through the current-limiting resistor 146 is connected directly to the control unit 138.

Incidentally, the electrical configuration of the optical remote controller 90 without the authentication function is similar to that of the optical remote controller 72 with the authentication function shown in FIG. 13, and therefore, neither illustrated nor explained. The control unit 138 of the optical remote controller 90 without the authentication function, however, is not provided with the authentication information storage unit 138A.

Next, the signals produced in the optical remote controller 14, 70, 72 or 90 will be explained with reference to FIGS. 14 to 17.

Figure 14:
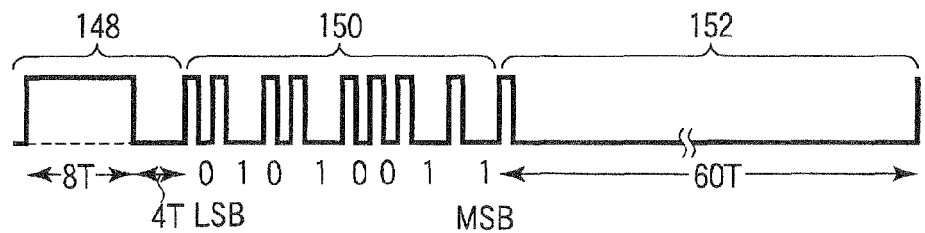
FIG. 14 is a diagram showing the fundamentals of a transmission data signal produced by the optical remote controller.
Figure 15:
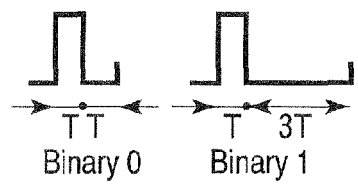
FIG. 15 is a diagram showing the structure of one bit of the data signal.

In transmitting the 1-byte data of 8 bits, the transmission data signal, as shown in FIG. 14, is configured of a leader code 148, an 8-bit data portion 150 and a stop code 152. FIG. 15 is a diagram showing the structure of one bit of the data signal. The binary "0" is expressed by one millisecond (ms) as the sum of the on and off states each equal to the signal unit time T of 500 microseconds (μs), and the binary "1" by 2 ms as the sum of the on state of 1T and the off state of 3T. The data signal shown in FIG. 14 includes the leader code 148 of 6 ms as the sum 12T of the on state of 8T and the off state of 4T, the 8-bit data ("01010011") having four binary 0s of 4 ms and four binary 1s of 8 ms for the total of 12 ms, and the stop code 152 having 60 T of 30 ms. Thus, the data signal has a total of 48 ms.

Figure 16:
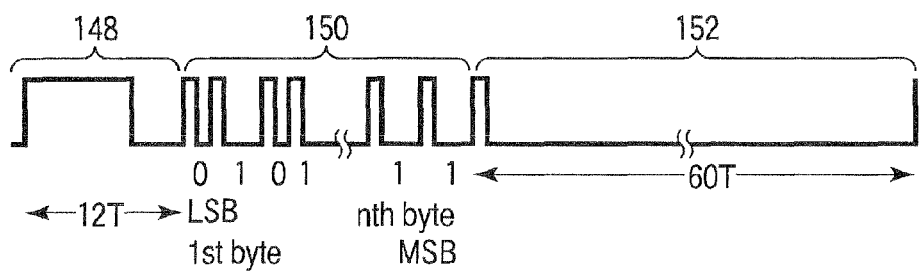
FIG. 16 is a diagram showing a case in which n bytes of data are transmitted.

In sending n bytes of data, as shown in FIG. 16, the leader code 148 is followed by n bytes of the data which in turn is followed lastly by the stop code 152.

Figure 17:
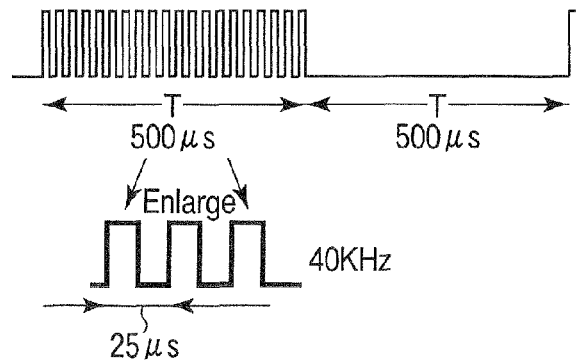
FIG. 17 is a diagram showing the output waveform of a modulation unit of the optical remote controller.

The output waveform as shown in FIG. 17 is produced by the modulator 140 of the optical remote controller 14 or 70 shown in FIG. 12. FIG. 17 shows the waveform of binary "0" obtained by modulating the carrier from the oscillator 142 with the data signal from the control unit 138 to drive the transistor 144. In the case of the carrier frequency of 40 kHz, 20 carrier wave pulses are inserted in 1T of 500 μs thereby to blink the light-emitting element 56A of the light-emitting unit 56.

This is also the case with the optical remote controller 72 or 90.

The light from the light-emitting unit 56 is reproduced by the photodetectors 20 and 32 in the form approximate to the modulated waveform substantially as shown in FIG. 17 which carries various forms of noise and the DC component. After removing the noise through the bandpass filter 104B of the carrier frequency 40 kHz, the signal waveform shown in FIG. 16 is reproduced by the detector 104C, the integrator 104D and the waveform shaper 104E, followed by being converted into the data by the decoder unit 104F.

Next, the data format of the commanding device information of the optical remote controller 14, 70, 72 or 90 will be explained.

The general command from the optical remote controller 70 or 90 without the authentication function, as shown in FIG.

Figure 18A:
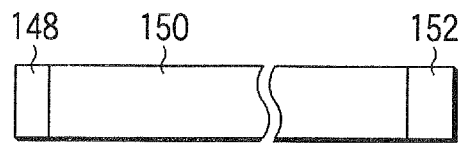
FIG. 18A is a diagram showing an example of the data format of the general command from the optical remote controller without the authentication function.
Figure 18B:
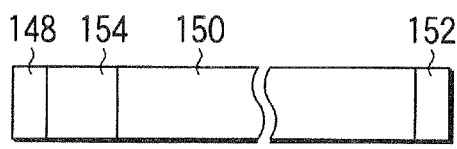
FIG. 18B is a diagram showing an example of the data format of the general command from the optical remote controller without the authentication function.
Figure 18C:
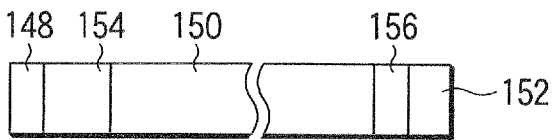
FIG. 18C is a diagram showing an example of the data format, of the general command from the optical remote controller without the authentication function.

18A, basically takes a form in which the data portion 150 indicating the content of the command is held between the leader code 148 and the stop code 152, and may be either fixed or variable in length. FIG. 18A corresponds to FIG. 16. Also, the general command, as shown in FIG. 18B, may be such that the data format or the type of the remote controller may be added in a fixed form with a header 154 attached before the data portion 150. Further, as shown in FIG. 18C, the data for error detection or the data for error correction (ECC 156) may be added after the data portion 150. As an alternative, the data bit pattern such as used in the commercially available remote controller for the home electronic appliances may be sent in an inverted form immediately following the data to detect the presence or absence of an error by coincidence or incoincidence between the two signals.

Figure 19A:
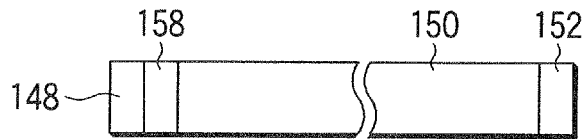
FIG. 19A is a diagram showing an example of the data format of the authentication command from the optical remote controller with the authentication function.
Figure 19B:
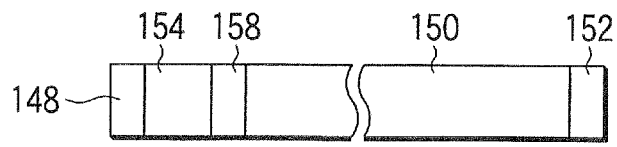
FIG. 19B is a diagram showing an example of the data format of the authentication command from the optical remote controller with the authentication function.
Figure 19C:
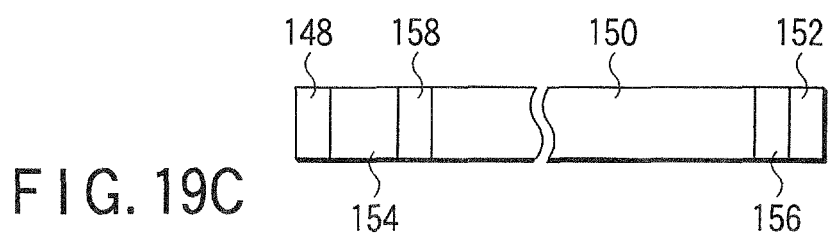
FIG. 19C is a diagram showing an example of the data format of the authentication command from the optical remote controller with the authentication function.

The fixed remote controller identification information is further added, as identification information, to the authentication command from the optical remote controller 14 or 72 with the authentication function. Specifically, in this case, as shown in FIGS. 19A to 19C, the fixed remote controller identification information 158 is added and transmitted independently. As an alternative, the fixed remote controller identification information 158 as the identification information can be transmitted in the form contained in a part of the data portion 150 or the header 154 (in which case the data format is as shown in FIGS. 18A to 18C).

This fixed remote controller identification information 158 is identical to the fixed remote controller identification information stored in the fixed remote controller identification information storage unit 102A of the main control unit 102 of the digital camera 10 explained above with reference to FIG. 8. The fixed remote controller identification information 158 is used to determine whether the remote controller that has transmitted the command is a legitimate one or not. As explained with reference to FIGS. 12 and 13, the same fixed remote controller identification information 158 is written in the authentication information storage unit 138A of the control unit 138 of the optical remote controllers 14, 72 with the authentication function paired with the digital camera 10. As a result, in the case where the remote controller 14 or 72 or the digital camera 10, whichever is broken or lost, is repurchased, therefore, the purchaser using the ID certificate or the like, can prove to the maker or the distributor that he/she is a legal owner and the article is not the stolen one, and thus can have the fixed remote controller identification information rewritten.

Figure 20A:
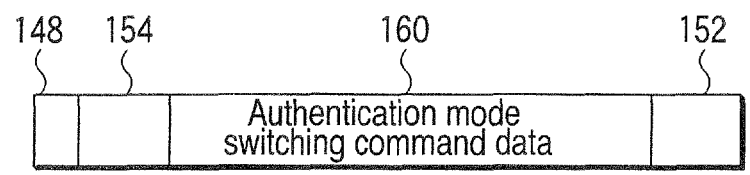
FIG. 20A is a diagram showing the data format of the authentication mode switching command as an authentication command of the optical remote controller with the authentication function.
Figure 20B:
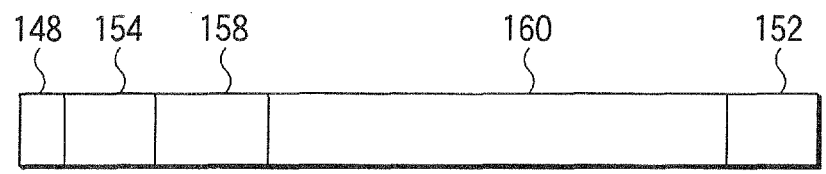
FIG. 20B is a diagram showing the data format of the authentication mode switching command as an authentication command of the optical remote controller with the authentication function.
Figure 20C:
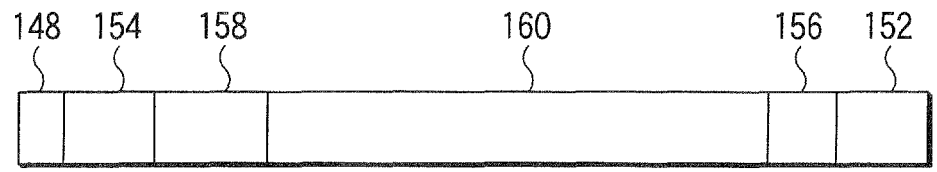
FIG. 20C is a diagram, showing the data format of the authentication mode switching command as an authentication command of the optical remote controller with the authentication function.

The data format of the authentication mode switching command as the authentication command of the optical remote controllers 14 and 72 with the authentication function is as shown in FIGS. 20A to 20C. The authentication mode switching command is transmitted in a case which the operation unit 60A of the authentication setting switch 60 of the optical remote controller 14 or 72 is set at the authentication position 60C, and the prohibit button or the button assigned to the limitation, setting or permission is depressed. Specifically, in such a case, as shown in FIG. 20A, for example, the authentication mode switching command data 160 corresponding to the depressed button is transmitted from the remote controller 14 or 72 in the form held between the leader code 148 and the stop code 152 or with the fixed remote controller identification information 158 added. As an alternative, as shown in FIG. 20B, the command is transmitted with the header 154 or further with the ECC 156 as shown in FIG. 20C. The signal of this format is received in the form of light by the photodetector element 34 or 136 in the camera proper 12 and converted into the authentication mode switching command by the decoder unit 100F or the decoder 134.

The authenticate on mode switching command data 160, for distinction from the general data, uses a character string not normally appearing. For example, as shown in FIG. 21, it is expressed with four characters such as "ZZAA", "ZZBB", "ZZCC" or "ZZDD". Although the number of characters is arbitrary, a combination of certain characters and a certain length is required so chat the authentication mode switching command can be positively distinguished.

Further, using the format shown in FIGS. 19A to 19C, the command may be transmitted with the n bytes of the data portion 150 containing the character string for the authentication mode switching command. For example, the switching to the prohibit mode may use "ZZNINSHO= AA", the switching to the limit mode "ZZNINSHO=BB", the switching to the setting mode "ZZNINSHO=CC", and the switching to the permit mode "ZZNINSHO=DD".

Next, the authentication mode of the camera proper 12 will be explained. As shown in FIG. 22, the authentication mode includes four types, i.e., "prohibit mode", "limit mode", "setting mode" and "permit mode".

The "prohibit mode" is the mode in which the use by other than the remote controller with the authentication function is prohibited. The camera proper 12 cannot be operated without the signal from the remote controller with the authentication function. Therefore, the remote controller with the authentication function is carried or held separately from the camera proper 12, and the camera proper 12 is set in prohibit mode. Assume that the camera proper 12 is set in prohibit mode in this way. Then, should the camera proper 12 alone be lost and acquired by a third party, the third party cannot use the camera proper 12. The camera proper 12, if lost while the remote controller is held or carried, cannot be used on the one hand, and the leakage of the images in the camera proper 12 is prevented at the same time. Incidentally, even in the prohibit mode, the holder of the remote controller with the authentication function can operate the camera proper 12 using the remote controller with the authentication function.

The "limit mode" is the one in which only the permitted, functions as described below with reference to FIG. 24 can be used in the remote controller with the authentication function and the remote controller without the authentication function. This limit mode is conveniently used in the case where the camera proper 12 is lent temporarily or used by the owner only for image acquisition with the erasure or transfer prohibited.

The "setting mode" is the mode in which the limited function in the limit mode can be set or changed using the remote controller with the authenticate ion function.

The "permit mode" is the mode in which the camera proper 12 can be freely used, i.e., the camera proper 12 is not locked and suitably used by the owner or his/her family members in a limited place such as a home where the risk of being stolen is low or in the case where the camera, proper 12 is lent to others with the images therein erased. In this permit mode, all the functions other than the switching of the authentication mode can be carried out even in a remote controller without the authentication function.

Next, the selection for designation and setting of the authentication mode at the time of switching on the power of the camera proper 12 will be explained with reference to FIG. 23. This setting operation can designate either the setting ("prohibit mode") forcing the entrance into prohibit mode regardless of the storage mode of the mode memory 120 using the menu at the time of switching on power, or the setting in the authentication mode ("mode memory storage mode") stored in the mode memory 120 at the time of switching on power. This designation is made in such a manner that the authentication mode setting screen is displayed by menu at the time of switching on power, the plus button 66 and the minus button 68 of the optical remote controller 14 with the authentication function or the arrow switch 74 of the optical remote controller 72 with the authentication function is used for selection, and the operation is established by the image acquisition command button 58. The result of this setting can be held in the mode memory 120 or the nonvolatile memory in the main control unit 102.

By making the arrangement to set in "prohibit mode" at the time of switching on power, the camera proper 12 cannot be used alone without issuing a command from the remote controller with the authentication function or without switching to another authentication mode by the remote controller with the authentication function. In other words, the camera proper 12 can be locked. In the case where the arrangement is made to set in "mode memory storage mode" at the time of switching on power, on the other hand, the camera proper 12 enters the mode stored in the mode memory 120. Thus, the camera proper 12 can be used freely if in permit mode, or in accordance with the available function setting if in limit mode. In prohibit or setting mode, the remote controller with the authentication function is required. Once switched to permit or limit mode, however, the prohibit timer 132 starts and upon lapse of a set time, the prohibit mode is entered.

Next, the functions available in limit mode will be explained with reference to FIG. 24. Upon depression of a setting switch of the remote controller with the authentication function (the authentication setting switch 60 and the wide-angle button 64 for the optical remote controller 14; and the authentication setting switch 60 and the print button 80 for the optical remote controller 72), the setting mode is entered. In this setting mode, the functions shown in FIG. 24 and the limiting flag are displayed on the monitor 36, and the item can be selected by the plus button 66 and the minus button 68 of the optical remote controller 14 or the arrow switch 74 of the optical remote controller 72, as the case may be. Then, the item can be set by the operation using the image acquisition command button 58 to establish whether the operation is possible or impossible. The result of the setting is held in the mode memory 120 or the nonvolatile memory in the main controller 102 as a function limiting table.

In this case, a still image or a dynamic image can be acquired by the display "image acquisition possible".

In the case of the display "play possible", the image in the built-in memory 96 and the removable memory 98 can be reproduced. Further, the functions available in play mode can be set in detail. Specifically, the erasure is possible in "erase possible", the transfer to the personal computer is possible in "transfer possible", the printing on the printer is possible in "print possible", and the image can be edited in "edit possible".

In "menu possible", the image acquisition conditions, etc., can be changed.

Also, as described above, in the case where the switches or buttons of the camera proper 12 are depressed, the CPU of the main control unit 102 of the camera proper 12 is interrupted or reset and the corresponding operation is performed. FIG. 25 is a diagram showing the outline of this operation. Each corresponding operation will be described in detail later. For the present purpose, the corresponding operation is explained taking the digital camera 10 as an example. Depending on the type of the image acquisition device, the corresponding switch or button may be absent or have a different name.

Assuming that the power switch 28 is depressed with the camera proper 12 in power off state, the power is switched on, and the CPU of the main control unit 102 is reset, thereby starting the operation. In the case where the power switch 28 is depressed with power on, on the other hand, the operation is ended and power supply is switched off.

Once the select switch 32 is turned, the present state is ended and transferred to a new state. Upon depression of the shutter switch 26, the "shutter switch operation flag" is set. This flag is read by the program, and the image acquisition operation starts or ends. Upon depression of the menu button 42, the menu is displayed on the monitor 36, and the setting can be changed by the arrow switch 38 and the OK button 40. Upon another depression of the menu button 42 while the menu is being displayed, the menu operation is ended. Upon depression of the zoom switch 44 on the T or W side, the zoom control unit 106 is driven. Upon depression of any part of the arrow switch 38, the corresponding switch flag is set. Upon depression of the OK button 40, the OK button flag is set. Upon depression of the erase button 46, the erase confirmation menu is displayed on the monitor 36, and upon depression of the corresponding confirmation switch, the erasure is executed. Upon depression of the print button 48, the print menu is displayed on the monitor 36, followed by a predetermined print operation.

The flag set as described above may be cleared either at the time when it is read for an application or after a switch or a button held depressed (during the on state) is turned off.

Next, with reference to FIG. 26, an explanation will be given about the outline of the operation of the camera proper 12 corresponding to the case where a switch or a button of the remote controller is depressed. Depending on the type of remote controller, the corresponding button, etc., may be absent. The camera proper 12, after power is switched on, is kept ready to receive the signal from the remote controller and perform the corresponding operation. Once the signal from the remote controller is caught, the program being executed by interrupt is suspended, and the signal from the remote controller is received, so that as explained with reference to FIGS. 18A to 20C, the receiving data of the data format of the remote controller is stored in a predetermined memory, and the operation is performed in keeping with the intended meaning.

Further, in the case of a remote controller with the authentication function, in order to determine whether the particular remote controller is legitimate or not, the fixed remote controller identification information recorded in the fixed remote controller identification information storage unit 102A on the camera proper 12 side is compared with the fixed remote controller identification information 158 from the remote controller with the authentication function. Further, the fixed remote controller identification information is used to identify the remote controller with the authentication function in the case where the authentication setting switch 60 of the remote controller with the authentication function is set to the authentication position 60C or in the case where the image acquisition device is in prohibit mode and operated in response to only the command from the remote controller.

In the remote controller without the authentication function such as the optical remote controller 70 or 90, the fixed remote controller identification information is not used, but only the function not limited by the limit mode and the permit mode can be used. It cannot be used in prohibit mode.

In the camera proper 12 that has received the command from the remote controller, the CPU of the main controller 102 performs each operation corresponding to the result of decoding the data received from the remote controller, in the manner described below.

Specifically, upon depression of the image acquisition command button 58 of the optical remote controller 12, 70, 72 or 90, the image acquisition command flag is set. In the image acquisition mode, this flag is read by the program to perform the operation of starting or ending the image acquisition operation. In the setting mode, the selection item is established only for the remote controller 14 or 72 with the authentication function. Upon depression of the telephoto button 62 or the wide-angle button 64 of the remote controller 14, 70, 72 or 90, the zoom control unit 106 is driven. Upon depression of the plus button 66 or the minus button 68 of the optical remote controller 14 or 70, the corresponding switch flag is set.

Upon depression of any part of the arrow switch 74 of the optical remote controller 72 or 90, the corresponding switch flag is set. Upon depression of the OK button 76 of the optical remote controller 72 or 90, the OK button flag is set. Upon depression of the information button 82 of the optical remote controller 72 or 90, the information of the image being displayed is displayed on the monitor 36, and upon another depression, the display of the particular information is suspended. Upon depression of the print button 80 of the optical remote controller 72 or 90, the print menu is displayed on the monitor 36, followed by performing a predetermined printing operation. Upon depression of the menu button 78 of the optical remote controller 72 or 90, the menu is displayed on the monitor 36, and can be set or changed by the arrow switch 74 and the OK button 76. Upon another depression of the menu button 78 while the menu is being displayed, the menu operation is ended. Upon depression of the erase button 84 of the optical remote controller 72 or 90, the erasure confirmation menu is displayed on the monitor 36. Upon depression of a corresponding confirmation button, the erasure of the image being displayed is executed. Upon depression of the protection button 88 of the optical remote controller 72 or 90, the protection flag is attached to the image displayed on the monitor 36. In the case where an attempt is made to erase this image with the protection flag by the operation of the erase button 84, an alarm to prevent the erroneous erasure is displayed on the monitor 36, so that the erasure is executed by selecting the erasure execution. Upon depression of the protection button 88 while the image with the protection flag is being displayed, the protection flag is cleared. Upon depression of the rotation button 86 of the optical remote controller 72 or 90, the image displayed on the monitor 36 is rotated 90 degrees clockwise, and further depression rotates the image 90 degrees counterclockwise regarding to the original image. Still further depression restores the original image.

Incidentally, the remote controller with the authentication function may have independent buttons, including a limit button, a prohibit button, setting button and a permit button. In this remote controller with the authentication function, a limit command is transmitted and the image acquisition device is switched to the limit mode upon depression of the limit button. A prohibit command is transmitted and the image acquisition device is switched to the prohibit mode upon depression of the prohibit button. A setting command is transmitted and the image acquisition device is switched to the setting mode upon depression of the setting button. A permit command is transmitted and the image acquisition device is switched to the permit mode upon depression of the permit button.

Next, the transition of the authentication mode will be explained with reference to FIG. 27. In the case where the power switch 28 is turned on (step S12) with the power off (step S10), the authentication mode setting designation and the mode memory storage mode are read at the time of power on as explained in FIG. 23 thereby to determine whether the prohibit mode is in effect or not (step S14). On determining that the prohibit mode is in effect, the prohibit mode M1 is set.

On determining in step S14 that other than the prohibit mode is in effect, on the other hand, determination is made as to whether the permit mode is in effect or not (step S16). On determining that the permit mode is in effect, the permit mode M4 is entered.

On determining in this step (step S16) that the permit mode is not in effect, determination is made whether the limit mode is in effect or not (step S18). On determining that the limit mode is in effect, the limit mode M2 is set. On determining that neither the limit mode is in effect, on the other hand, the setting mode M3 is set.

The transition between the modes can be switched also by the authentication mode switching command with the remote controller identification information from the optical remote controllers 14, 72 with the authentication function, and the transition is made as shown by the prohibit command, the limit command, the permit command and the setting command in the drawing.

Further, in the case where the camera proper 12 is switched to the limit mode M2 or the permit mode M4 in which the camera proper 12 can be used for some purpose, the prohibit timer 132 in the camera proper 12 begins to count from that particular time point (step S20). Upon lapse of a preset time, the camera proper 12 is automatically switched to the prohibit mode M1 and cannot subsequently be used without the remote controller with the authentication function. In order to cancel the prohibit mode M1, the remote controller with the authentication function is required. Even after the power of the camera proper 12 is switched off, the prohibit timer 132 continues to count, and upon lapse of a predetermined time, the prohibit mode M1 is automatically entered. Therefore, the camera proper 12, even if lost in permit mode M4 or limit mode M2, cannot be used upon lapse of the preset time. The set time can be designated on menu by the user, and may be 10 minutes, one hour, one day or one week. By setting the prohibit timer 132 to a short time, the owner can use the camera proper 12 freely in permit mode M1 without taking the trouble of operating the remote controller with the authentication function each time. Also, should the camera be stolen, the fact that the prohibit mode M1 is entered in a short time can secure comparative safety.

In the case where the power switch 28 is depressed again (step S22) and the power is switched off, the authentication mode in effect is held in the mode memory 120 (step S24). Then, the power-off state is obtained (step S10).

Next, the state transition and the process in the image acquisition device will be explained with reference to FIGS. 28A to 28F. Although the case in which the image acquisition device is the digital camera 10 is explained as an example, the digital movie camera 52 can be also handled in similar manner except for the switch operation, etc.

Figure 28A:
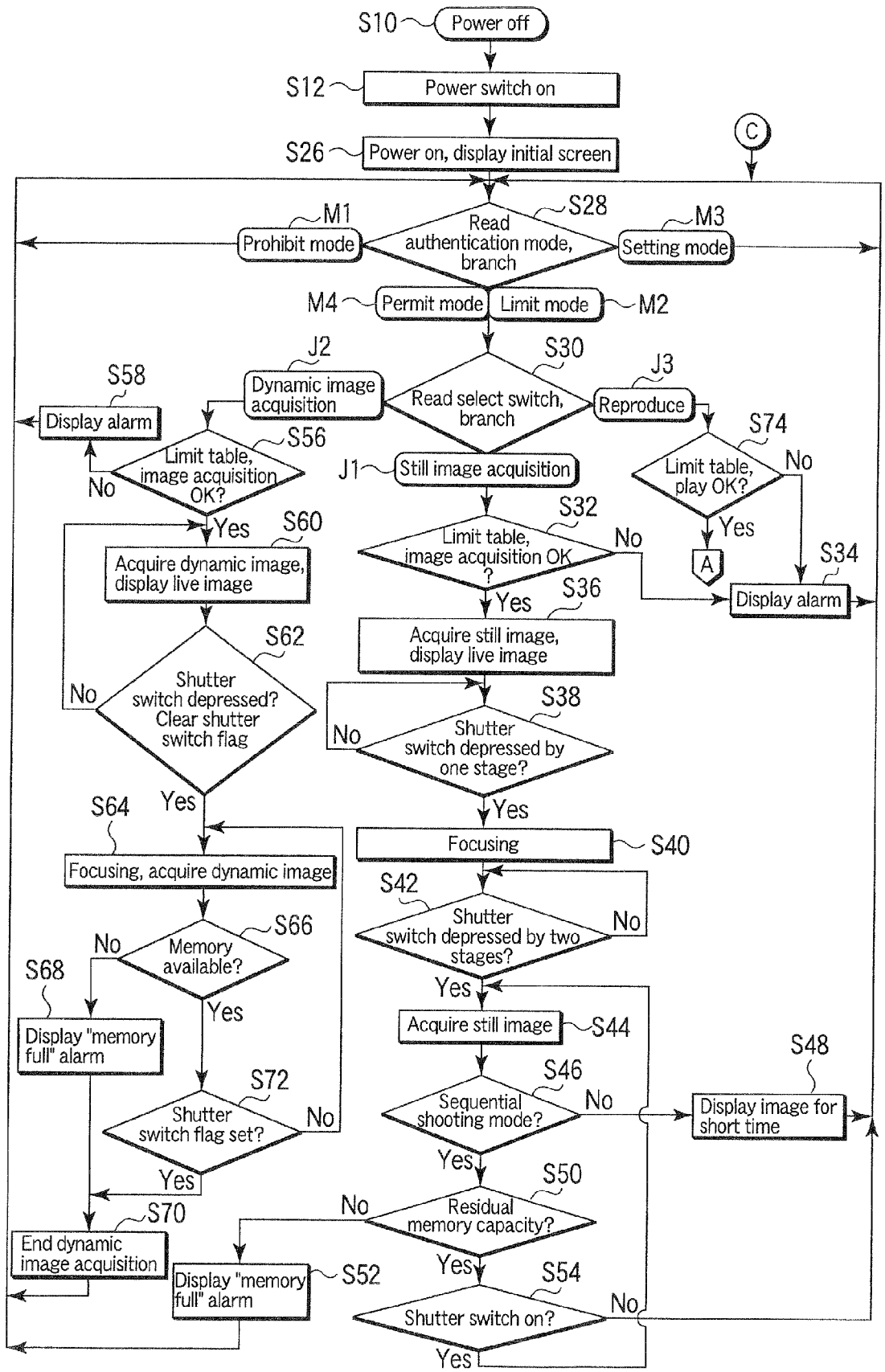
FIG. 28A is a diagram showing a first part of a series of flowcharts for explaining the process and the status transition in the image acquisition device.

First, the image acquisition mode will be mainly explained. Upon depression of the power switch 28 (step S12) with the power off (step S10) as shown in FIG. 28A, the power of the camera proper 12 is switched on, and the initial screen is displayed on the monitor 36 (step S26). A mark, etc., indicating the residual capacity of the battery is displayed on this initial screen. After that, as explained with reference to FIG. 27, the authentication mode setting designation with power on and the storage mode of the mode memory 120 are read, and the operation branches in accordance with the mode (step S28).

On determining that the permit mode M4 or the limit mode M2 is in effect, the state of the select switch 32 is read, and the operation branches to the still image acquisition mode U1, the dynamic image acquisition mode J2 or the play mode J3 (step S30).

In the case where the still image acquisition mode J1 is selected by the select switch 32 in limit mode, the function limit table held in the mode memory 120 or the nonvolatile memory in the main control unit 102 is read to determine whether the image acquisition operation is permitted or not (step S32). On determining that the image acquisition operation is not permitted, an alarm is displayed on the monitor 36 (step S34), and after waiting for a preset time, the process is returned to step S28. In this case, as long as the limit table is not rewritten by switching to the setting mode using the optical remote controller 14 or 72 with the authentication function, the processing loop of step S28, step S30, step S32, step S34, step S28 and so forth is circulated in that order. In such a case, the alarm display may be limited only for the first circulation or once every predetermined number of circulations in step S34.

On determining that the image acquisition operation is permitted by the function limit table in limit mode or the permit mode is in effect, on the other hand, the live image is displayed on the monitor 36 while at the same time displaying the current number of the image acquisition pixels consumed and the remaining number of available image frames (step S36). After waiting until the first stage of the shutter switch 26 turns on (step S38), the image is focused (step S40), followed by waiting until the second stage of the shutter switch 26 is reached (step S42). Once the second stage of the shutter switch 26 turns on, the still image is acquired (step S44). After that, whether the sequential shooting mode is set or not is checked (step S46). In the case where the sequential shooting mode is not in effect, the acquired image is displayed on the monitor 36 for a short time (step S48), after which the process returns to step S28.

In the case where the sequential shooting mode is set, on the other hand, checking whether the residual capacity of the built-in memory 96 and/or the removable memory 98 is not less than a predetermined amount (step S50), and in the case where the residual capacity is less than the predetermined amount, a "memory full" alarm is displayed on the monitor 36 (step S52), after which the process returns to step S28. In the case where the residual memory capacity is not less than the predetermined amount, on the other hand, checking whether the shutter switch 26 is kept on or not (step S54) and in the case where it is off, the process returns to step S28. In the case where the shutter switch 26 is on, on the other hand, the process returns to step S44, and the next still image is acquired.

In the case where the dynamic image acquisition mode J2 is selected by the select switch 32 in step S30 in limit mode, on the other hand, the function limit table held in the mode memory 120 or the nonvolatile memory in the main control unit 102 is read to determine whether the image acquisition operation is permitted or not (step S56). On determining that the image acquisition operation is not permitted, an alarm is displayed on the monitor 36 (step S58) and after waiting until a preset time arrives, the process returns to step S28. In this case, as long as the limit table is nor rewritten by switching to the setting mode using the optical remote controller 14 or 72 with the authentication function, the processing loop of step S28, step S30, step S56, step S58, step S28 and so forth is circulated in that order. In such a case, the alarm display may be limited only for the first circulation or once every predetermined number of circulations in step S54.

On determining that, the image acquisition operation is permitted according to the function limit table in limit, mode or in the case where the permit mode is in effect, on the other hand, the live image is displayed on the monitor 36 together with the available image acquisition time with the current number of image acquisition pixels consumed (step S60). By determining whether the shutter switch 26 is turned on or not, by the shutter switch flag which is set upon depression of the shutter switch 26 (step S62), the process returns to step S60 and the live image continues to be displayed if the shutter switch flag is not set.

Once the shutter swatch flag is set, the particular shutter switch flag is cleared, after which the focusing operation is performed and the dynamic image begins to be acquired (step S64). While the dynamic image is being acquired, the residual capacity of the built-in memory 96 and/or the removable memory 98 is checked (step S66). In the case where the residual memory capacity is less than a predetermined amount, the "memory full" alarm is displayed on the monitor 36 (step S68), after which the dynamic image ceases to be acquired (step S70), and the process returns to step S28. In the case where the residual memory capacity is not less than the predetermined amount, on the other hand, whether the shutter switch flag is set or not is confirmed (step S72), and in the case where it is clear, the process returns to step S64 and the dynamic image continues to be acquired. Once the shutter switch flag is set, the process advances to step 870 to end the dynamic image acquisition, after which the process returns to step S28. In this way, the dynamic image continues to be acquired after the depression of the shutter switch 26 until it is depressed again.

In the case where the play mode J3 is selected by the select switch 32 in step S30 in limit mode, on the other hand, the function limit table held in the mode memory 128 or the nonvolatile memory in the main control unit 110 is read to determine whether the reproduction is permitted or not (step S74). On determining that the reproduction is not permitted, the process proceeds to step S34 to display an alarm on the monitor 36, after which the process returns to step S28 at a preset time. In this case, as long as the limit table is not rewritten by switching to the setting mode using the optical remote controller 14 or 72 with the authentication function, the processing loop of step S28, step 330, step S74, step S34, step S28 and so forth is circulated in that order. In such a case, the alarm display may be limited only for the first circulation or once every predetermined number of circulations in step S34.

Figure 28B:
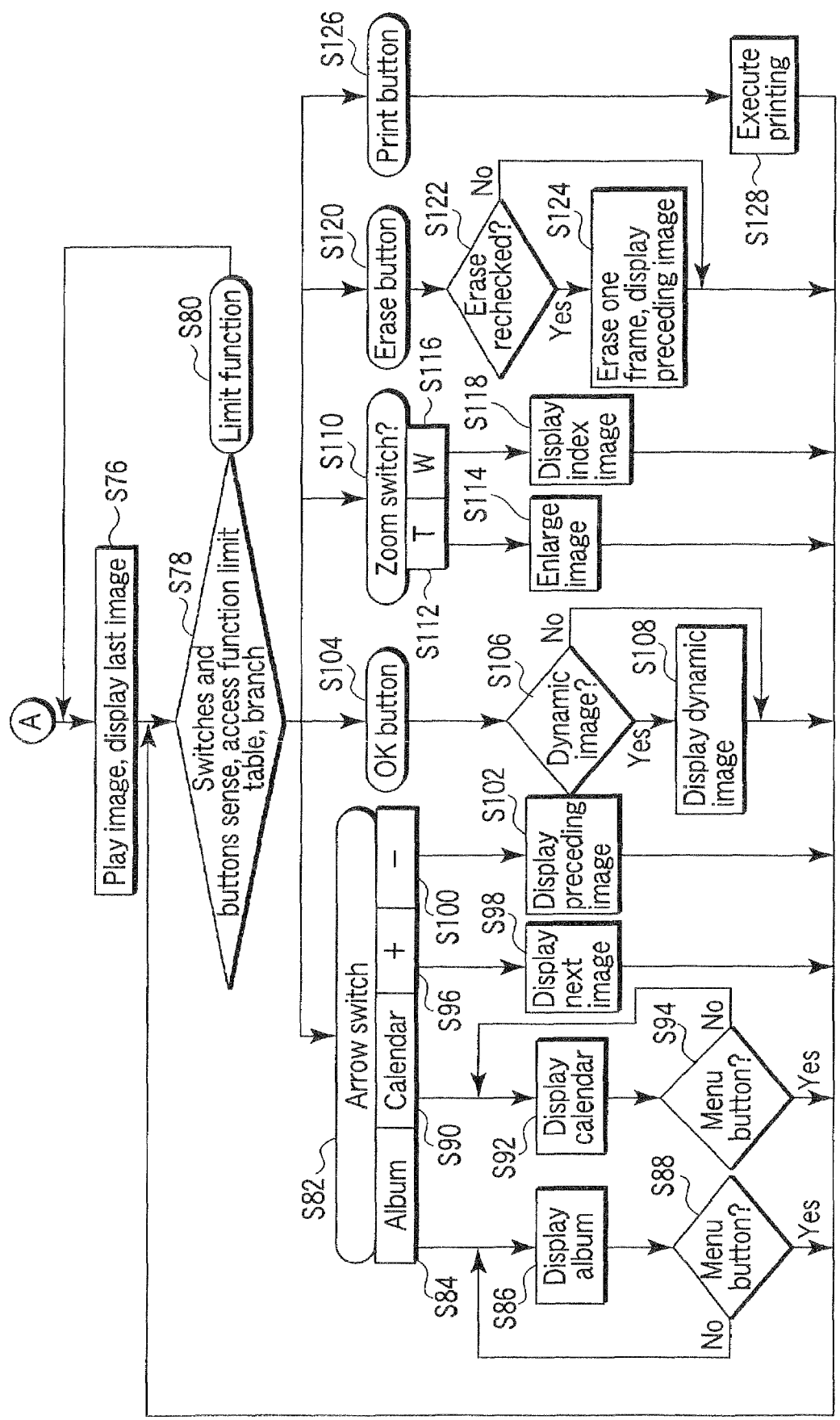
FIG. 28B is a diagram showing a second part of a series of flowcharts for explaining the process and the status transition in the image acquisition device.

In the case where the reproduction is permitted in limit mode or in the case where the permit mode is in effect, the play mode is entered as shown in FIG. 28B. Specifically, the last one of the images recorded in the built-in memory 96 and the removable memory 98 is displayed on the monitor 36 (step S76). Next, whether any of the switches or buttons is depressed or not is checked, and in the case where it is depressed in limit mode M2, whether the limit function is involved or not is checked based on the function limit table (step S78). On determining that the limit function is involved (step 380), the process returns to step S76 ignoring the depression of the switches or buttons.

In the case where the switch or button involves no limit function or the permit mode is in effect, on the other hand, the corresponding operation described below is performed.

Specifically, assume that the arrow switch 38 of the camera proper 12 is depressed (step S82). In the case where the lower part (album) of the arrow switch 38 is depressed (step S84), the image recorded in the album (step 386) is displayed on the monitor 36. Upon depression of the menu button 42 while the particular image is being displayed (step S88), the album display function is ended and the process returns to step S78. Incidentally, the album is defined as a function in which the access point to each one of a group of images relating to a given event is written in the index information held separately from the image group so that upon designation of the album name, a series of the images about the event can be collectively displayed or otherwise collectively handled.

Upon depression of the upper part (calendar) of the arrow switch 38 (step S90), on the other hand, the images recorded for the current month are displayed in calendar form on the monitor 36 (step S92). Further, the arrow switch 38 makes it possible to display the images for the previous months or an image acquired on a selected day. Upon depression of the menu button 42 or 76 while this image is being displayed (step S94), the calendar display function is ended, and the process returns to step S78.

Also, upon depression of the right part (+) of the arrow switch 38 (step S96), the next image is displayed (step S98) and then the process returns to step S78. In the case where the current image is the last one, the first image is displayed. Also, upon depression of the left part (−) of the arrow switch 38 (step S100), on the other hand, the previous image is displayed (step S102), after which the process returns to step S78. Incidentally, in the case where the current image is the first one, the last image is displayed.

In the case where the OK button 40 is depressed (step S104), whether the current image is a dynamic one or not is confirmed (step S106), and in the case where it is not a dynamic image, the depression of the OK button 40 is ignored, and the process returns to step S78. In the case where the current image is a dynamic one, on the other hand, the dynamic image is displayed (step S108), and the process returns to step S78.

Upon depression of the zoom switch 44 (step S110) in the case where the T button is involved (step S112), the image being displayed is enlarged (step S114), and the process returns to step S78. Upon depression of the W button while the image is displayed in enlarged form, the display of one-frame image is restored. In the case where the W button is involved (step S116), the image being displayed is reduced as an index display (step S118) and the process returns to step S78. Each time the W button is depressed, a list of four, nine, sixteen and twenty five frames is displayed in that order. Each time the T button is depressed while the reduced list is being displayed, on the other hand, the display returns to the descendant order of 25, 16, 9, 1 and 1 frame. Incidentally, upon depression of the telephoto button 62 or the wide-angle button 64 of the remote controllers 12, 70, 88, the result is similar to the case in which the T button or the W button of the zoom switch 44 is depressed.

Upon depression of the erase button 46 (step S120), the confirmation as to whether the image is really erased or not is displayed on the monitor 36 (step S122), and in the case where the erase suspension is selected, the process returns to step S78 without erasure. In the case where the execution of the erase operation is selected, on the other hand, the particular frame is erased and the immediately preceding image is displayed (step S124), followed by returning to step S78. Incidentally, in the case where the image to be erased is protected, an alarm, indicating that the image being displayed is to be protected is displayed on the monitor 36, and the selection to execute the erasure is ignored.

Upon depression of the print button 48 (step S126), the required printing operation such as the transmission of the image to the printer is performed (step S128), and the process returns to step S78.

Also, in the case where step S28 determines that the prohibit mode M1 or the setting mode M3 is in effect, the operation is performed only by the authentication command from the optical remote controller 14 or 72 with the authentication function. On determining that the prohibit mode M1 or the setting mode M3 is in effect, therefore, only the determination process of step S28 is repeated.

Figure 28C:
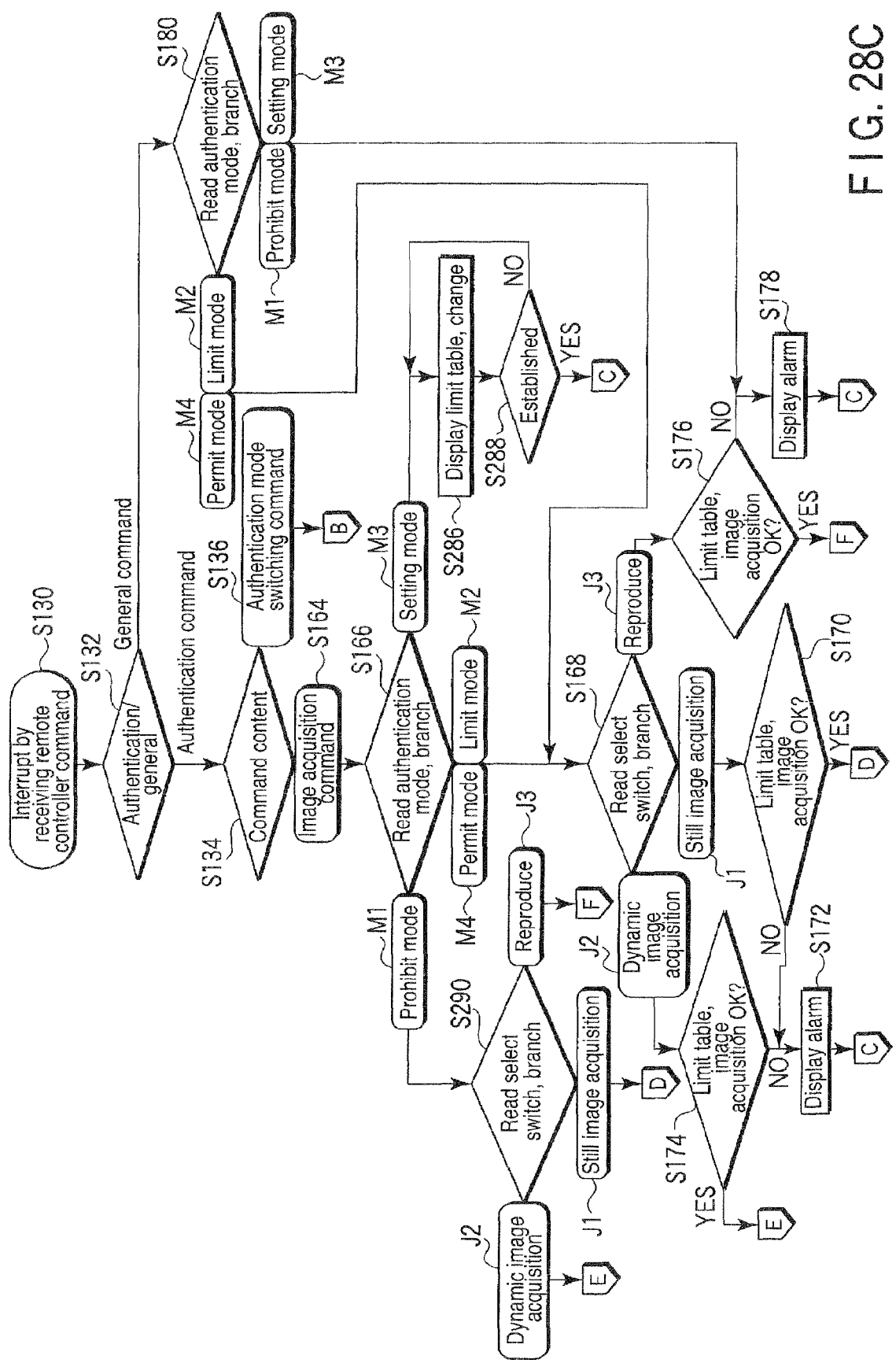
FIG. 28C is a diagram showing a third part of a series of flowcharts for explaining the process and the status transition in the image acquisition device.

Upon receipt of the command from the optical remote controller 14 or 72 with the authentication function or the optical remote controller 70 or 90 without the authentication function, as shown in FIG. 28C, the CPU of the main control unit 102 is interrupted (step S130), and then followed by the determination as to whether the command received from the particular remote controller is the authentication command or the general command (step S132).

Figure 28D:
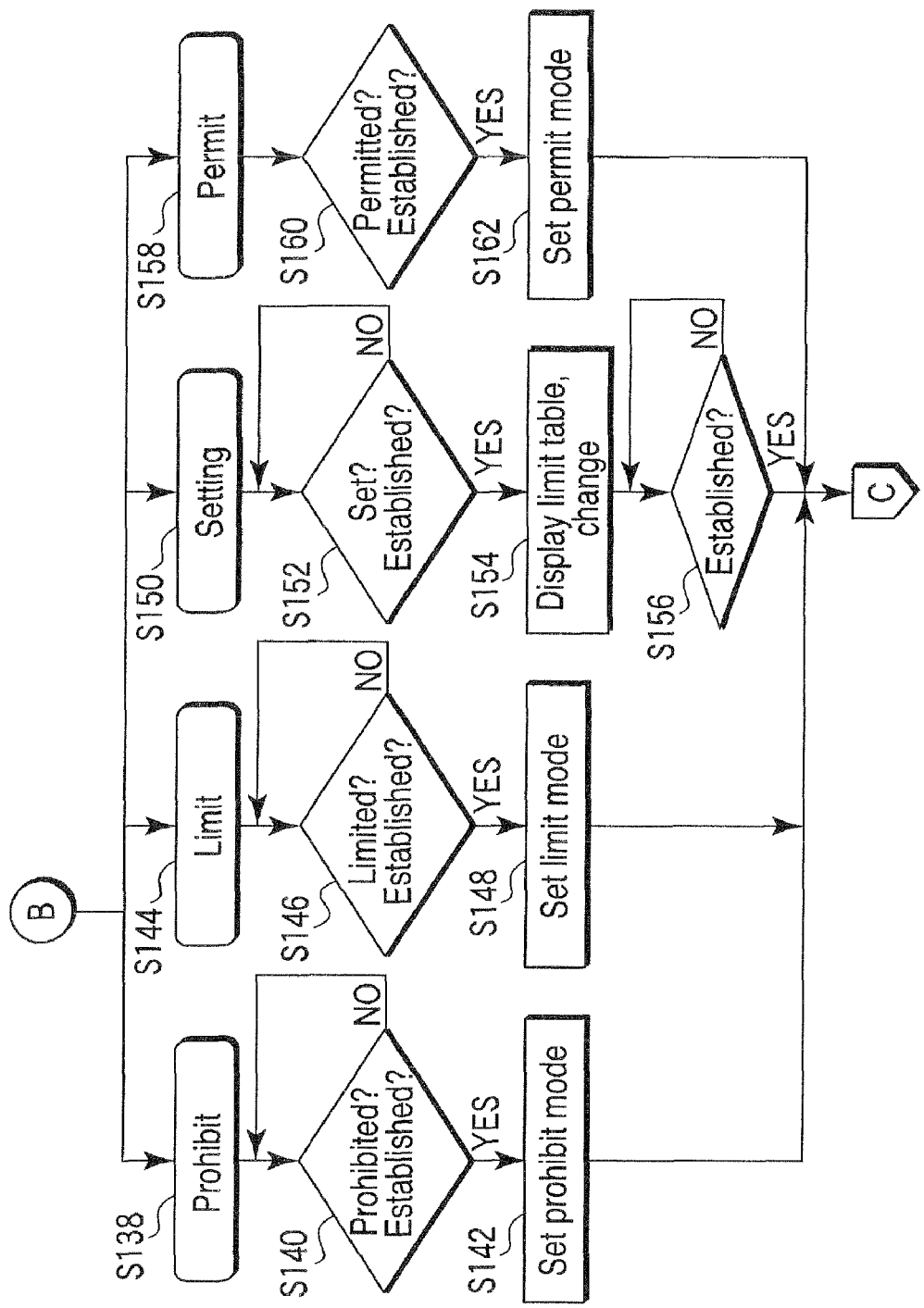
FIG. 28D is a diagram showing a fourth part of a series of flowcharts for explaining the process and the status transition in the image acquisition device.

On determining that the authentication command is received from the optical remote controller 14 or 72 with the authentication function, the content of the particular authentication command is determined (step S134). On determining that the authentication mode switching command is received (step S136), as shown in FIG. 28D, the operation is selectively executed in accordance with the content of the command. Incidentally, the operation corresponding to this authentication mode switching command is executed in all the authentication modes including, but not limited to, the prohibit mode.

Specifically, in the case where the authentication mode switching command is the prohibit command (step S138), the confirmation of the setting of the prohibit mode is displayed on the monitor 36, and this mode is determined as establishment in the case where the image acquisition execution command is sent as an authentication command from the optical remote controller 14 or 72 with the authentication function (step S140). Then, the storage mode of the mode memory 120 is set to the prohibit mode M1 (step 142), and the process returns to step S28. By setting the prohibit mode M1 and returning to step S28 in this way, only the determination process of step S28 is repeated, and the operation of the switches and buttons of the camera proper 12 is not accepted, and only the operation of the optical remote controller 14 or 72 with the authentication function is accepted. The confirmation screen in step S140, though inserted for preventing the erroneous touching of the buttons of the remote controller and for confirmation of the important function of switching the authentication mode, may be done without.

Further, in the case where the authentication mode switching command is the limit command (step S144), the confirmation of the setting of the limit mode is displayed on the monitor 36, and upon receipt of the image acquisition execution command as an authentication command from the optical remote controller 14 or 72 with the authentication function, the limit mode is determined as established (step 3146). Then, the storage mode of the mode memory 120 is set to the limit mode M2 (step S148) and the process returns to step S28. By thus setting the limit mode M2, only the operation permitted by the limit table can be performed in accordance with the operation of the switches or buttons on the camera proper 12 or the authentication command or the general command from the optical remote controller 14, 70, 72 or 90. Incidentally, the confirmation screen in step S146, though inserted for preventing the erroneous touching of the buttons of the remote controller and for confirmation of the important function of switching the authentication mode, may be done without.

Further, in the case where the authentication mode switching command is the setting command (step S150), the confirmation of the setting of the setting mode is displayed on the monitor 36, and with the arrival of the image acquisition execution command as an authentication command from the optical remote controller 14 or 72 with the authentication function, the setting mode is determined as established (step S152). Then, the storage mode of the mode memory 120 is set to the setting mode M3, and the process is executed to display and change the limit table on the monitor 36 (step S154). Incidentally, the confirmation screen for step S152, though inserted for preventing the erroneous touching of the buttons of the remote controller and for confirmation of the important function of switching the authentication mode, may be done without. Also, in the process executed to display and change the limit table in step S154 described above, the function and the state of the limit flag in the function limit table shown in FIG. 24 are displayed on the monitor 36, and the limit function is selected in circulation while at the same time setting and changing the on/off state of the flag using the plus and minus buttons 66, 68, the telephoto button and the wide-angle button 62, 64 or the cross button 74 and the OK button 76 of the remote controller. Once the setting change is complete, the image acquisition command button 58 is depressed. With the arrival of the image acquisition execution command, therefore, the content thereof is established and held in the mode memory 120 or the nonvolatile memory in the main control unit 102 (step S156), followed by returning to step S28. After setting the setting mode M3 in this way and returning to step S28, only the determination process in step S28 is repeated, so that only the operation of the optical remote controller 14 or 72 with the authentication function is accepted and not the operation of the switches and buttons on the camera proper 12.

Further, in the case where the authentication mode switching command is the permit command (step S158), the confirmation of the setting of the permit mode is displayed on the monitor 36, and with the arrival of the image acquisition execution command as an authentication command from the optical remote controller 14 or 72 with the authentication function, the permit command is determined as established (step S160). Then, the storage mode of the mode memory 120 is set to the permit mode M4 (step S162) and the process returns to step S23. By setting the permit mode M4 in this way, the operation of the switches or buttons on the camera proper 12 or all the operations corresponding to the authentication command or the general command from the optical remote controller 14, 70, 72 or 90 can be performed after the process returns to step S28. Incidentally, the confirmation screen for step S160, though inserted for preventing the erroneous touch of the buttons of the remote controller and for confirmation of the important function of switching the authentication mode, may be done without.

Also, on determining in step S134 that the content of the authentication command is the image acquisition command (step s164), the storage mode of the mode memory 120 is read and the operation branches in accordance with the particular mode (step S166).

On determining that the permit mode M4 or the limit mode M2 is in effect, the state of the select switch 32 on the camera proper 12 is read, and the operation branches in accordance with whether the still image acquisition mode J1, the dynamic image acquisition mode J2 or the play mode J1 is in effect (step S168).

In the case where the still image acquisition mode J1 is selected by the select switch 32 and the limit mode is in effect, the function limit table held in the mode memory 12C or the nonvolatile memory in the main control unit 102 is read, thereby determining whether the image acquisition operation is permitted or not (step S170). On determining that the image acquisition operation is not permitted, an alarm is displayed on the monitor 36 (step S172), and after waiting for a preset time, the process returns to step S28. In this case, as long as the limit table is not rewritten by switching to the setting mode using the optical remote controller 14 or 72 with the authentication function, the processing loop of step S28, step S30, step S32, step S34, step S28 and so forth is circulated in that order. In such a case, the alarm display may be limited only for the first circulation or once every predetermined number of circulations in step S34.

On determining that the image acquisition operation is permitted by the function limit table in limit mode or in the case where the permit mode is in effect, in contrast, the process is transferred to the operation of acquisition of the still image by the operation of the remote controller as shown in FIG. 28E.

In the case where the select switch 32 selects the dynamic image acquisition mode J2 in step S168 and the limit mode is in effect, on the other hand, the function limit table held in the mode memory 120 or the nonvolatile memory of the main control unit 102 is read to determine whether the image acquisition is permitted or not (step S174). On determining that the image acquisition is not permitted, the process advances to step S172 in which an alarm is displayed on the monitor 36, and after waiting for a preset time, the process returns to step S28. In this case, as long as the limit table is not rewritten by switching to the setting mode using the optical remote controller 14 or 72 with the authentication function, the processing loop of step S28, step S30, step S56, step S58, step S28 and so forth is circulated in that order. In such a case, the alarm display may be limited only for the first circulation or once every predetermined number of circulations in step S58.

On determining that the image acquisition is permitted by the function limit table in limit mode or the permit mode is in effect, in contrast, the process transfers to the operation of the remote controller to acquisition of a dynamic image as shown in FIG. 28E.

Further, in the case where the select switch 32 selects the play mode J3 in step S168 and the limit mode is in effect, the function limit table held in the mode memory 120 or the nonvolatile memory of the main control unit 102 is read, thereby determining whether the reproduction is permitted or not (step S176). In the case where the determination is that the reproduction is not permitted, an alarm is displayed on the monitor 36 (step S178), and after waiting for a preset time, the process returns to step S28. In this case, as long as the limit table is not rewritten by switching to the setting mode using the optical remote controller 14 or 72 with the authentication function, the processing loop of step S28, step S30, step S74, step S34, step S28 and so forth is circulated in that order. In such a case, the alarm display may be limited only for the first circulation or once every predetermined number of circulations in step S34.

In the case where the reproduction is permitted and the limit mode is in effect or in the case where the permit mode is in effect, in contrast, the play operation is performed by manipulation of the remote controller as shown in FIG. 28E.

Also, on determining in step S132 that the general command is received from the optical remote controller 70 or 90 without the authentication function, the storage mode of the mode memory 120 is read, and the process branches in accordance with the particular mode (step S180).

On determining that the permit mode M4 or the limit mode M2 is in effect, the process advances to step S168. Also, on determining that the prohibit mode M1 or the setting mode M3 is in effect, the camera proper 12 cannot be operated by the general command from the optical remote controller 70 or 90 without the authentication function, and therefore, by advancing to step S172, an alarm on a preset time is displayed on the monitor 36, after which the process returns to step S28. Once the process is returned to step S28, only the determination process of step S28 is repeated, and the operation of the switches or buttons on the camera proper 12 is never accepted. As described above, in the case where the permit mode M4 or the limit mode M2 is in effect, the operation of the optical remote controller 70 or 90 without the authentication function is not accepted and the operation can be performed only by the optical remote controller 14 or 72 with the authentication function.

In the image acquisition operation of acquisition of a still image by the operation of the remote controller in the permit mode M4 or the limit mode M2, as shown in FIG. 28E, a live image is displayed on the monitor 36 (step S182), and the determination is made as to whether the authenticate on command from the optical remote controller 14 or 72 with the authentication function or the general command from the optical remote controller 70 or 90 without the authentication function received in step S130 is an image acquisition execution command or not (step S184). On determining that the authentication command or the general command is the image acquisition execution command, the focus operation is performed (step S186) and a still image is acquired (step S188). After that, whether the sequential shooting mode is set or not is checked (step S190). In the case where the sequential shooting mode is not in effect, the acquired image is displayed on the monitor 36 for a short time (step S192), after which the process returns to step S28. In this case, the process proceeds from step S28 to step S30, step S32, step S36 and so on in that order, and the image acquisition operation of acquisition of the next still image by the shutter switch 26 of the camera proper 12 becomes possible. Further, the operation of acquisition of the next still image is made possible by the interruption of the command received from the optical remote controller 14, 70, 72 or 90.

On determining in step S190 that the sequential shooting mode is set, on the other hand, the residual capacity of the built-in memory 96 and/or the removable memory 98 is checked to see whether it is not less than a predetermined amount (step S194). In the case where the residual capacity is less than the predetermined amount, a "memory full" alarm is displayed on the monitor 36 (step S196), after which the process returns to step S28. In this case, the process proceeds from step S28 to step S30), step S32, step S36 and so on in that order. Although the sequential shooting is impossible, due to rack of residual memory capacity, the operation of acquisition of the next still image by the shutter switch 26 of the camera proper 12 becomes possible. Further, the operation of acquisition of the next still image is also possible due to the interruption from the command reception from the optical remote controller 14, 70, 72 or 90.

Further, on determining in step S194 that the residual memory capacity is sufficient, on the other hand, whether the image acquisition execution command has arrived or not from the optical remote controller 14, 70, 72 or 90 is confirmed (step S198), and in the case where the image acquisition execution command has arrived, the process returns to step S188 to acquire the next image. Specifically, as long as the image acquisition command button 58 of the optical remote controller 14, 70, 72 or 90 is kept depressed, the sequential shooting is carried out. In the case where the image acquisition execution command fails to arrive, on the other hand, the process returns to step S28. In this case, the process proceeds from step S28 to step S30, step S32, step S36 and so on in that order. The operation of acquisition of the next still image by the shutter switch 26 of the camera proper 12 becomes possible. Further, the operation of acquisition of the next still image is also possible due to the interruption from the command reception from the optical remote controller 14, 70, 72 or 90.

Also, in the case where step S184 determines that the received authentication command or general command is net the image acquisition execution command, whether the authentication command or general command is the T button command as the result of depression of the telephoto button 62 of the optical remote controller 14, 70, 72 or 90 or not is determined (step S200). On determining that the T button command is involved, the lens unit 16 is driven to the telephoto side as long as the T button command comes (step S202), and once the T button command stops, the drive is suspended and the process returns to step S23. In this case, the process proceeds from step S28 to step S30, step S32, step S36 and so on in that order. The operation of acquisition of the next still image by the shutter switch 26 of the camera proper 12 becomes possible. Further, the operation of acquisition of the next still image is also possible due to the interruption from the command reception from the optical remote controller 14, 70, 72 or 90.

On determining in step S200 that the T button command is not received, on the other hand, whether the authentication command or general command is the W button command due to the depression of the wide-angle button 64 of the optical remote controller 14, 70, 72 or 90 or not is determined (step S204). On determining that the W button command is involved, the lens unit 16 is driven to the wide-angle side as long as the W button command arrives (step S206), and once the W button command is stopped, the drive is suspended, and the process returns to step S28. On determining in step S204 that the to button command is not involved, the process returns to step S28. In these cases, the process proceeds from step S28 to step S30, step S32, step S36 and so on in that order. The operation of acquisition of the next still image by the shutter switch 26 of the camera proper 12 becomes possible. Further, the operation of acquisition of the next still image is also possible due to the interruption from the command reception from the optical remote controller 14, 70, 72 or 90.

In the image acquisition operation of acquisition of a dynamic image by the operation of the remote controller in the permit mode M4 or the limit mode M2, on the other hand, as shown in FIG. 28E, a live image is displayed on the monitor 36 (step S208) while at the same time determining whether the image acquisition execution command flag is on or not; the flag being turned on in accordance with the reception of the image acquisition execution command upon depression of the image acquisition command button 58 of the optical remote controller 14, 70, 72 or 90 (step S210). On determining that the image acquisition execution command flag is set, determination is made as to whether the dynamic image is being acquired or not while at the same time clearing the image acquisition execution command flag (step S212). On determining that the dynamic image is not being acquired, on the other hand, the focusing operation is performed and the dynamic image acquisition operation started (step S214). Then, the residual memory capacity of the built-in memory 96 and/or the removable memory 98 is checked (step S216). In the case where the residual memory capacity is less than a predetermined amount, the "memory full" alarm is displayed on the monitor 36 (step S218) thereby to end the dynamic image acquisition operation (step S220), and the process returns to step S28. In this case, the process proceeds from step S28, step S30, step S56, step S60 and step S62 in that order and the loop of step S60 and step S62 is repeated. In the process, the user, already informed from the alarm indication in step S218 that a dynamic image can no longer be acquired, turns the select switch 32 of the camera proper 12.

On determining in step S216 that the residual memory capacity is sufficient, on the other hand, the process returns to step S214 and the dynamic image acquisition operation is continued.

Further, on determining in step S212 that a dynamic image is being acquired, the process advances to step S220, which ends the image acquisition operation, and then returns to step S28. Specifically, a dynamic image is acquired in response to the command of the remote controller from the time when the image acquisition execution command is received upon depression of the image acquisition command button 58 of the optical remote controller 14, 70, 72 or 90 to the time when the image acquisition execution command is received due to the next depression of the image acquisition command button 58. Specifically, upon receipt of the image acquisition execution command during the loop of step S214 to step S216 to step S214, the operation from step S130 is executed by interruption, and on determining in step S212 that, a dynamic image is being acquired, the image acquisition operation is ended. In the case where the acquisition of a dynamic image is ended in this way and the process returns to step S28, the process advances from step S28, step S30, step S56, step S60 and step S62 in that order, and the loop of step S60 and step S62 is repeated. As a result, the acquisition of the next dynamic image by the shutter switch 26 of the camera proper 12 becomes possible. The operation of acquisition of the next dynamic image is also made possible by the interrupt due to the command reception from the optical remote controller 14, 70, 72 or 90.

On determining in step S210 that the image acquisition execution command flag is not on, the process proceeds to step S200 to determine whether the T button command is in effect or not. As described above, on determining that the T button command is involved, the lens unit 16 is driven to the telephoto side as long as the T button command comes (step S202), and once the T button command stops, the drive is suspended and the process returns to step S28. In the case where the T button command is received in a dynamic image acquisition loop in steps S214 and S216, the lens unit 16 is driven by interrupt, and the zoom-up image acquisition becomes possible. Once the process returns to step S28, the process advances from step S28, step S30, step S56, step S60 and step S62 in that order and the loop of step S60 and step S62 is repeated. At the same time, a dynamic image acquisition loop of steps S214 and S216 is continuously executed, and a dynamic image continues to be acquired until the process proceeds to step S220 due to the interruption upon receipt of the image acquisition execution command by the depression of the image acquisition command button 58 of the optical remote controller 14, 70, 72 or 90.

Further, on determining in step S200 that the T button command is not involved, determination is made as to whether the W button command is involved or not (step S204), and in the case where the W button command is in effect, the lens unit 16 is driven to the wide angle side as long as the W button command continues to arrive (step S206). Once the W button command ceases to arrive, the drive is suspended and the process returns to step S28. Also in this case, like in the case of the T button command, the zoom-down image acquisition operation is performed if a dynamic image is being acquired, and a dynamic image continues to be acquired until interrupted by the reception of the next image acquisition execution command.

Further, on determining in step S204 that neither the W button command is involved, the process returns to step S8 without doing anything.

As described above, in the case where a dynamic image is being acquired, the dynamic image acquisition operation can be ended or the zoom operation can be performed by the interrupt due to the reception of the image acquisition execution command or the T or W but con command from the optical remote controller 14, 70, 72 or 90.

With regard to the dynamic image, the recording time can be limited to, say, 15 seconds, and in accordance with the memory capacity corresponding to the number of seconds of the particular time, the residual memory capacity is determined in step S216. In this way, the dynamic image acquisition operation can be automatically ended.

In the play operation by the operation of the remote controller in the permit mode M4 or the limit mode M2, on the other hand, the last image recorded in the built-in memory 96 or the removable memory 98 is displayed on the monitor 36, thereby performing the operation corresponding to the switches and buttons of the optical remote controller 14 or 72 with the authentication function or the optical remote controller 70 or 90 without the authentication function.

Figure 28F:
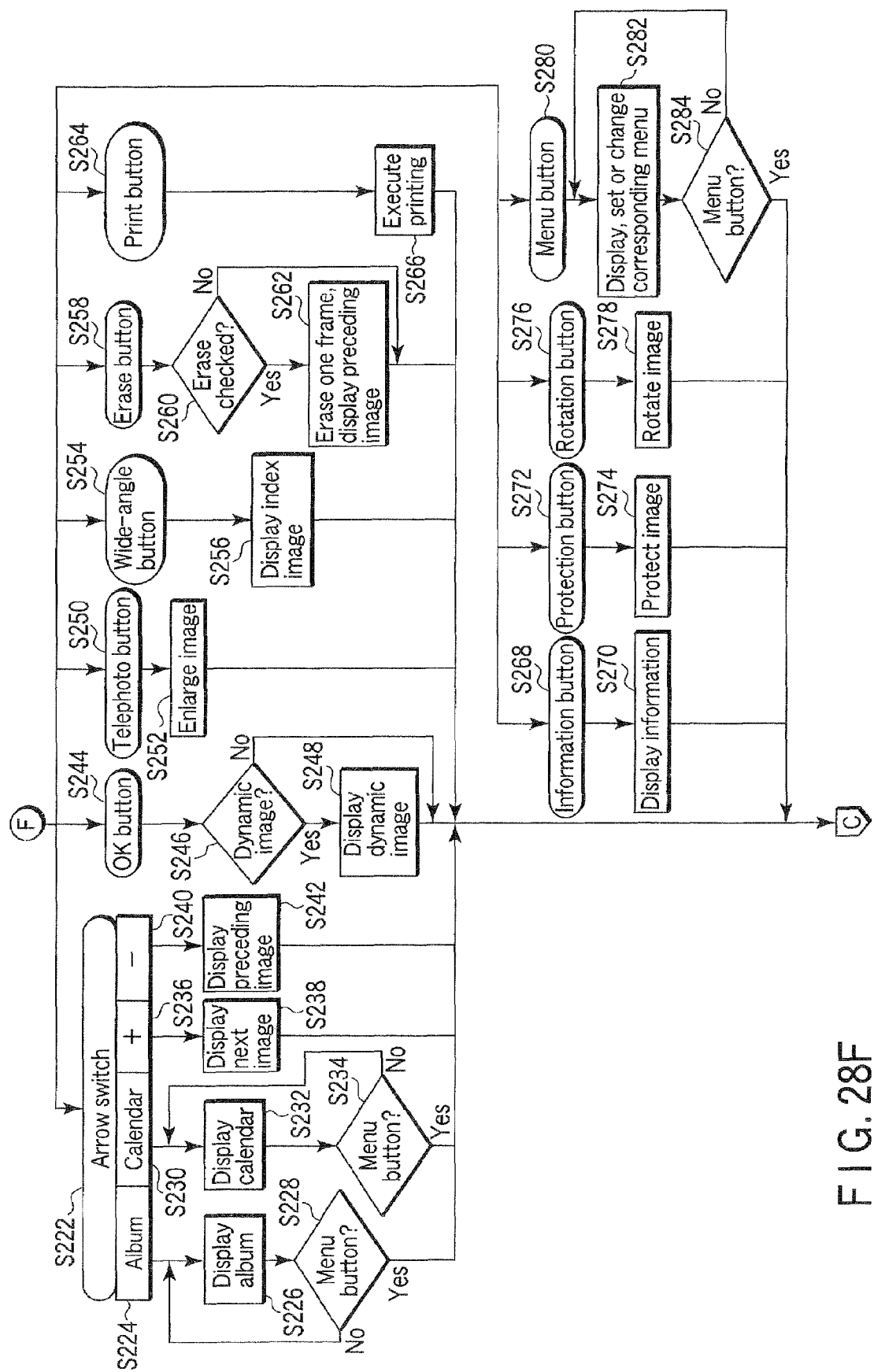
FIG. 28F is a diagram showing a sixth part of a series of flowcharts for explaining the process and the status transition in the image acquisition device.

Specifically, as shown in FIG. 28F, in the case where the authentication command or the general command received from the remote controller in step S130 is the operation command for the arrow switch 74 of the optical remote controller 72 or 90 (step S222), and in the case where the operation is the down operation command (album) by down switch operation of the arrow switch 74 (step S224), then the image recorded in the album is displayed on the monitor 36 (step S226). Upon depression of the menu button 76 of the optical remote controller 72 or 90 while this image is being displayed (step S226), the album display function is ended and the process returns to step S28. In this case, the process advances from step S28 to step S30, step S74, step S76, step S78 and so on, in that order, and in accordance with the switches or buttons of the camera proper 12, the play operation becomes possible. The play operation or other operations are also made possible by the interruption due to the command reception from the optical remote controller 14, 70, 72 or 90.

In the case of the up operation command (calendar) by the up switch operation of the arrow switch 74 (step S230), on the other hand, the images recorded for the current month are displayed in calendar form on the monitor 36 (step S232). Further, the images for the previous months or the images acquired for the selected day can be selected and displayed by the arrow switch 74. Upon depression of the menu button 78 during this display (step S234), the calendar display function is ended and the process returns to step S28. In this case, the process advances from step S28 to step S30, step S74, step S76, step S78 and so on, in that order, and in accordance with the switches or buttons of the camera proper 12, the play operation becomes possible. The play operation or other operations are also made possible by the interruption due to the command reception from the optical, remote controller 14, 70, 72 or 90.

Also, in the case of the right operation command by the right switch operation of the arrow switch 74 (step S236), the next image is displayed on the monitor 36 (step S238), and the process returns to step S28. Incidentally, assuming that, this right switch is operated in the case where the current image is the last one, the first image is displayed. In this case, the process advances from step S28 to step S30, step S74, step S76, step S78 and so on, in that order, and in accordance with the switches or buttons of the camera proper 12, the play operation becomes possible. The play operation or other operations are also made possible by the interruption due to the command reception from the optical remote controller 14,

70, 72 or 90. The display in step 376 after returning to step S28, however, maintains the display of the image updated in step S238.

Also, in the case of the left operation command due to the left switch operation of the arrow switch 74 (step S240), the previous image is displayed on the monitor 36 (step S242) and the process returns to step S28. Incidentally, in the case where the current image is the first one, the last image is displayed by the left switch operation. In this case, the process advances from step S28 to step S30, step S74, step S76, step S78 and so on, in that order, and in accordance with the switches or buttons of the camera proper 12, the play operation becomes possible. The play operation or other operations are also made possible by the interruption due to the command reception from the optical remote controller 14, 70, 72 or 90. The display in step S76 after returning to step S28, however, maintains the display of the image updated in step S238.

Further, in the case where the authentication command or the general command received from the remote controller in step S130 is the OK command due to the operation of the OK button 76 of the optical remote controller 72 or 90 (step S244), whether the current image is a dynamic image or not is checked (step S246), and if not a dynamic image, it is ignored and the process returns to step S28. In the case where it is a dynamic image, on the other hand, the particular dynamic image is displayed (step S248), and the process returns to step S28. In these cases, the process advances from step S28 to step S30, step S74, step S76, step S78 and so on, in that order, and in accordance with the switches or buttons of the camera proper 12, the play operation becomes possible. The play operation or other operations are also made possible by the interruption due to the command reception from the optical remote controller 14, 70, 72 or 90. The display in step S76 after returning to step S28, however, maintains the display of the image displayed in step S248.

In the case where the authentication command or the general command received from the remote controller in step S130 is the T button command issued by the operation of the telephoto button 62 of the optical remote controller 14, 70, 72 or 90 (step S250), the image displayed on the monitor 36 is enlarged (step S252) and the process returns to step S28. In this case, the process advances from step S28 to step S30, step S74, step S76, step S78 and so on, in that order, and in accordance with the switches or buttons of the camera proper 12, the play operation becomes possible. The play operation or other operations are also made possible by the interruption due to the command reception from the optical remote controller 14, 70, 72 or 90. The display in step S76 after returning to step S28, however, maintains the display of the image enlarged in step S252.

Also, in the case where the authentication command or the general command received from the remote controller in step S130 is the W button command issued by the operation of the wide-angle button 64 of the optical remote controller 14, 70, 72 or 90 (step S254), on the other hand, the image displayed on the monitor 36 is reduced and displayed in the form of index (step S256), and the process returns to step S28. In this case, the process advances from step S28 to step S30, step S74, step S76, step S78 and so on, in that order, and in accordance with the switches or buttons of the camera proper 12, the play operation becomes possible. The play operation or other operations are also made possible by the interruption due to the command reception from the optical remote controller 14, 70, 72 or 90. The display in step S76 after returning to step S28, however, maintains the reduced list display of step S256.

Incidentally, in the reduced list display in step S256, 4 frames, 9 frames, 16 frames and 25 frames can be sequentially displayed as a list each time the wide-angle button 64 is depressed. Also, each depression of the telephoto button 62 during the reduced list display returns the display from 25 frames to 16 frames, 9 frames, 4 frames and 1 frame in that order in step S252.

Upon depression of the wide-angle button 64 during the enlarged display in step S252 which is made in accordance with the depression of the telephoto button 62 during the normal image display, on the other hand, the operation of restoring the enlarged display to the original size is performed in step S256.

Also, in the case where the authentication command or the general command received from the remote controller in step S130 is the erase command due to the operation of the erase button 84 of the optical remote controller 72 or 90 (step S258), the confirmation as to whether the image is really erased or not is displayed on the monitor 36 (step S260), and in the case where the erase suspension is selected, the process returns to step S28 without erasure. In this case, the process advances from step S28 to step S30, step S74, step S76, step S78 and so on, in that order, and in accordance with the switches or buttons of the camera proper 12, the play operation becomes possible. The play operation or other operations are also made possible by the interruption due to the command reception from the optical remote controller 72 or 90.

On determining in step S260 that the execution of the erasure is selected, on the other hand, the particular frame is erased and the immediately preceding image is displayed (step S262), followed by returning to step S28. Incidentally, in the case where the image to be erased is protected, an alarm indicating that the image is protected is displayed on the monitor 36, and the execution of the erasure is ignored. After returning to step S28, the process advances from step S28 to step S30, step S74, step S76, step S78 and so on in that order, thereby making possible the play operation corresponding to the switches and buttons of the camera proper 12. The play operation or other operations are also made possible by the interruption due to the command reception from the optical remote controller 72 or 90.

Also, in the case where the authentication command or the general command received from the remote controller in step S130 is the print command due to the operation of the print button 80 of the optical remote controller 72 or 90 (step S264), the required print operation such as the image transmission to the printer is carried out (step S266), and the process returns to step S28. In this case, the process advances from step S28 to step S30, step S74, step S76, step S78 and so on, in that order, and in accordance with the switches or buttons of the camera proper 12, the play operation becomes possible. The play operation or other operations are also made possible by the interruption due to the command reception from the optical remote controller 72 or 90.

Also, in the case where the authentication command or the general command received from the remote controller in step S130 is the information display command due to the operation of the information button 82 of the optical remote controller 72 or 90 (step S268), the information on the image displayed on the monitor 36 is displayed (step S270), and the process returns to step S28. In this case, the process advances from step S28 to step S30, step S74, step S76, step S78 and so on, in that order, and in accordance with the switches or buttons of the camera proper 12, the play operation becomes possible. The play operation or other operations are also made possible by the interruption due to the command reception from the optical remote controller 72 or 90. The display in step S76 after returning to step S28, however, maintains the display of the image in step S270.

Also, in the case where the authentication command or the general command received from the remote controller in step S130 is the protection command due to the operation of the protection button 88 of the optical remote controller 72 or 90 (step S272), the protection flag is attached to the image displayed on the monitor 36 (step S274), and the process returns to step S28. In this case, the process advances from step S28 to step S30, step S74, step S76, step S78 and so on, in that order, and in accordance with the switches or buttons of the camera proper 12, the play operation becomes possible. The play operation or other operations are also made possible by the interruption due to the command reception from the optical remote controller 72 or 90.

Also, in the case where the authentication command or the general command received from the remote controller in step S130 is the rotation command due to the operation of the rotation button 86 of the optical remote controller 72 or 90 (step S276), the image displayed on the monitor 26 is rotated 90 degrees clock-wise (step S278) and the process returns to step S28. In this case, the process advances from step S28 to step S30, step S74, step S76, step S78 and so on, in that order, and in accordance with the switches or buttons of the camera proper 12, the play operation becomes possible. The play operation or other operations are also made possible by the interruption due to the command reception from the optical remote controller 72 or 90. The display in step S76 after returning to step S23, however, maintains the display of the image rotated in step S278. Incidentally, another depression of the rotation button 86 causes the image rotated 90 degrees counterclockwise from the original image to be displayed in step S278, and a further depression restores the original image.

Further, in the case where the authentication command or the general command received from the remote controller in step S130 is the menu command due to the operation of the menu button 78 of the optical remote controller 72 or 90 (step S280), the menu can be displayed and set. There are a multiplicity of menu functions. The menu can be set in detail hierarchically from the top menu. The display content of the top menu is varied depending on the position of the select switch 32. Thus, the position of the select switch 32 is read and the corresponding menu is displayed on the monitor 36 (step S282).

In the still image acquisition mode J1, the voice recording, macro, scene selection and the mode menu are displayed. In the dynamic image acquisition mode 32, on the other hand, the voice recording, macro, auto stabilization and the mode menu are displayed. In the play mode J3, the menu is varied with the content reproduced. Specifically, at the time of reproducing the still image, the storage play, information display, slide show and the mode menu are displayed. At the time of displaying a dynamic image, on the other hand, the storage play, information display, end of dynamic image play and the mode menu are displayed. At the time of voice reproduction, the storage play, information display, end of voice reproduction and the mode menu are displayed. At the time of calendar play, the calendar play end, information display, slide show and the mode menu are displayed. At the time of album play, the album selection, information display, album play end and the mode menu are displayed. The operation and display of the low-order menu of each case will not be described in detail, and the mode menu shared by all the cases will be explained.

Specifically, the displayed content of the mode menu is further varied depending on the position of the select switch 32. In the still image acquisition mode J1, the image quality mode switching, the sequential shooting mode setting, the exposure correction, the digital zoom setting, the white balance setting and the setting of selection of the memory for recording the image, etc., are possible. In the dynamic image acquisition mode 32, on the other hand, the image quality mode switching, the exposure correction, the digital zoom setting, the white balance setting, the full-time auto-focus setting and the setting of selection of the memory for recording the image, etc., are possible. In the play mode J3, the rotation display, the sound recording, the image editing, the image correction and the image synthesis are possible.

To end the menu operation, the menu button 78 is depressed again (step S284). Then, the process returns to step S28. In this case, the process advances from step S28 to step S30, step S74, step S76, step S78 and so on, in that order, and in accordance with the switches or buttons of the camera proper 12, the play operation becomes possible. The play operation or other operations are also made possible by the interruption due to the command reception from the optical remote controller 72 or 90.

In the case where step S166 determines that the setting mode M3 is in effect, on the other hand, the setting mode is entered. Specifically, in the setting mode, the function and the state of the limit flag of the function limit table shown in FIG. 24 are displayed on the monitor 36, and the circulating selection of the limit function and setting and change of the flag on/off state are carried out using the plus, minus buttons 66, 68 and the telephoto button, wide-angle button 62, 64 of the optical remote controller 14 with the authentication function or the arrow switch 74 and the OK button 76 of the optical remote controller 72 with the authentication function (step S286). Upon completion of the setting and change, the image acquisition command button 58 of the optical remote controller 14 or 72 with the authentication function is depressed. Upon receipt of the image acquisition execution command, the content thereof is established (step S288), and the process returns to step S28. At the time of returning to step S28, the setting mode M3 is in effect. Therefore, only the determination process of step S28 is repeated, and the operation of the switches and buttons of the camera proper 12 is not accepted, and only the operation of the optical remote controller 14 or 72 with the authentication function is accepted.

Further, on determining in step S166 that the prohibit mode M1 is in effect, the prohibit mode is entered. Specifically, in the prohibit mode, the state of the select switch 32 of the camera proper 12 is read (step S290), thereby performing the operation corresponding to the image acquisition command given as an authentication command from the optical remote controller 14 or 72 with the authentication function.

Specifically, in the operation of acquisition of a still image due to the operation of the remote controller in prohibit mode M1 with the still image acquisition mode J1 being in effect due to the operation of the select switch 32, as shown in FIG. 28E, the live image is displayed on the monitor 36 (step S182) thereby to determine whether the authentication command received from the optical remote controller 17 or 72 with the authentication function in step S130 is the image acquisition execution command or not (step S184). On determining that the authentication command is the image acquisition execution command, the focusing operation is performed (step S186) to acquire the still image (step S188), followed by determination of whether the sequential shooting mode is set or not (step S190). In the case where the sequential shooting mode is not set, an image already acquired is displayed for a short time on the monitor 36 (step S192), after which the process returns to step S28. In this case, the prohibit mode M1 is set, and therefore, only the determination process of step S28 is repeated, and the operation of the switches and buttons on the camera proper 12 is not accepted. Specifically, only the operation of the optical remote controller 14 or 72 with the authentication function is accepted, and the operation of acquisition of the next still image, etc. is made possible only by the interruption due to the reception of the command thereof.

In the case where the sequential shooting mode is set in step S190, on the other hand, whether the built-in memory 96 and/or the removable memory 98 has at least a predetermined amount of the residual memory capacity or not (step S194). In the case where the residual memory capacity is less than the predetermined amount, the "memory full" alarm is displayed on the monitor 36 (step S196), and the process returns to step S28. In this case, the prohibit mode M1 is set, and therefore, only the determination process of step S28 is repeated, and the operation of the switches and buttons on the camera proper 12 is not accepted. Specifically, only the operation of the optical remote controller 14 or 72 with the authentication function is accepted, and the operation of acquisition of the next still image, etc. is made possible only by the interruption due to the reception of the command thereof.

Further, on determining in step S194 that the residual memory capacity is sufficient, on the other hand, whether the image acquisition execution command has arrived or not from the optical remote controller 14 or 72 is confirmed (step S198), and in the case where the image acquisition execution command has arrived, the process returns to step S188 to acquire the next image. Specifically, as long as the image acquisition command button 58 of the optical remote controller 14 or 72 is kept depressed, the sequential shooting is carried out. In the case where the image acquisition execution command has arrived, on the other hand, the process returns to step S28. In this case, the prohibit mode M1 is set, and therefore, only the determination process of step S28 is repeated, and the operation of the switches and buttons on the camera proper 12 is not accepted. Specifically, only the operation of the optical remote controller 14 or 72 with the authentication function is accepted, and the operation of acquisition of the next still image, etc. is made possible only by the interruption due to the reception of the command thereof.

Also, in the case where step S184 determines that the received authentication command is not the image acquisition execution command, whether the authentication command is the T button command as the result of depression of the telephoto button 62 of the optical remote controller 14 or 72 with the authentication function or not is determined (step S200). On determining that the T button command is involved, the lens unit 16 is driven to the telephoto side as long as the T button command comes (step S202), and once the T button command stops, the drive is suspended and the process returns to step S28. In this case, the prohibit mode M1 is set, and therefore, only the determination process of step S28 is repeated, and the operation of the switches and buttons on the camera proper 12 is not accepted. Specifically, only the operation of the optical remote controller 14 or 72 with the authentication function is accepted, and the operation of acquisition of the next still image, etc. is made possible only by the interruption due to the reception of the command thereof.

On determining in step S200 that the T button command is not received, on the other hand, whether the authentication command is the W button command due to the depression of the wide-angle button 64 of the optical remote controller 14 or 72 with the authentication function or not is determined (step S204). On determining that the W button command is involved, the lens unit 16 is driven to the wide-angle side as long as the W button command arrives (step S206), and once the W button command is stopped, the drive is suspended, and the process returns to step S28. On determining in step S204 that the W button command is not involved, the process returns to step S28. In these cases, the prohibit mode M1 is set, and therefore, only the determination process of step S28 is repeated, and the operation of the switches and buttons on the camera proper 12 is not accepted. Specifically, only the operation of the optical remote controller 14 or 72 with the authentication function is accepted, and the operation of acquisition of the next still image, etc. is made possible only by the interruption due to the reception of the command thereof.

In the image acquisition operation of acquisition of a dynamic image by the operation of the remote controller in prohibit mode M1 in the dynamic image acquisition mode J2 set by the select switch 32 in step S290, on the other hand, as shown in FIG. 28E, a live image is displayed on the monitor 36 (step S208) while at the same time determining whether the image acquisition execution command flag is on or not; the flag being turned on in accordance with the reception of the image acquisition execution command upon depression of the image acquisition command button 58 of the optical remote controller 14 or 72 with the authentication function (step S210). On determining that the image acquisition execution command flag is set, determination is made as to whether the dynamic image is being acquired or not while at the same time clearing the image acquisition execution command flag (step S212). On determining that the dynamic image is not being acquired, on the other hand, the focusing operation is performed and the dynamic image acquisition operation started (step S214). Then, the residual memory capacity of the built-in memory 96 and/or the removable memory 98 is checked (step S216). In the case where the residual memory capacity is less than a predetermined amount, the "memory full" alarm is displayed on the monitor 36 (step S218) thereby to end the dynamic image acquisition operation (step S220), and the process returns to step S28. In these cases, the prohibit mode M1 is set, and therefore, only the determination process of step S28 is repeated, and the operation of the switches and buttons on the camera proper 12 is not accepted. In the process, the user, already informed from the alarm indication in step S218 that a dynamic image can no longer be acquired, turns the select switch 32 of the camera proper 12. Specifically, only the operation of the optical remote controller 14 or 72 with the authentication function is accepted, and the operation of acquisition of the next still image, etc. is made possible only by the interruption due to the reception of the command thereof.

On determining in step S216 that the residual memory capacity is sufficient, on the other hand, the process returns to step S214 and the dynamic image acquisition operation is continued.

Further, on determining in step S212 that a dynamic image is being acquired, the process advances to step S220, which ends the image acquisition operation, and then returns to step S28. Specifically, a dynamic image is acquired in response to the command of the remote controller from the time when the image acquisition execution command is received upon depression of the image acquisition command button 58 of the optical remote controller 14 or 72 with the authentication function to the time when the image acquisition execution command is received due to the next depression of the image acquisition command button 58. Specifically, upon receipt of the image acquisition execution command during the loop of step S214 to step S216 to step S214, the operation from step S130 is executed by interruption, and on determining in step S212 that a dynamic image is being acquired, the image acquisition operation is ended. In the case where the acquisition of a dynamic image is ended in this way and the process returns to step S28, the prohibit mode M1 is set, and therefore, only the determination process of step S28 is repeated, and the operation of the switches and buttons on the camera proper 12 is not accepted. Specifically, only the operation of the optical remote controller 14 or 72 with the authentication function is accepted, and the operation of acquisition of the next, dynamic image, etc. is made possible only by the interruption due to the reception of the command thereof.

On determining in step S210 that the image acquisition execution command flag is not on, the process proceeds to step S200 to determine whether the T button command is in effect or not. As described above, on determining that the T button command is involved, the lens unit 16 is driven to the telephoto side as long as the T button command comes (step S202), and once the T button command stops, the drive is suspended and the process returns to step S28. In the case where the T button command is received in a dynamic image acquisition loop in steps S214 and S216, the lens unit 16 is driven by interrupt, and the zoom-up image acquisition becomes possible. Once the process returns to step S28, the prohibit mode M1 is set, and therefore, only the determination process of step S28 is repeated, and the operation of the switches and buttons on the camera proper 12 is not accepted. At the same time, a dynamic image acquisition loop of steps S214 and S216 is continuously executed, and a dynamic image continues to be acquired until the process proceeds to step S220 due to the interruption upon receipt of the image acquisition execution command by the depression of the image acquisition command button 58 of the optical remote controller 14 or 72 with the authentication function.

Further, on determining in step S200 that the T button command is not involved, determination is made as to whether the W button command is involved, or not (step S204), and in the case where the W button command is in effect, the lens unit 16 is driven to the wide angle side as long as the W button command continues to arrive (step S206). Once the W button command ceases to arrive, the drive is suspended and the process returns to step S28. Also in this case, like in the case of the T button command, the zoom-down image acquisition operation is performed if a dynamic image is being acquired, and a dynamic image continues to be acquired until interrupted by the reception of the next image acquisition execution command.

Further, on determining in step S204 that neither the W button command is involved, the process returns to step S8 without doing anything.

As described above, in the case where a dynamic image is being acquired in the prohibit mode M1, the dynamic image acquisition operation can be ended or the zoom operation can be performed by the interrupt due to the reception of the image acquisition execution command or the T or W button command from the optical remote controller 14 or 72 with the authentication function.

With regard to the dynamic image, the recording time can be limited to, say, 15 seconds, and in accordance with the memory capacity corresponding to the number of seconds of the particular time, the residual memory capacity is determined in step S216. In this way, the dynamic image acquisition operation can be automatically ended.

In the play operation by the operation of the remote controller in prohibit mode M1 in the case where the play mode J3 is set by the select switch 32, on the other hand, the last image recorded in the built-in memory 96 or the removable memory 98 is displayed on the monitor 36, thereby performing the operation corresponding to the switches and buttons of the optical remote controller 14 or 72 with the authentication function.

Specifically, as shown in FIG. 28F, in the case where the authentication command received from the remote controller in step S130 is the operation command for the arrow switch 74 of the optical remote controller 72 with the authentication function (step S222), and in the case where the operation is the down operation command (album) by down switch operation of the arrow switch 74 (step S224), then the image recorded in the album, is displayed on the monitor 36 (step S226). Upon depression of the menu button 78 of the optical remote controller 72 while this image is being displayed (step S228), the album display function is ended and the process returns to step S28. In this case, the prohibit mode M1 is set, and therefore, only the determination process of step S28 is repeated, and the operation of the switches and buttons on the camera proper 12 is not accepted. Specifically, only the operation of the optical remote controller 14 or 72 with the authentication function is accepted, and the play operation or other operations are made possible only by the interruption due to the reception of the command thereof.

In the case of the up operation command (calendar) by the up switch operation of the arrow switch 74 (step S230), on the other hand, the images recorded for the current month are displayed in calendar form on the monitor 36 (step S232). Further, the images for the previous months or the images acquired for the selected day can be selected and displayed by the arrow switch 74. Upon depression of the menu button 78 during this display (step S234), the calendar display function is ended and the process returns to step S28. In this case, the prohibit mode M1 is set, and therefore, only the determination process of step S28 is repeated, and the operation of the switches and buttons on the camera proper 12 is not accepted. Specifically, only the operation of the optical remote controller 14 or 72 with the authentication function is accepted, and the play operation or other operations are made possible only by the interruption due to the reception of the command thereof.

Also, in the case of the right operation command by the right switch operation of the arrow switch 74 (step S236), the next image is displayed on the monitor 36 (step S233), and the process returns to step S28. Incidentally, assuming that this right switch is operated in the case where the current image is the last one, the first image is displayed. In this case, the prohibit mode M1 is set, and therefore, only the determination process of step S28 is repeated, and the operation of the switches and buttons on the camera proper 12 is not accepted. Specifically, only the operation of the optical remote controller 14 or 72 with the authentication function is accepted, and the play operation or other operations are made possible only by the interruption due to the reception of the command thereof.

Also, in the case of the left operation command due to the left switch operation of the arrow switch 74 (step S240), the previous image is displayed on the monitor 36 (step S242) and the process returns to step S28. Incidentally, in the case where the current image is the first one, the last image is displayed by the left switch operation. In this case, the prohibit mode M1 is set, and therefore, only the determination process of step S28 is repeated, and the operation of the switches and buttons on the camera proper 12 is not accepted. Specifically, only the operation of the optical remote controller 14 or 72 with the authentication function is accepted, and the play operation or other operations are made possible only by the interruption due to the reception of the command thereof.

Further, in the case where the authentication command received from the remote controller in step S130 is the OK command due to the operation of the OK button 76 of the optical remote controller 72 or 90 with the authentication function (step S244), whether the current image is a dynamic image or not is checked (step S246), and if not a dynamic image, it is ignored and the process returns to step S28. In the case where it is a dynamic image, on the other hand, the particular dynamic image is displayed (step S248), and the process returns to step S28. In these cases, the prohibit mode M1 is set, and therefore, only the determination process of step S28 is repeated, and the operation of the switches and buttons on the camera proper 12 is not accepted. Specifically, only the operation of the optical remote controller 14 or 72 with the authentication function is accepted, and the play operation or other operations are made possible only by the interruption due to the reception of the command thereof.

In the case where the authentication command received from the remote controller in step S130 is the T button command issued by the operation of the telephoto button 62 of the optical remote controller 14 or 72 with the authentication function (step S250), the image displayed on the monitor 36 is enlarged (step S252) and the process returns to step S28. In this case, the prohibit mode M1 is set, and therefore, only the determination process of step S28 is repeated, and the operation of the switches and buttons on the camera proper 12 is not accepted. Specifically, only the operation of the optical remote controller 14 or 72 with the authentication function is accepted, and the play operation or other operations are made possible only by the interruption due to the reception of the command thereof.

Also, in the case where the authentication command received from the remote controller in step S130 is the W button command issued by the operation of the wide-angle button 64 of the optical remote controller 14 or 72 with the authentication function (step S254), on the other hand, the image displayed on the monitor 36 is reduced and displayed in the form of index (step S256), and the process returns to step S28. In this case, the prohibit mode M1 is set, and therefore, only the determination process of step S28 is repeated, and the operation of the switches and buttons on the camera proper 12 is not accepted. Specifically, only the operation of the optical remote controller 14 or 72 with the authentication function is accepted, and the play operation or other operations are made possible only by the interruption due to the reception of the command thereof.

Incidentally, in the reduced list display in step S256, 4 frames, 9 frames, 16 frames and 25 frames can be sequentially displayed as a list each time the wide-angle button 64 is depressed. Also, each depression of the telephoto button 62 during the reduced list display returns the display from 25 frames to 16 frames, 9 frames, 4 frames and 1 frame in that order in step S252.

Upon depression of the wide-angle button 64 during the enlarged display in step S252 which is made in accordance with the depression of the telephoto button 62 during the normal image display, on the other hand, the operation of restoring the enlarged display to the original size is performed in step S256.

Also, in the case where the authentication command received from the remote controller in step S130 is the erase command due to the operation of the erase button 84 of the optical remote controller 72 or 90 with the authentication function (step S258), the confirmation as to whether the image is really erased or not is displayed on the monitor 36 (step S260), and in the case where the erase suspension is selected, the process returns to step S28 without erasure. In this case, the prohibit mode M1 is set, and therefore, only the determination process of step S28 is repeated, and the operation of the switches and buttons on the camera proper 12 is not accepted. Specifically, only the operation of the optical remote controller 14 or 72 with the authentication function is accepted, and the play operation or other operations are made possible only by the interruption due to the reception of the command thereof.

On determining in step S260 that the execution of the erasure is selected, on the other hand, the particular frame is erased and the immediately preceding image is displayed (step S262), followed by returning to step S28. Incidentally, in the case where the image to be erased is protected, an alarm indicating that the image is protected is displayed on the monitor 36, and the execution of the erasure is ignored. After returning to step S28, the prohibit mode M1 is set, and therefore, only the determination process of step S28 is repeated, and the operation of the switches and buttons on the camera proper 12 is not accepted. Specifically, only the operation of the optical remote controller 14 or 72 with the authentication function is accepted, and the play operation or other operations are made possible only by the interruption due to the reception of the command thereof.

Also, in the case where the authentication command received from the remote controller in step S130 is the print command due to the operation of the print button 80 of the optical remote controller 72 with the authentication function (step S264), the required print operation such as the image transmission to the printer is carried out (step S266), and the process returns to step S28. In this case, the prohibit mode M1 is set, and therefore, only the determination process of step S28 is repeated, and the operation of the switches and buttons on the camera proper 12 is not accepted. Specifically, only the operation of the optical remote controller 14 or 72 with the authentication function is accepted, and the play operation or other operations are made possible only by the interruption due to the reception of the command thereof.

Also, in the case where the authentication command received from the remote controller in step S130 is the information display command due to the operation of the information button 82 of the optical remote controller 72 with the authentication function (step S268), the information on the image displayed on the monitor 36 is displayed (step S270), and the process returns to step S28. In this case, the prohibit mode M1 is set, and therefore, only the determination process of step S28 is repeated, and the operation of the switches and buttons on the camera proper 12 is not accepted. Specifically, only the operation of the optical remote controller 14 or 72 with the authentication function is accepted, and the play operation or other operations are made possible only by the interruption due to the reception of the command thereof.

Also, in the case where the authentication command received from the remote controller in step S130 is the protection command due to the operation of the protection button 88 of the optical remote controller 72 with the authentication function (step S272), the protection flag is attached to the image displayed on the monitor 36 (step S274), and the process returns to step S28. In this case, the prohibit mode M1 is set, and therefore, only the determination process of step S28 is repeated, and the operation of the switches and buttons on the camera proper 12 is not accepted. Specifically, only the operation of the optical remote controller 14 or 72 with the authentication function is accepted, and the play operation or other operations are made possible only by the interruption due to the reception of the command thereof.

Also, in the case where the authentication command received from the remote controller in step S130 is the rotation command due to the operation of the rotation button 86 of the optical remote controller 72 with the authentication function (step S276), the image displayed on the monitor 36 is rotated 90 degrees clockwise (step S278) and the process returns to step S26. In this case, the prohibit mode M1 is set, and therefore, only the determination process of step S28 is repeated, and the operation of the switches and buttons on the camera proper 12 is not accepted. Specifically, only the operation of the optical remote controller 14 or 72 with the authentication function is accepted, and the play operation or other operations are made possible only by the interruption due to the reception of the command thereof. Incidentally, another depression of the rotation button 86 causes the image rotated 90 degrees counterclockwise from the original image to be displayed in step S278, and a further depression restores the original image.

Further, in the case where the authentication command received from the remote controller in step S130 is the menu command due to the operation of the menu button 78 of the optical remote controller 72 with the authentication function (step S280), the menu can be displayed and set. There are a multiplicity of menu functions. The menu can be set in detail hierarchically from the top menu. The display content of the top menu is varied depending on the position of the select switch 32. Thus, the position of the select switch 32 is read and the corresponding menu is displayed on the monitor 36 (step S282).

In the still image acquisition mode J1, the voice recording, macro, scene selection and the mode menu are displayed. In the dynamic image acquisition mode J2, on the other hand, the voice recording, macro, auto stabilization and the mode menu are displayed. In the play mode J3, the menu is varied with the content reproduced. Specifically, at the time of reproducing the still image, the storage play, information display, slide show and the mode menu are displayed. At the time of displaying a dynamic image, on the other hand, the storage play, information display, end of dynamic image play and the mode menu are displayed. At the time of voice reproduction, the storage play, information display, end of voice reproduction and the mode menu are displayed. At the time of calendar play, the calendar play end, information display, slide show and the mode menu are displayed. At the time of album play, the album selection, information display, album play end and the mode menu are displayed. The operation and display of the low-order menu of each case will not be described in detail, and the mode menu shared by all the cases will be explained.

Specifically, the displayed content of the mode menu is further varied depending on the position of the select switch 32. In the still image acquisition mode J1, the image quality mode switching, the sequential shooting mode setting, the exposure correction, the digital zoom setting, the white balance setting and the setting of selection of the memory for recording the image, etc., are possible. In the dynamic image-acquisition mode J2, on the other hand, the image quality mode switching, the exposure correction, the digital zoom setting, the white balance setting, the full-time auto-focus setting and the setting of selection of the memory for recording the image, etc., are possible. In the play mode J3, the rotation display, the sound recording, the image editing, the image correction and the image synthesis are possible.

To end the menu operation, the menu button 78 of the optical remote controller 72 with the authentication function is depressed again (step S284). Then, the process returns to step S28. In this case, the prohibit mode M1 is set, and therefore, only the determination process of step S28 is repeated, and the operation of the switches and buttons on the camera proper 12 is not accepted. Specifically, only the operation of the optical remote controller 14 or 72 with the authentication function is accepted, and the play operation or other operations are made possible only by the interruption due to the reception of the command thereof.

As explained above in the first embodiment, the configuration in which the authentication command is received and processed in a system different from the system in which the general command is received and processed can easily improve the safety of the process of receiving the authentication command. Further, by selecting the type of the authentication information decoded by the authentication code decoder unit 100F and converted into the command data, the safety functions, including a simple one to a more strict one, can be selected in accordance with the type of the image acquisition device. This feature is similar to those of the second, third, fourth, sixth, seventh and eighth embodiments described later.

Further, according to the first embodiment of the invention, the authentication command is transmitted from the optical remote controller 14 or 72 with the authentication function separate from the camera proper 12, and the function can be limited by determining the authentication command received by the camera proper 12. Should the camera proper 12 be lost, therefore, the privacy can be protected and the security maintained by limiting the use of the camera proper 12 and preventing the acquired image from being browsed, copied or transferred.

Further, by using the compact optical remote controller 14 or 72 with the authentication function for both the transmission of the image acquisition command for the image acquisition or play operation and the transmission of the authentication mode switching command, a security system is realized which can be carried with a small burden and also easily operated.

Further, a configuration is desirable in which the general command can be easily received from a wide range on the one hand, and the authentication command is desirably received from a limited range to prevent the illegal copy and use of the authentication information by wiretapping of the authentication command on the other hand. It is not an easy matter to meet these conflicting requirements with one receiving unit. According to this embodiment, the unit for receiving the general command for the image acquisition operation or the like and the unit for receiving the authentication command are arranged separately from each other, and the signal received by each unit is also decoded independently of each other. Further, by specially designing the layout of the authentication command receiving unit, illegal use of the authentication command by wiretapping is prevented with a simple configuration for improved security of the image acquisition device and the image acquisition system.

In this manner, the function of limiting the use of the image acquisition device can be provided which is easy to operate, inexpensive and high in security.

Further, since the photodetector element 34 for receiving the authentication command is arranged separately from the photodetector element 20 for receiving the general command, the photodetector elements can be arranged at the optimum position to receive the respective signals. In this case, the hardware cost can be reduced by sharing the decoder 134 to decode the signals received by the two photodetector elements 20, 32.

Further, in the case where the decoder unit 100F for decoding the authentication command and the decoder unit 104F for decoding the general command are arranged separately from each other, the configuration of each decoder unit can be simplified and the problem occurrence rate is reduced. Further, a part which has developed a problem can be changed at a lower cost. Furthermore, in this case, the authentication command and the general command can be received by the single photodetector element 136, thereby reducing the hardware cost.

Of course, in the case where the photodetector element 34 and the decoder unit 100F for the authentication command are arranged separately from the photodetector element 20 and the decoder unit 104F for the general command, the problem occurrence rate can be reduced on the one hand, and should a problem occur, the replacement cost can be reduced on the other hand. Also, each decoder can be arranged with a greater freedom.

Further, the photodetector element 34 for receiving the authentication command and the photodetector element 20 for receiving the general command can be arranged at different positions on the camera proper 12. Therefore, each signal can be received at the optimum position, thereby reducing the chance of an operation failure and a malfunction.

Further, the functions of the switches and buttons of the optical remote controller 14 or 72 with the authentication function can be switched by the authentication setting switch 60, so that the number of the switches and buttons can be reduced to reduce the size.

Further, the camera proper 12 can perform the operation by identifying the content of the authentication command received. In the case where the authentication command received is the authentication mode switching command, the authentication mode can be switched correspondingly.

Incidentally, the camera proper 12 can use both the optical remote controller 14 or 72 with the authentication function for transmitting the authentication command and the optical remote controller 70, 90 without the authentication function. To execute the function involving privacy, such as reproduction, the optical remote controller 14 or 72 with the authentication function or the like which can transmit the authentication command is required. The action of image acquisition requires no privacy protection, on the other hand, and therefore, the image acquisition operation can be performed by the optical remote controller 70 or 90 without the authentication function for transmitting the general command not containing the authentication information. During travel or the like, therefore, the optical remote controller 70 or 90 without the authentication function can be carried while the optical remote controller 14 or 72 with the authentication function can be left at home. By doing so, the image acquisition operation can be performed freely, and should the camera proper 12 and the remote controller 70 or 90 be lost while traveling, the fact that the optical remote controller 14 or 72 with the authentication function is left at home and not held by the third party who has acquired the camera proper 12 makes it possible to maintain the security of the images acquired.

[Second Embodiment]

Next, a second embodiment of the invention will be explained.

According to this embodiment, both the general command and the authentication command can be transmitted by a single commanding device.

Figure 29:
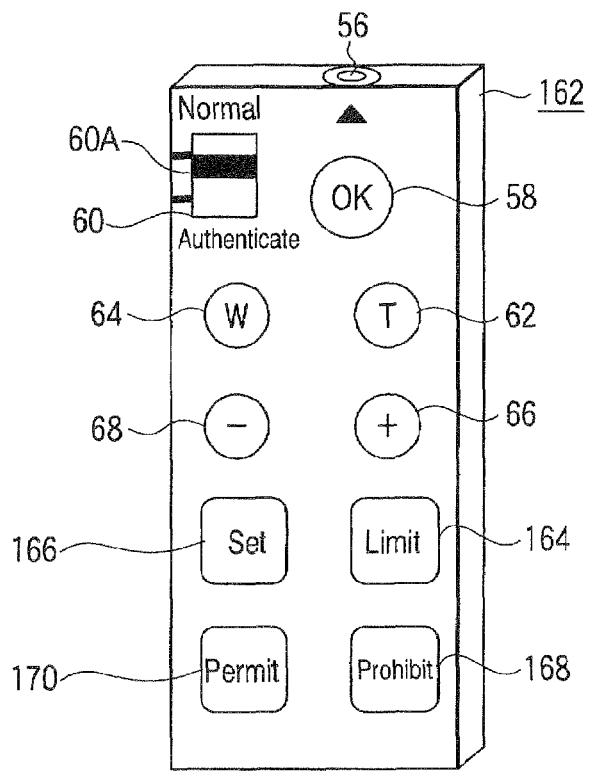
FIG. 29 is a perspective view showing the outer configuration of the optical remote controller as an example of the commanding device of an image acquisition system according to a second embodiment of the invention.

An optical remote controller 162 as an example of the commanding device according to this embodiment, as shown in FIG. 29 is configured of a light-emitting unit 56 on the end surface thereof to transmit the general command and the authentication command. Thus, the general command and the authentication command are transmitted from the light-emitting unit 56 to the digital camera 10 or the digital movie camera 52 constituting an image acquisition device. In this case, the light-emitting element 56A of the light-emitting unit 56 is configured of a two-waveform light-emitting LED. Specifically, the light-emitting unit 56 is configured of two LEDs having different wavelengths in the same package, so that the general command and the authentication command can be transmitted from the LEDs having different wavelengths, respectively.

Further, on the upper surface of this optical remote controller 162, there are arranged an image acquisition command button 58, an authentication setting switch 60, a telephoto button 62, a wide-angle button 64, a plus button 66, a minus button 68, a limit button 164, a setting button 166, a prohibit button 168, a permit button 170, etc.

As long as the authentication setting switch 60 of the optical remote controller 162 is at the upper normal position, the image acquisition execution command is transmitted to the image acquisition device upon depression of the image acquisition command button 58, the T button command upon depression of the telephoto button 62, and the W button command upon depression of the wide-angle button 64. Similarly, upon depression of the plus button 66 or the minus button 68, the command to feed the frame at the time of reproduction or to move the selection item at the time of menu selection is transmitted to the image acquisition device. The commands are transmitted as a general command not containing the authentication information. Incidentally, no command is transmitted upon depression of the limit button 164, the setting button 166, the prohibit button 168 or the permit button 170.

As long as the authentication setting switch 60 is Located at the lower authentication position, on the other hand, the image acquisition execution command is transmitted to the image acquisition device upon depression of the image acquisition command button 58, the T button command upon depression of the telephoto button 62, and the W button command upon depression of the wide-angle button 64. Similarly, upon depression of the plus button 66 or the minus button 68, the command to feed the frame at the time of reproduction or to move the selection item at the time of menu selection is transmitted to the image acquisition device. The commands are transmitted as an authentication command containing the authentication information. Further, the limit command is transmitted to the image acquisition device upon depression of the limit button 164, the setting command upon depression of the setting button 166, the prohibit command upon depression of the prohibit button 168, and the permit command upon depression of the permit button 170, respectively, as an authentication command.

Incidentally, since the switching of the authentication mode is so important, in order to prevent the erroneous operation by erroneous touch or the like, the arrangement may be made to transmit the authentication mode switching command only in the case where the image acquisition command button 58 is depressed at the same time as any one of the limit button 164, the setting button 166, the prohibit button 168 and the permit button 170.

Figure 30:
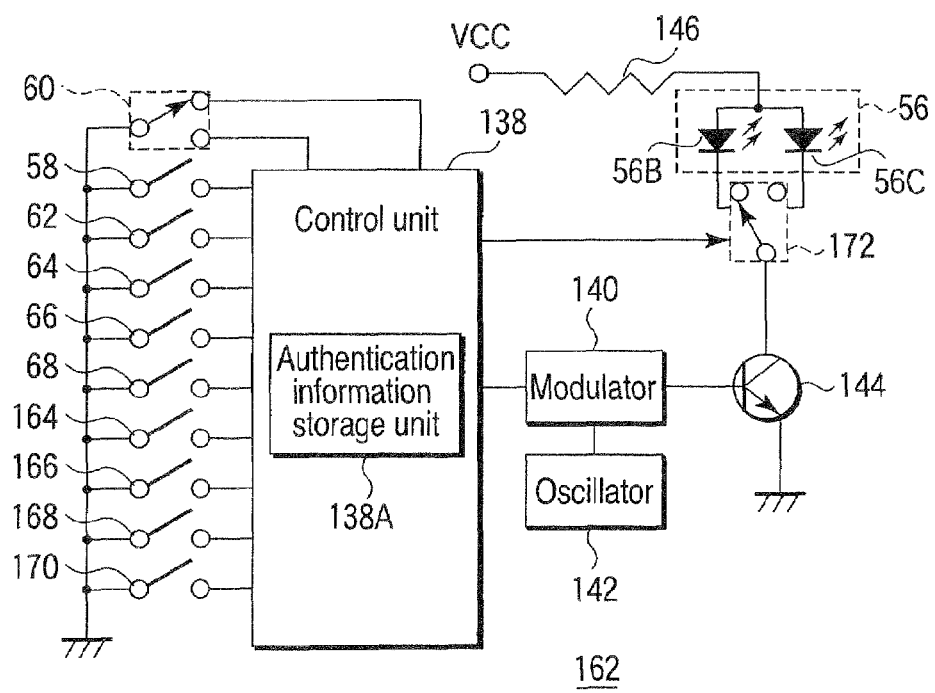
FIG. 30 is a block diagram showing the electrical configuration of the optical remote controller shown in FIG. 29.

The electrical configuration of the optical remote controller 162 according to this embodiment is as shown in FIG. 30. The control unit 138 reads the state of the authentication setting switch 60 and generates a command signal corresponding to the particular state when any one of the buttons 58, 62 to 68, 164 to 170 is turned on. Also, the control unit 138 includes an authentication information storage unit 138A for recording the fixed remote controller identification information in a nonvolatile memory, as the authentication information for identifying the remote controller with the authentication function corresponding to the image acquisition device.

The fixed remote controller identification information is recorded in the authentication information storage unit 138A desirably before factory shipment or before distribution. Further, the fixed remote controller identification information is desirably encrypted to prevent illegal use.

The control unit 138 generates a signal for a preset time as long as the button is kept depressed. In the modulator 140, the carrier wave generated by the oscillator 142 is modulated with the signal from the control unit 138 thereby to drive the transistor 144. Thus, the corresponding one of the two LEDs 56B, 56C of the light-emitting unit 56 is blinked. The resistor 146 is a current limiter.

The light-emitting unit 56 uses a two-waveform light-emitting LED with two LEDs 56B, 56C accommodated in the same package. The light-emitting wavelengths are combined in such a manner that the infrared light of 660 nm is combined with the infrared light of 890 nm, the infrared light of 890 nm is combined, with the visible light of 470 nm or 535 nm, or the visible light 470 nm is combined with the visible light of 525 nm or 660 nm. Nevertheless, other wavelengths may of course be combined.

The light-emitting unit 56 is formed as an LED in an anode-common three-terminal package, in which the anode is connected to a VCC through the current-limiting resistor 146. The change-over switch 172 can be switched between the LEDs 56B and 56C of the light-emitting unit 56 by the switching signal from the control unit 138. Specifically, when transmitting the authentication command, the LED for authentication command transmission such as the LED 56C is turned on.

As another example of the commanding device according to this embodiment, the optical remote controller 174 shown in FIG. 31 can be used. Also in this optical remote controller 174, the end surface thereof is formed with the light-emitting unit 56 for transmitting the general command and the authentication command. Thus, the general command and the authentication command are transmitted from the light-emitting unit 56 to the digital camera 10 or the digital movie camera 52 constituting the image acquisition device. In this case, the light-emitting unit 56 is configured of a two-wavelength light-emitting LEDs. Specifically, the light-emitting unit 56 is configured of two LEDs of different wavelengths in the same package, so that the general command and the authentication command can be transmitted by the LEDs of different wavelengths, respectively.

On the upper surface of the optical remote controller 174, there are arranged an image acquisition command button 58, an authentication setting switch 60, a telephoto button 62, a wide-angle button 64, an arrow switch 74, an OK button 76, a menu button 78, a print button 80, an information button 82, an erase button 84, a rotation button 86, a protection button 88, a limit button 164, a setting button 166, a prohibit button 168, a permit button 170, etc.

As long as the authentication setting switch 60 of the optical remote controller 174 is at the upper normal position, the general command without the authentication information is transmitted to the image acquisition device, i.e. the image acquisition execution command upon depression of the image acquisition command button 58, the T button command upon depression of the telephoto button 62, the W button command upon depression of the wide-angle button 64, the operation command corresponding to the direction in which the arrow switch 74 is depressed, the OK command upon depression of the OK button 76, the menu command upon depression of the menu button 78, the print command upon depression of the print button 80, the information display command upon depression of the information button 82, the erase command upon depression of the erase button 84, the rotation command upon depression of the rotation button 86, and the protection command upon depression of the protection button 88. Incidentally, no command is transmitted upon depression of the limit button 164, the setting button 166, the prohibit button 168 or the permit, button 170.

As long as the authentication setting switch 60 is at the lower authentication position, on the other hand, an authentication command containing the authentication information is transmitted to the image acquisition device, i.e. the image acquisition execution command upon depression of the image acquisition command button 58, the T button command upon depression of the telephoto button 62, the W button command upon depression of the wide-angle button 64, the operation command corresponding to the direction in which the arrow switch 74 is depressed, the OK command upon depression of the OK button 76, the menu command upon depression of the menu button 78, the print command upon depression of the print button 80, the information display command upon depression of the information button 82, the erase command upon depression of the erase button 84, the rotation command upon depression of the rotation button 86, and the protection command upon depression of the protection button 88. Further, as an authentication command, the limit command is transmitted to the image acquisition device upon depression of the limit button 164, the setting command upon depression of the setting button 166, the prohibit command upon depression of the prohibit button 168, and the permit command upon depression of the permit button 170.

Incidentally, since the switching of the authentication mode is so important, in order to prevent the erroneous operation by erroneous touch or the like, the arrangement may be made to transmit the authentication mode switching command only in the case where the image acquisition command button 58 is depressed at the same time as any one of the limit button 164, the setting button 166, the prohibit button 168 and the permit button 170.

The electrical configuration of this optical remote controller 174 is as shown in FIG. 32. The control unit 138 reads the state of the authentication setting switch 60 and generates a command signal corresponding to the particular state when any one of the buttons and the switches 58, 62, 64, 74 to 88, 164 to 170 is turned on. Also, the control unit 138 includes an authentication information storage unit 138A for storing the fixed remote controller identification information in a non-volatile memory as the authentication information for identifying the remote controller with the authentication function corresponding to the image acquisition device. The fixed remote controller identification information is recorded in the authentication information storage unit 138A desirably before factory shipment or before distribution. Further, the fixed remote controller identification information is desirably encrypted to prevent illegal use.

The control unit 138 generates a signal for a preset time as long as a button or switch is kept depressed. In the case where the carrier frequency is 40 kHz, the use of a one-chip microcomputer, as the control unit 138 capable of driving the LED directly as a light-emitting element, makes it possible to employ a configuration in which a high-frequency modulation signal is generated according to a program and the modulator 140, the oscillator 142 and the transistor 144 are omitted. Therefore, the light-emitting unit 56 connected to the power supply through the current-limiting resistor 146 is directly connected to the control unit 138.

The light-emitting unit 56 uses a two-waveform light-emitting LED with two LEDs 56B, 56C accommodated in the same package. The light-emitting wavelengths are combined in such a manner that the infrared light of 660 nm is combined with the infrared light of 890 nm, the infrared light of 890 nm with the visible light of 470 nm or 535 nm, or the visible light of 470 nm with the visible light of 525 nm or 660 nm. Nevertheless, other wavelengths may of course be combined.

The light-emitting unit 56 is formed as an LED in an anode-common three-terminal package, in which the anode is connected to a VCC through the current-limiting resistor 146. The control unit 138 can selectively turn on the LEDs 565 and 56C of the light-emitting unit 56. Specifically, in the case where one authentication command is involved, the LED for transmission of the authentication command such as the LED 56C is turned on.

Figure 33:
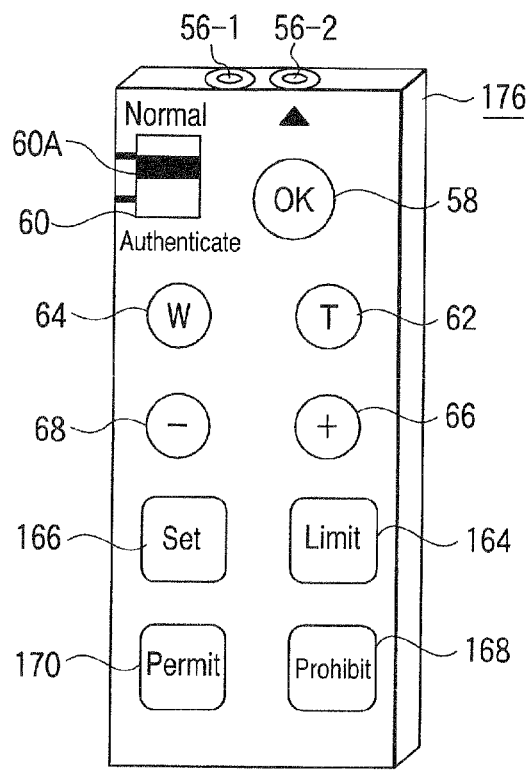
FIG. 33 is a perspective view showing the outer configuration of the optical remote controller as a further example of the commanding device according to the second embodiment.

As a further example of the commanding device according to this embodiment, the optical remote controller 176 shown in FIG. 33 can be used. In the optical remote controller 176, the light-emitting unit 56 of the optical remote controller 162 shown in FIG. 29 is replaced by two light-emitting elements 56A-1, 56A-2 having different wavelengths. This optical remote controller 176 can be driven in the form of replacements of the two LEDs 56B, 56C of the light-emitting unit 56 shown in the block diagram of FIG. 30, and can transmit the general command and the authentication command from the independent LEDs having different wavelengths, respectively. The other buttons, etc. are similar to those of the optical remote controller 162 shown in FIG. 29.

Similarly, the light-emitting unit 56 of the optical remote controller 174 shown in FIG. 31 can of course be replaced by the two light-emitting elements 56A-1, 56A-2 having different wavelengths.

As described above, a configuration is employed that enables using different wavelengths for the general command and the authentication command, i.e., a wavelength commonly used for a remote controller is used for the general command such as in the image acquisition operation, and a wavelength rarely used for a remote controller is used for authentication. In this way, illegal transmission by wiretapping of the authentication command becomes difficult and the security can be improved.

As a result, an image acquisition device having different light wavelengths for the general command and the authentication command is implemented.

Also, a commanding device can be implemented which has different wavelengths of the light for the general command and the authentication command.

Incidentally, although the general command and the authentication command are switched according to the position of the operation unit 60A of the authentication setting switch 60 in the optical remote controller 162, 174, 176, the setting modes corresponding to the operation of the four buttons ranging from the limit button 164 to the permit button 170 may be stored in the control unit 138 of the optical remote controller 162, 174, 176, and based on the current setting mode thus stored, the general command and the authentication command may be switched. In this way, especially, the authentication setting switch 60 may be done without.

[Third Embodiment]

Next, a third embodiment of the invention will be explained.

According to this embodiment, the command is transmitted or received not optically but by radio signal.

Figure 34:
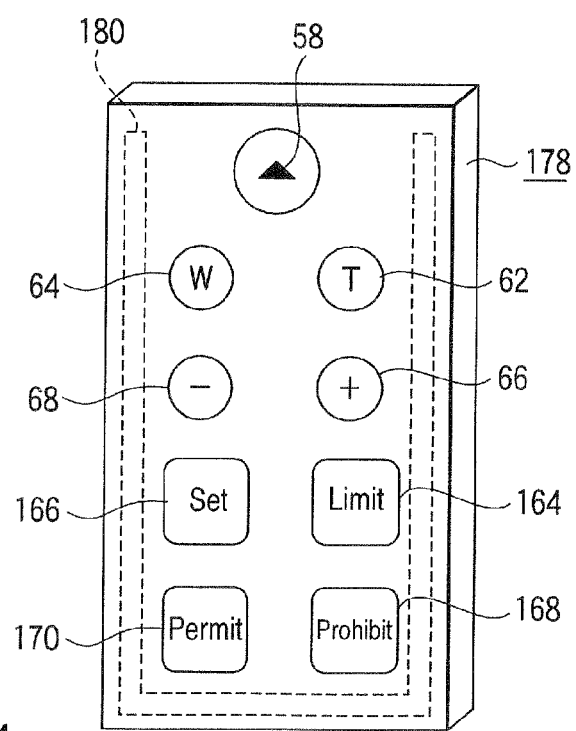
FIG. 34 is a perspective view showing the outer configuration of the radio remote controller as an example of the commanding device of an image acquisition system according to a third embodiment of the invention.

As shown in FIG. 34, a radio remote controller 178 as an example of the commanding device according to this embodiment has a built-in antenna 180 for transmitting the command radio signal of the general command and the authentication command to the image acquisition device. Also, on the upper surface of the radio remote controller 178, like the optical remote controller 162 or 176, there are arranged an image acquisition command button 53, a telephoto button 62, a wide-angle button 64, a plus button 66, a minus button 68, a limit button 164, a setting button 166, a prohibit button 168, a permit button 170, etc. In this radio remote controller 178, however, the authentication setting switch is omitted. Thus, the setting mode is stored in accordance with the operation of the four buttons ranging from the limit button 164 to the permit button 170, and based on the current setting mode thus stored, the general command and the authentication command are switched. Nevertheless, like in the optical remote controller 162 or 176, the authentication setting switch 60 may of course be included.

Incidentally, since the switching of the authentication mode is so important, in order to prevent the erroneous operation by erroneous touch or the like, the arrangement may be made to transmit the authentication mode switching command only in the case where the image acquisition command button 58 is depressed at the same time as any one of the limit button 164, the setting button 166, the prohibit button 168 and the permit button 170.

This radio remote controller 178 has one antenna 180 and represents an embodiment in which one antenna can be shared regardless of whether the frequency of the radio signal for transmitting the general command is equal to or different from the frequency of the radio signal for transmitting the authentication command. Specifically, in the case where both frequencies are approximately the same as each other to such an extent that the radio signal of the required field strength can be transmitted even by sharing the antenna 180, then a single antenna 180 can be used for different frequencies. In the case where both frequencies are in multiple relation, i.e. one frequency is twice, thrice or four times the other, on the other hand, the antenna 180 can be shared as long as the length thereof is equivalent to the half wavelength of one of the frequencies, in which case, the length of the antenna 180 is equal to the full, wavelength for the double frequency, one and one-half times the wavelength (three half-wavelengths) for the triple frequency, and two wavelengths for the quadruple frequency. Thus, the radio signal on which the standing wave easily rides can be radiated, and therefore, one antenna 180 can be shared by different frequencies.

Figure 35:
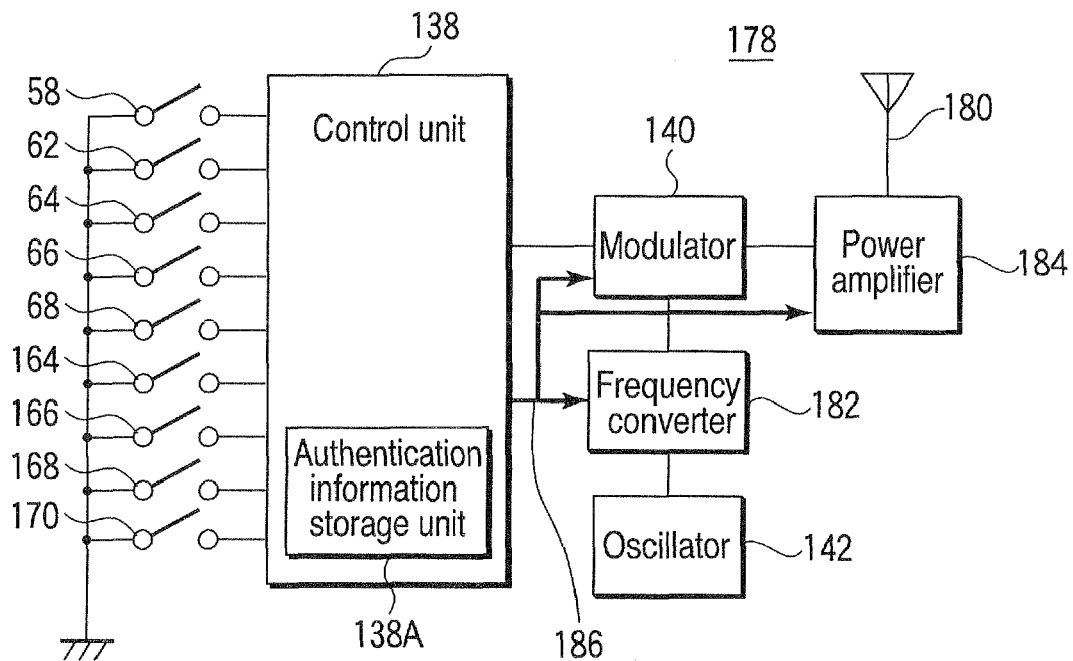
FIG. 35 is a block diagram showing the electrical configuration of the radio remote controller shown in FIG. 34.

The electrical configuration of the radio remote controller 178 is as shown in FIG. 35. The control unit 138 generates a signal corresponding to the function of any one of the buttons 58, 62 to 68, 164 to 170 which may be turned on. Also, the control unit 138 includes an authentication information storage unit 133A for recording the fixed remote controller identification information in a nonvolatile memory as the authentication information for identifying the remote controller with the authentication function corresponding to the image acquisition device. The fixed remote controller identification information is recorded desirably before factory shipment or before distribution. Further, in order to prevent illegal use, the fixed remote controller identification information is desirably encrypted. As long as the button is kept depressed, a signal is generated for a preset time.

The modulator 140 modulates, with the signal from the control unit 138, the carrier wave generated in the oscillator 142 and supplied from frequency converter 182, which signal is amplified by the power amplifier 184 and radiated as a radio signal from the antenna 160. The frequency converter 182 may either supply the carrier wave from the oscillator 142 directly to the modulator 140 or supply the carrier wave after being converted into a double frequency by the frequency converter 182. The frequency is switched in accordance with the frequency control signal 186 from the control unit 138. In the case of the double frequency, the modulator 140 and the resonant circuit of the power amplifier 184 are also switched.

In Japan, the general command uses the frequency not higher than 322 MHz having a large tolerable field strength (not more than 500 μV/m at a distance of 3 m) of a very weak radio signal under Radio Law so that the command radio signal reaches the image acquisition device at some distance away, while the authentication command uses the radio signal having a frequency higher than 322 MHz with a strict field, strength restriction (not more than 35 μV/m at a distance of 3 m) so that the authentication command radio signal reaches the image acquisition device only from a very proximate position to facilitate the prevention of interference of the authentication command or wiretapping. For example, the general command can use the frequency of 315 MHz, and the authentication command the double frequency of 630 MHz or the triple frequency of 945 MHz. In Japan, the frequency of 630 MHz is assigned to the 39 UHF TV channel, and at the time of transmitting the authentication command, the image acquisition device is placed nearby to communicate with the radio remote controller 178 at a very short distance, thereby making it possible to avoid interference with other devices and maintain the security. Even the radio signal with the frequency of 945 MHz is very weak, and by using the image acquisition device and the radio remote controller 178 at a very short distance from each other, therefore, the safety can be secured by avoiding interference with the electromagnetic signal used for other purposes. The frequency selected for applications, which varies from one country to another according to the restriction value or the difference in frequency under radio law of each country, is not limited to the one described above, and the combination of 157.5 MHz and 315 MHz or the combination of 450 MHz and 900 MHz is possible, for example. Nevertheless, the value restricted under radio law is required to be complied with.

Figure 36:
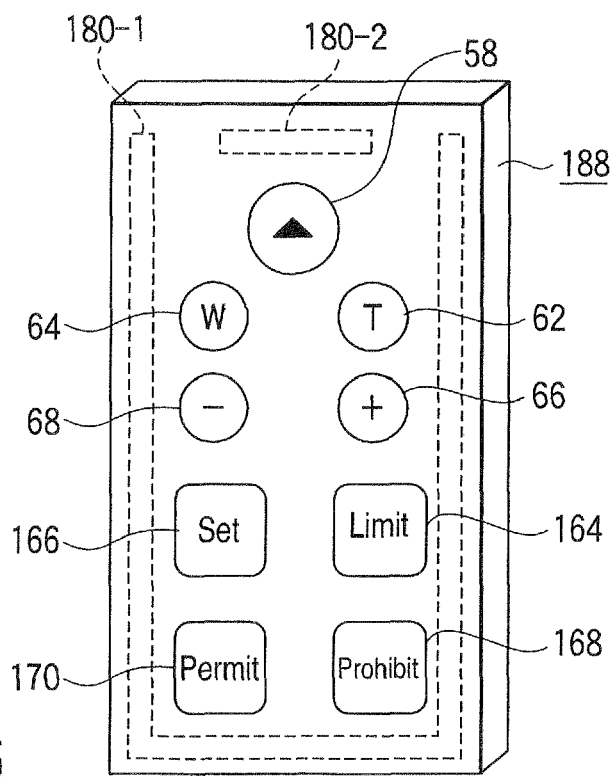
FIG. 36 is a perspective view showing the outer configuration of the radio remote controller as another example of the commanding device according to the third embodiment.

As another example of the commanding device according to this embodiment, the radio remote controller 188 shown in FIG. 36 can be cited. This radio remote controller 188 includes antennas 180-1, 180-2 for transmitting the command radio signal, and transmits the general command and the authentication command to the image acquisition device. On the upper surface of the radio remote controller 188, like in the radio remote controller 178, there are arranged buttons 58, 62 to 68, 164 to 170. This radio remote controller 188 also lacks the authentication setting switch, and in accordance with, the operation of the four buttons ranging from the limit button 164 to the permit button 170, the respective setting modes are stored. Then, based on the current setting mode thus stored, the general command and the authentication command are switched between each other. As in the optical remote controller 162 or 176 described above, the authentication setting switch 60 can of course be provided.

This radio remote controller 188 has two antennas. One antenna 180-1 has a length corresponding to the wavelength of the frequency of the radio signal for transmitting the general command, and the other antenna 180-2 has a length corresponding to the wavelength of the frequency of the radio signal for transmitting the authentication command. Specifically, in the case where the two antennas have different frequencies, the radio signal of each frequency can be radiated with high efficiency. For the frequency of 315 MHz, the wavelength is about 95 cm, the half wavelength about 47 cm and the ¼ wavelength about 24 cm. Therefore, an antenna of such length is used or adjusted to a length that enables easy mounting, by use of a partially loaded coil. For the frequency of 2.45 GHz, on the other hand, the wavelength is about 12 cm, the half wavelength about 6 cm and the ¼ wavelength about 3 cm. Therefore, an antenna commensurate with these sizes is used. The antennas 180-1, 180-2, which may be nondirectional ones, may be directional ones since the direction of the image acquisition device receiving the command from the remote controller is known. The antennas 180-1, 180-2 may be of the ¼ wavelength monopole type, ½ dipole type, linear polarization type or circular polarization type.

The electrical configuration of the radio remote controller 188 is as shown in FIG. 37. A control unit 138 generates a signal corresponding to the function of any one of the buttons 58, 62 to 68, 164 to 170 which may be turned on. Also, the control unit 138 includes an authentication information storage unit 138A for recording the fixed remote controller identification information in a nonvolatile memory as authentication information to identify the remote controller with the authentication function corresponding to the image acquisition device. The fixed remote controller identification information is desirably recorded before factory shipment or distribution. Further, this fixed remote controller identification information is desirably encrypted to prevent, illegal use. As long as the button is kept depressed, the signal is generated for a preset length of time. The carrier wave generated from the oscillator 142-1 is modulated with the signal from the control unit 138 by the modulator 140-1, amplified by the power amplifier 184-1 and radiated as a radio signal from the antenna 180-1. The modulator 140-2 has a similar function to the modulator 140-1, the oscillator 142-2 to the oscillator 142-1, the power amplifier 184-2 to the power amplifier 184-1, and the antenna 180-2 to the antenna 180-1. The oscillator 142-1 and the oscillator 142-2, however, are different in oscillation frequency from each other.

The oscillator 142-1 is for the general command, and under the Radio Law of Japan, the frequency of not higher than 322 MHz of a very weak radio signal having a high, tolerable field strength (not larger than 500 μV/m at a distance of 3 m) can be used in which the command radio signal reaches the image acquisition device at some distance away. In the oscillator 142-2 for the authentication command, on the other hand, the arrangement is made in which the authentication command radio signal reaches the image acquisition device only at a very short distance using the frequency higher than 322 MHz with a strict value of field strength restriction (not larger than 35 μV/m at a distance of 3 m) thereby to facilitate the prevention of interference with the authentication command and wiretapping. For example, 315 MHz can be used for the general command, and 2.45 GHz for the authentication command. The 2.45-GHz band, which is the ISM band also used for microwave ovens and radio LANs, can prevent interference with other devices and maintain security by placing the image acquisition device nearby to communicate with the radio remote controller 188 at a very short distance away at the time of transmitting the authentication command. The use of two units each of the oscillator, the modulator, the power amplifier and the antenna facilitates the selection of the field strength and the radio signal frequency conforming with the radio signal restriction in each country, thereby easily realizing a system both safe and easy to operate.

The digital camera 190 as an example of the image acquisition device adapted for the radio remote controller 178, 188 described above, as shown in FIG. 38, though similar in configuration to the digital camera 10 shown in FIG. 1, further includes the built-in antennas 192-1 and 192-2. For use with radio remote controller 178 having a single antenna, only the antenna 192-1 may be used. Also, the photodetector element 20 may be done without. Further, though not specifically shown, unlike the digital camera 10 shown in FIG. 1, the photodetector element 34 is not arranged on the back thereof.

The digital camera 190, as shown in FIG. 39A, has a configuration similar to the block diagram of FIG. 8 in which the photodetector element 34 is replaced by the antenna 192-1, the authentication light-receiving unit 100 by the authentication receiving unit 194, the photodetector element 20 by the antenna 192-2 and the light-receiving unit 104 by the receiving unit 196. The other parts are similar to those of FIG. 8.

The authentication receiving unit 194 and the receiving unit 196 have the configuration as shown in FIG. 39B. Specifically, the processing system having the parts ranging from the antenna 192-1 to the decoder unit 194F has a configuration conforming with the frequency of the authentication command radio signal from the radio remote controller 178 or 188. The command radio signal is converted into an electric current by the antenna 192-1, amplified by the amplifier 194A and, after the band conforming to the carrier frequency is passed by the filter 194B, detected by the detector 194C. Thus, the carrier frequency component is removed by the integrator 194D thereby to reproduce the signal component, and after being shaped by the waveform shaper 194E, the signal is converted into the authentication command information by the decoder unit 194F. The parts ranging from the antenna 192-2 to the decoder unit 196F have a configuration conforming with the radio signal frequency of the general command, and although each block has a similar function to the corresponding block in the configuration of the parts ranging from 194A to 194F, the decoder unit 196F decodes only the general command.

Incidentally, as shown in FIGS. 40A and 40B, the decoder units of the authentication receiving unit 194 and the receiving unit 196 may share the common decoder 134. In this case, the signals passed through the waveform shapers 194E, 196E of the receiving units 194, 196 are digital signals, and therefore, the decoder 134 has the decode algorithms of both the authentication command and the general command. The decoder 134 thus tries to decode the signal using both algorithms, and whichever can decode the signal is input as a command to the main control unit 102. In this way, the decoder can be dual purpose.

Figure 41A:
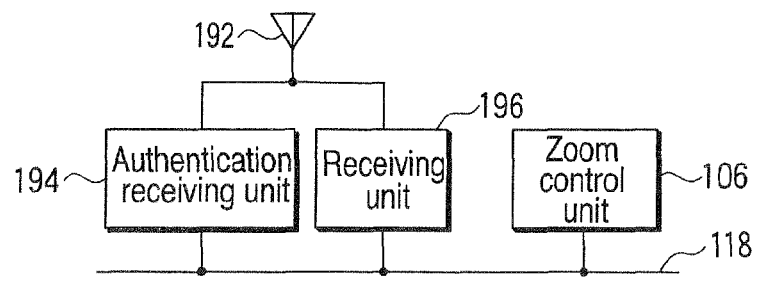
FIG. 41A is a diagram showing the configuration with one antenna used both as an antenna for the authentication command and as an antenna for the general command.
Figure 41B:
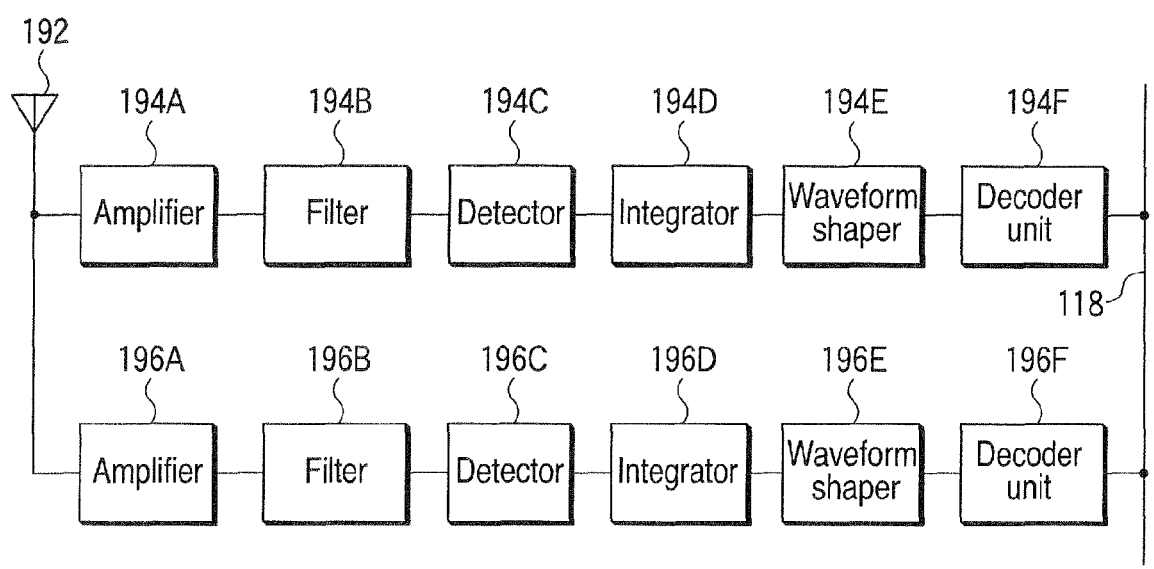
FIG. 41B is a block diagram showing the configuration of the authentication receiving unit and the receiving unit with one antenna used both as an antenna for the authentication command and as an antenna for the general command.

On the contrary, as shown in FIGS. 41A and 41B, the antenna 192-1 for the authentication command and the antenna 192-2 for the general command may share a single antenna 192 having a sensitivity to the two wavelengths used. This is applicable to a case in which the radio signal frequency for the authentication command and the radio signal frequency for the general command are proximate to each other, a case in which the frequencies are in a multiple relation and the antenna can be shared, or a case in which the radio signal frequency for the authentication command is identical with that for the general command.

Figure 42:
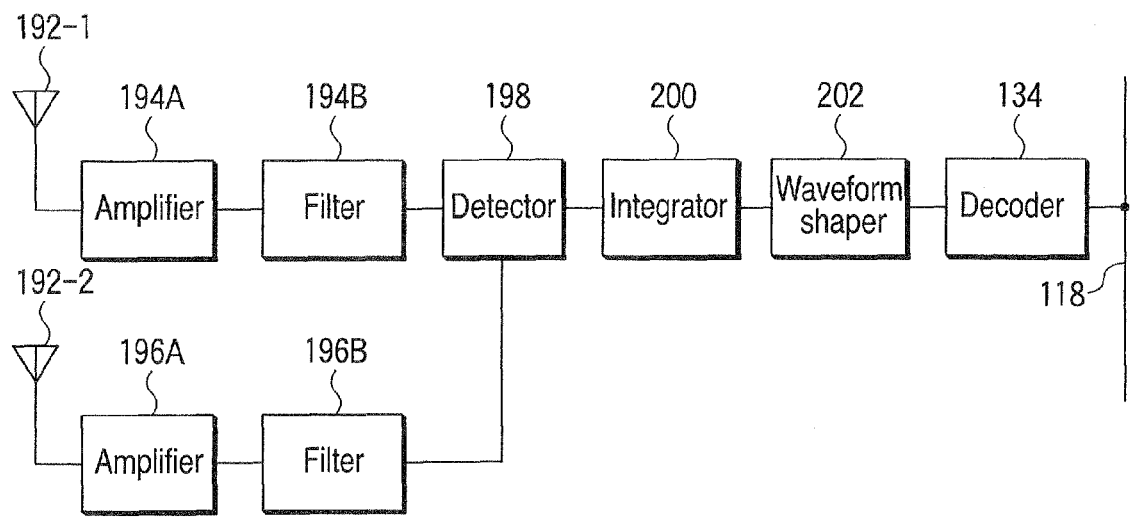
FIG. 42 is a block diagram showing the configuration in which the authentication receiving unit and the receiving unit share a detector, an integrator, a waveform shaper and a decoder.

Further, as shown in FIG. 42, the parts ranging from the detector to the decoder unit of the authentication receiving unit 194 and the receiving unit 196 may share the detector 198, the integrator 200, the waveform shaper 202 and the decoder 134. In this case, the authentication receiving unit 194 has only the amplifier 194A and the filter 194B adapted to the frequency of the authentication command radio signal, while the receiving unit 196 has only the amplifier 196A and the filter 196B adapted to the frequency of the general command radio signal. The outputs from the filters 194B, 196B are supplied to and detected by the detector 198, after which the signal component is reproduced by the integrator 200 and the waveform shaper 202, followed by being converted into the general command or the authentication command, as the case may be, by the decoder 134.

Figure 43A:
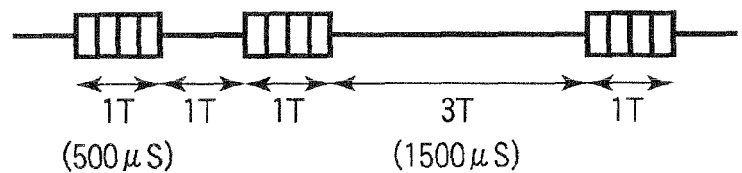
FIG. 43A is a diagram showing the signal generated by the radio remote controller.

Now, the signal generated in the radio remote controller 178 will be explained. The data signal supplied from the control unit 138 to the modulator 140 is similar to that shown in FIGS. 14 to 16. In the case where the frequency of 315 MHz is used as the carrier of the general command radio signal and the double frequency, i.e. 630 MHz is used as the carrier of the authentication command radio signal, the frequency of 315 MHz is supplied from the oscillator 142 to the frequency converter 182. The frequency converter 182 supplies the particular frequency of 315 MHz to the modulator 140 for the general command. For the authentication command, on the other hand, the frequency control signal 186 is sent from the control unit 138 to the frequency converter 182, and by supplying the double frequency of 630 MHz from the frequency converter 182 to the modulator 140 to modulate the data signal. In the case of the carrier signal of 315 MHz, the signal waveform as shown in FIG. 43A is obtained. The data signal 1T of 500 µs contains about 157 cycles of the 315-MHz carrier signal having the period of 3.17 µs. A predetermined output is obtained from the power amplifier 184 and radiated from the antenna 180. In the case where the carrier signal is 615 MHz, on the other hand, the data signal 1T of 500 µs contains about 315 cycles of the 630-MHz carrier signal having the period of 1.59 µs.

Figure 43B:
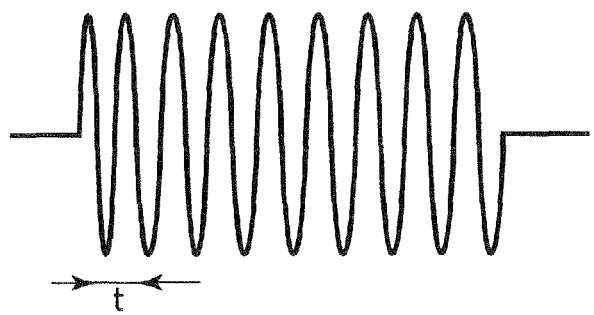
FIG. 43B is a diagram showing the carrier wave in an enlarged f c rm.

FIG. 43B is a diagram showing the carrier waveform in enlarged form. The frequency of 315 MHz is associated with one period of about 3.17 µs, and the frequency of 630 MHz with one period of about 1.59 µs. In the case of 945 MHz, one period is about 1.06 µs and the data signal 1T of 500 µs contains about 473 cycles. In the case of 2.45 GHz, one period is about 0.41 µs and the data signal 1T of 500 µs contains about 1225 cycles. Also, in the case of 157.5 MHz, one period is about 6.35 µs and the data signal 1T of 500 µs contains about 79 cycles.

This is also the case with the signal generated by the radio remote controller 188.

By implementing this configuration, an image acquisition system high in both security and operability for improved confidentiality can be formed, using a radio signal comparatively high in field strength for the general command and a radio signal comparatively low in field strength for the authentication command, taking into consideration the radio signal control situation and application in each country and region.

As a result, the image acquisition device having different wavelengths of the radio signal for the general command and the authentication command is implemented.

Also, the commanding device having different wavelengths of the radio signal for the general command and the authentication command can be implemented.

[Fourth Embodiment]

Next, a fourth embodiment of the invention will be explained.

Figure 44:
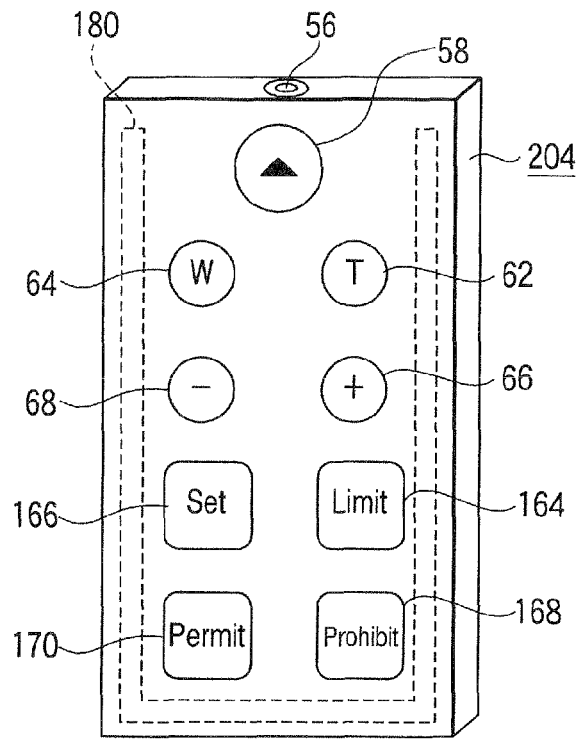
FIG. 44 is a perspective view showing the outer configuration of the radio/optical remote controller as an example of the commanding device of an image acquisition system according to a fourth embodiment of the invention.

As shown in FIG. 44, a radio/optical remote controller 204 as an example of the commanding device according to this embodiment includes an antenna 180 for transmitting the command radio signal, and has a light-emitting unit 56 on the front surface thereof. In the case where the general command is transmitted optically, the authentication command is transmitted to the image acquisition device by radio signal. On the contrary, in the case where the general command is transmitted by radio signal, the authentication command is transmitted optically to the image acquisition device.

On the upper surface of this radio/optical remote controller 204, like that of the radio remote controllers 178, 188, there are arranged an image acquisition command button 58, a telephoto button 62, a wide-angle button 64, a plus button 66, a minus button 68, a limit button 164, a setting button 166, a prohibit button 168, a permit button 170, etc. Also in this radio/optical remote controller 204, the authentication setting switch is omitted, and the setting mode is stored in accordance with the operation of four buttons ranging from the limit button 164 to the permit button 170. Based on the current setting mode thus stored, the general command and the authentication command are switched. Of course, like in the optical remote controller 162 or 176, the authentication setting switch 60 may be included.

Figure 45:
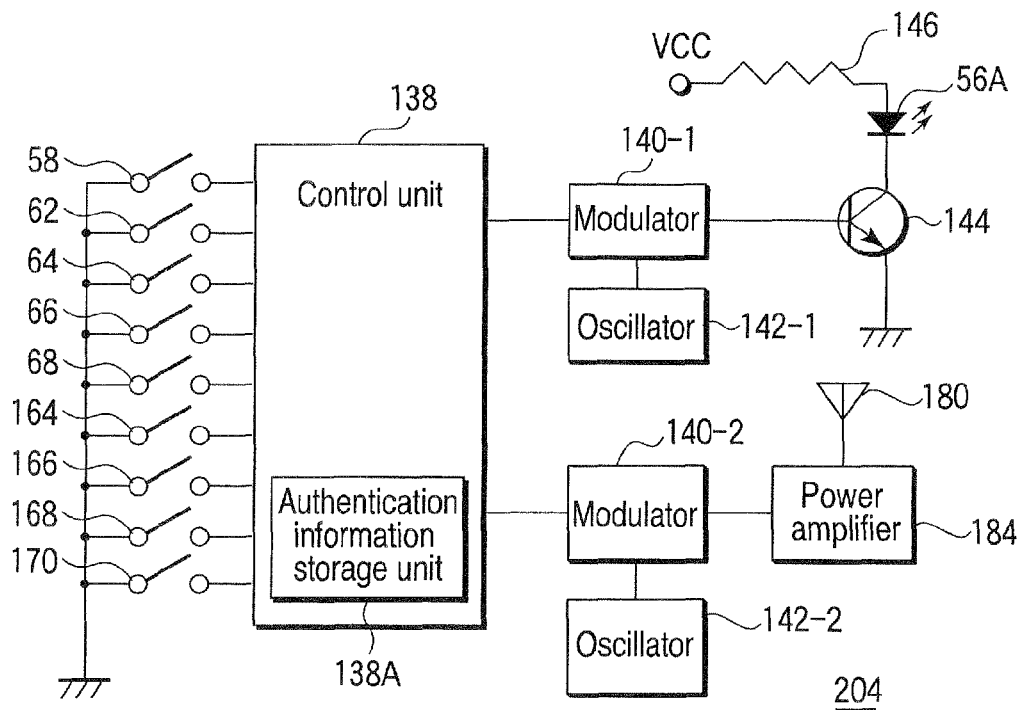
FIG. 45 is a block diagram showing the electrical configuration of the radio/optical remote controller shown in FIG. 44.

In the electrical configuration of this radio/optical remote controller 204, as shown in FIG. 45, the buttons 58, 62 to 68, 164 to 170 are similar to those of the radio remote controller 188 shown in FIG. 37. The control unit 138 and the authentication information storage unit 138A are also similar to those of the radio remote controller 188 shown in FIG. 37.

In the modulator 140-1, the carrier signal generated by the oscillator 142-1 is modulated with the signal from the control unit 138, and thus the transistor 144 is driven, which lights the light-emitting element 56A of the light-emitting unit 56. The resistor 146 is for limiting the current. The light-emitting element 56A is often an infrared light-emitting diode having the wavelength of 900 to 950 nm. Nevertheless, the light of another wavelength or visible light can also be used.

In the modulator 140-2, the carrier signal generated by the oscillator 142-2 is modulated with the signal from the control unit 133, amplified by the power amplifier 184 and radiated as a radio signal from the antenna 180. In the case where the general command is transmitted on the radio signal and the authentication command optically in Japan, Radio Law stipulates that the frequency of not higher than 322 MHz or, for example, 315 MHz is used as a very weak radio signal having a high tolerable field strength (not higher than 500 μV/m at a distance of 3 m), in which the command radio signal can reach the image acquisition device at some distance away. In the case where the general command is optically transmitted and the authentication command by radio signal, on the other hand, the frequency of, say, 630 MHz or 945 MHz, higher than 322 MHz, with the field strength strictly restricted (not higher than 35 μV/m at a distance of 3 m) is used, with which the authentication command radio signal can reach the image acquisition device only from the neighborhood thereof to facilitate the prevention of the interference of the authentication command and wiretapping.

In the case where the general command is transmitted optically and the authentication command is transmitted by radio signal, the command signal from the radio/optical remote controller 204 is received by the image acquisition device through the photodetector element 20 and the light-receiving unit 104 shown in FIG. 8 for the general command, and through the photodetector element 34 and the authentication light-emitting unit 100 shown in FIG. 8, as a replacement of the functions of the antenna 192-1 and the authentication receiving unit 194 shown in FIG. 39A, for the authentication command. In the case where the general command is transmitted by radio signal and the authentication command optically, on the other hand, the photodetector element 34 and the authentication light-receiving unit 100 shown in FIG. 8 receive the authentication command, while the photodetector element 20 and the light-receiving unit 104 shown in FIG. 8, as a replacement of the functions of the antenna 192-2 and the receiving unit 196 shown in FIG. 39A, receive the general command.

The command signal form and the data format are similar to those explained above.

With the configuration described above, assume that the general command is transmitted optically and the authentication command by radio signal. The commanding device and the image acquisition device can be configured in such a manner that the general command is optically controlled by being transmitted also from a place distant from the image acquisition device using the LED or the laser light, while the authentication command is transmitted at a short distance, for improved confidentiality, by a comparatively weak radio signal using the minimum field strength required for authentication, taking the restriction under Radio Law into consideration.

Assume that the general command is transmitted by radio signal and the authentication command optically, on the other hand. The use of the radio signal for the general command makes it possible to use the image acquisition device and the commanding device at a practical distance without being conscious of the directivity of the light, and by selecting the frequency capable of producing a sufficient field strength within the restriction under Radio Law, the command to the image acquisition device can be transmitted with comparative freedom even from a distant place. At the same time, wiretapping is prevented by the proximity between the image acquisition device and the commanding device and by the use of light for the authentication command, thereby configuring the commanding device and the image acquisition device with improved authentication command confidentiality.

In this way, a commanding device is implemented which uses the light for the general command and the radio signal for the authentication command. Also, an image acquisition device is realized in which the general command is transmitted optically and the authentication command by radio signal.

It is also possible to implement an image acquisition device which uses a radio signal for the general command and the light for the authentication command. Also, an image acquisition device can be implemented which uses a radio signal for the general command, and light for the authentication command.

[Fifth Embodiment]

Next, a fifth embodiment of the invention will be explained.

Figure 46:
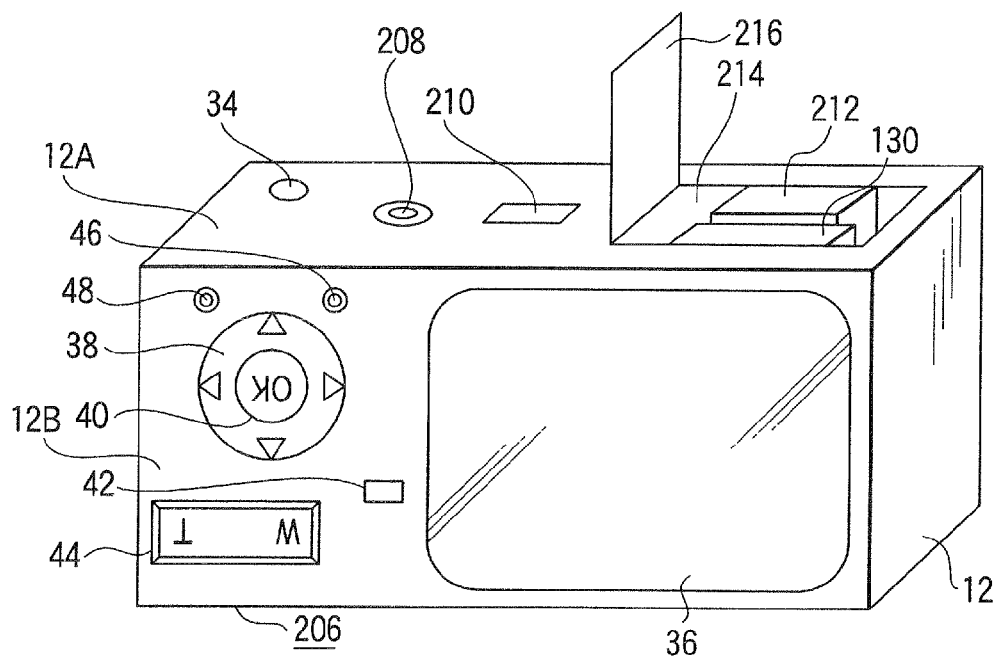
FIG. 46 is a perspective view showing the bottom surface and the rear surface of the digital camera as an image acquisition device of an image acquisition system according to a fifth embodiment of the invention.

FIG. 46 is a perspective view showing the bottom surface 12A and the rear surface 12B of the digital camera 206 as an image acquisition device according to the fifth embodiment. The structure of the upper surface, the front surface and the side surfaces of this digital camera 206 are similar to those of the digital camera 10 shown in FIGS. 1 and 2.

In the digital camera 206 according to this embodiment, the photodetector element 34 for receiving the authentication command light is arranged on the bottom surface 12A but not on the rear surface 12B of the camera proper 12. Further, on the bottom surface 12A, there are arranged a tripod screw hole 208 for fixing a tripod with screw, a connector 210 for connecting other devices, a slot 214 for accommodating a removable memory card 212 and a battery 130, and a lid 216 for opening/closing the slot 214.

The function of this image acquisition device is similar to that of the first embodiment except that the photodetector element 34 for receiving the authentication command light, is arranged on the bottom surface 12A.

In the image acquisition device, or especially, the camera, the image acquisition operation is performed often with the bottom surface 12A down. Also, a portrait-type photo may be taken by rotating the camera by 90 degrees. In the case where the person holding the camera intentionally transmits the authentication command from the commanding device to switch the camera authentication mode or otherwise the authentication command is received, on the other hand, the structure of this embodiment in which the photodetector element 34 for receiving the authentication command light is arranged on the normally invisible bottom surface 12A makes it necessary to grasp the camera and direct the photodetector element 34 toward the image acquisition device. As a result, the authentication command can be received both safely and positively by switching the authentication mode.

Since the photodetector element 34 for receiving the authentication command light is arranged on the bottom surface 12A of the camera proper 12 as described above, the authentication command can be transmitted and received within the range limited by the intention of the user. This configuration is suitable especially to receive the authentication mode switching command, the most important one of the authentication commands.

Incidentally, other photodetector elements may of course be arranged on the front surface or the rear surface 12B of the camera proper 12 so that the authentication commands other than the authentication mode switching command can be received during normal operation.

[Sixth Embodiment]

Next, a sixth embodiment of the invention will be explained.

In the image acquisition device according to this embodiment, as shown in FIG. 1, the photodetector element 20 for receiving the general command, like the lens unit 16 for acquiring of the image, is arranged on the front surface of the camera proper 12 while the photodetector element 34 for receiving the authentication command is arranged on the opposite side of the camera proper 12 far from the photodetector element 20 as shown in FIG. 2.

This configuration in which the photodetector element 20 for receiving the general, command is arranged on the lens unit 16 side is especially convenient in the case where the person taking a picture is his/her own object. The photodetector element 34 for receiving the authentication command, on the other hand, is arranged on the side of the camera far from the object. In this way, the setting information and the confirmation message for authentication can be displayed on the monitor 36, and the authentication mode can be set or changed while checking the display on the monitor 36, thereby making it possible to realize a positive, safe operation.

[Seventh Embodiment]

Next, a seventh embodiment of the invention will be explained.

In the image acquisition device according to this embodiment, the photodetector element 34 for receiving the authentication command light is arranged inside the camera proper 12.

Figure 47:
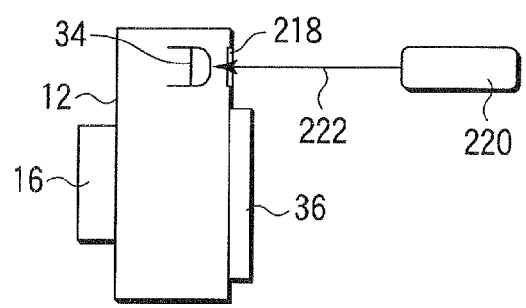
FIG. 47 is a diagram showing an example of the layout of the photodetector element of the image acquisition device for receiving the authentication command light in an image acquisition system according to a seventh embodiment of the invention.

Specifically, in the window-type device shown in FIG. 47, the camera proper 12 includes the lens unit 16, the monitor 36, etc. This configuration is similar to that of the first embodiment except that the photodetector element 34 is differently arranged. The camera proper 12 has a window 218 for preventing the intrusion of dust into the camera proper 12, and the authentication command light 222 from the remote controller 220, such as the optical remote controller 14, 72, 162, 174 or the radio/optical remote controller 204, is transmitted through this window 218 and enters the photodetector element 34 for receiving the authentication command light.

Figure 48:
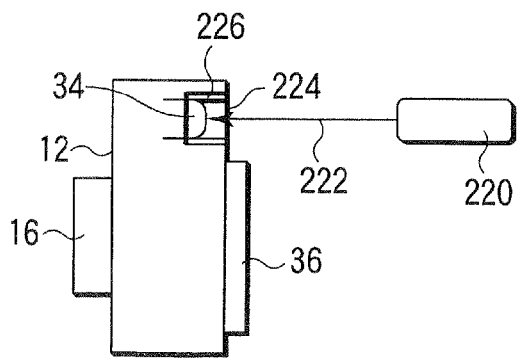
FIG. 48 is a diagram showing another example of the layout of the photodetector element of the image acquisition device for receiving the authentication command light according to the seventh embodiment.

In the hole-type device shown in FIG. 48, on the other hand, a hole 224 is opened in a part of the camera proper 12, and the photodetector element 34 is arranged in the depth of the hole 224. The hole 224 and the photodetector element 34 are connected to each other with a cover 226 to prevent the intrusion of dust or the like into the camera proper 12.

Also, a configuration can be employed in which the photodetector element 34 shown in FIGS. 2 and 3 is arranged similarly inside the camera proper 12.

Since the photodetector element 34 for receiving the authentication command light 222 is arranged inside the camera proper 12 of the image acquisition device in this way, the angle and range for receiving the authentication command light 222 can be limited, while at the same time reducing the effect of other interference light, thereby making it possible to receive the authentication command light more safely and positively.

[Eighth Embodiment]

Next, an eighth embodiment of the invention will be explained.

In the image acquisition device according to this embodiment, the authentication command light 222 is led, through the lens unit 16, to the photodetector element 34 for receiving the authentication command light.

FIG. 49 shows an image acquisition device of the single-lens reflex type with the lens unit 16 configured of several to ten or more lenses, which may be replaceable with respect to the camera proper 12. The lens unit 16 has a diaphragm 228 to adjust the incident light amount. The mirror 230 reflects the incident light ray and focuses the image of the object on the focusing screen 232. The image on the focusing screen 232, after being reflected twice on the pentaprism 234, can be viewed by the picture-taking user through the eye lens of the finder 236. At the time of acquisition of an image, the mirror 230 jumps up to the position indicated by the dotted line, and the light ray that has passed through the lens unit 16 forms an image on the imager element 92 when the shutter 238 opens. The image thus acquired is displayed on the monitor 36.

The photodetector element 34 is for receiving the authentication command light 222 and arranged in such a position that the authentication command light 222 from the remote controller 220 is reflected on the mirror 230 through the lens unit 16, and a part of the light enters the pentaprism 234 through the focusing screen 232, followed by a part of this light further entering the photodetector element 34. The reflectivity and the transmittance of the upper surface of the pentaprism 234 are adjusted so that the light in an amount required to receive the authentication command light 222 can leak out to the photodetector element 34. In practical application, the light entering the photodetector element 34 is about one percent of the whole light, which is sufficient.

The photodetector element 34A is a modification arranged in such a position that the authentication command light 222 from the remote controller 220 is reflected on a part of the mirror 230 through the lens unit 16 and enters the photodetector element 34A. The route of the authentication command light 222, though schematically illustrated by dotted line in FIG. 49, actually leads to the photodetector element 34A through a variety of paths.

Incidentally, the authentication command light 222 may be received by one (34 or 34A) or a plurality of photodetector elements.

The functions other than those explained above are similar to the corresponding functions explained in the first and other embodiments.

In the image acquisition device of the lens shutter type, as shown in FIG. 50, the lens unit 16 is configured of one to ten or more lenses, and further, the lens unit 16 has a diaphragm 228 to adjust the incident light amount. The light ray that has passed through the lens unit 16 forms an image on the imager element 92 when the shutter 238 opens. The image thus acquired is displayed on the monitor 36.

The photodetector element 34 is for receiving the authentication command light 222, and is arranged in such a position that a part of the authentication command light 222 from the remote controller 220 enters the photodetector element 34 through the lens unit 16. The route of the authentication command light 222, though schematically illustrated by dotted line in FIG. 50, actually leads to the photodetector element 34 through a variety of paths. One or a plurality of the photodetector elements 34 may be used.

A finder 236 is available to determine the composition of the object. Without the finder, a live image may be normally displayed on the monitor 36 with the shutter 238 open.

The functions other than explained above are similar to those explained in the first and other embodiments.

In this way, by leading the authentication command light 222 to the photodetector element 34 through the lens unit 16, the angle and range for receiving the authentication command light 222 can be limited while at the same time reducing the effect of other interference light, thereby making it possible to receive the authentication command more safely and positively.

[Ninth Embodiment]

Next, a ninth embodiment of the invention will be explained.

According to this embodiment, the photodetector element 34 for receiving the authentication command light 222 is arranged inside the finder 236 of the image acquisition device.

Figure 51:
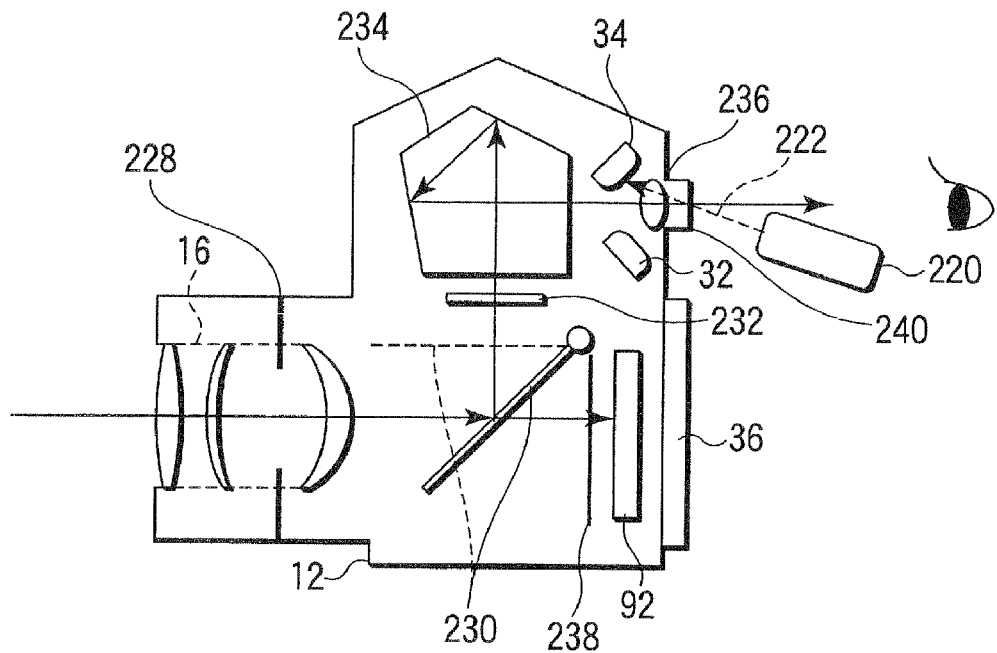
FIG. 51 is a diagram snowing the layout of the photodetector element of the image acquisition device of the single-lens reflex type for receiving the authentication command light in an image acquisition system according to a ninth embodiment of the invention.

In the case of the image acquisition device of the single-lens reflex type, as shown in FIG. 51, at least one photodetector element 34 for receiving the authentication command light 222 is arranged in the finder 236. At the time of transmitting or receiving the authentication command for switching the authentication mode, for example, the authentication command light 222 of the remote controller 220 is transmitted inward of the camera proper 12 from the viewing window 240 of the finder 236. The configuration of other than the route to receive the authentication command light 222 is similar to that of the image acquisition device according to the eighth embodiment shown in FIG. 49.

Figure 52:
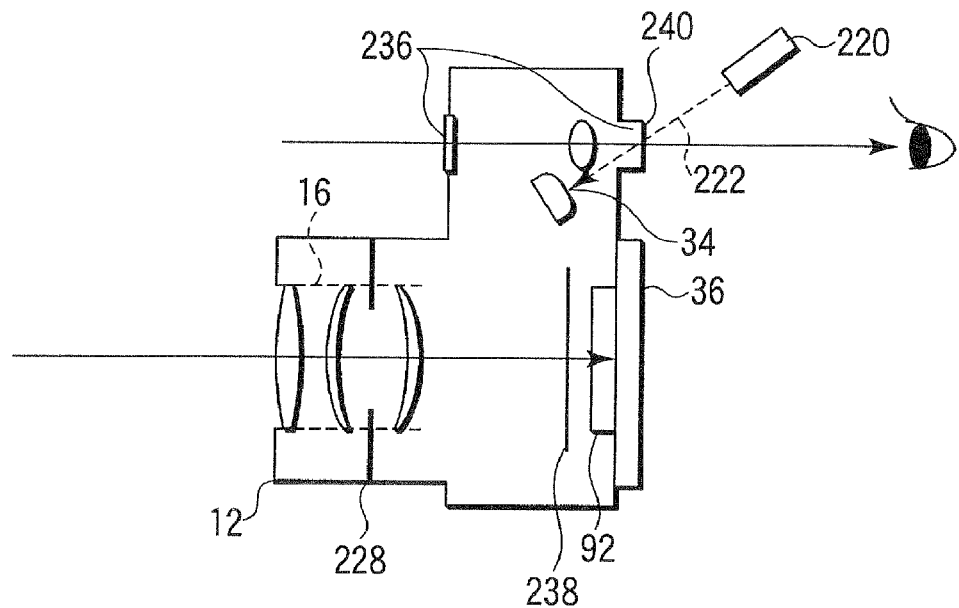
FIG. 52 is a diagram showing the layout of the photodetector element of the image acquisition device of the lens shutter type for receiving the authentication command light according to the ninth embodiment.

In the case of the image acquisition device of the lens shutter type, as shown in FIG. 52, at least one photodetector element 34 for receiving the authentication command light 222 is arranged in the finder 236. At the time of transmitting or receiving the authentication command light 222 for switching the authentication mode, for example, the authentication command light 222 of the remote controller 220 is transmitted inward of the camera proper 12 from the viewing window 240 of the finder 236. The configuration of other than the route to receive the authentication command light 222 is similar to that of the image acquisition device according to the eighth embodiment shown in FIG. 50.

This configuration in which the authentication command light 222 is received by the photodetector element 34 in the finder 236 makes it possible to limit the angle and the range for receiving the authentication command light 222 while at the same time reducing the effect of other interference light. Also, the operator can perform the operation of transmitting/receiving the authentication command such as the authentication mode switching command, which is not as normal as image acquisition or reproduction, with a clear intention to carry out an important act. Therefore, the operation of receiving the authentication command light and switching the authentication mode can be performed more safely and positively.

Incidentally, a further photodetector element may be arranged on the front surface or the rear surface 12B of the camera proper 12 so that the authentication command other than the authentication mode switching command can be received during the normal operation.

[Tenth Embodiment]

Next a tenth embodiment of the invention will be explained.

The photodetector element 34 for receiving the authentication command light 222 can be arranged also at various places in the image acquisition device other than the places described above in the seventh to ninth embodiments.

Figure 53:
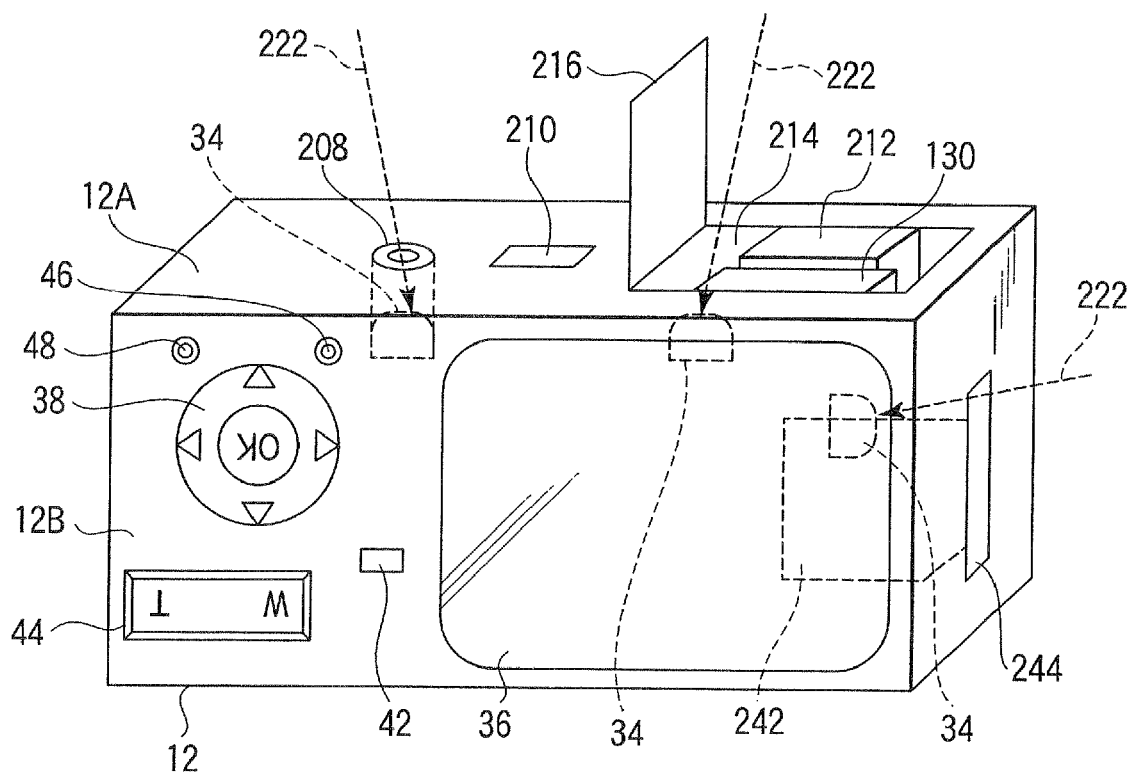
FIG. 53 is a diagram showing the layout of the photodetector element of the image acquisition device for receiving the authentication command light in an image acquisition system according to a tenth embodiment of the invention.

As shown in FIG. 53, for example, the photodetector element 34 for receiving the authentication command light 222 can be arranged within the depth of the tripod screw hole 208. In this case, the authentication command light 222 from the remote controller 220 is received through the tripod screw hole 208 while the image acquisition device is not mounted on the tripod.

Also, the photodetector element 34 for receiving the authentication command light 222 can be arranged in the slot 214 or the hole portion, having the lid 216 or the cover, for the memory card 212, the hard disk, the battery 130 or the connector. In this case, the authentication command light 222 from the remote controller 220 is received by the photodetector element 34 with the lid 216 open to such a degree as to be capable of receiving the authentication command light 222.

Further, the photodetector element 34 can be arranged in the slot 244 of the connector or the memory card 242 on the side surface of the image acquisition device. In this case, the authentication command light 222 from the remote controller 220 reaches the photodetector element 34 from the opening of the slot 244.

Other points than described above are similar to the cases involving the corresponding portions in the first embodiment or the case described with reference to FIG. 46. The photodetector element(s) 34 is sufficiently arranged as in any one of the three cases described above.

In this way, by arranging the photodetector element 34 of the authentication command light 222 in the tripod screw hole 208 or the slots 214, 244 of the image acquisition device, the angle and range for receiving the authentication command light 222 can be limited while at the same time reducing the effect of other interference light. Also, the operator can perform the operation of transmitting/receiving the authentication command such as the authentication mode switching command, which is not as normal as image acquisition or reproduction, with a clear intention to carry out an important act. Therefore, the operation of receiving the authentication command light and switching the authentication mode can be performed more safely and positively.

Incidentally, a further photodetector element may be arranged on the front surface or the rear surface 12E of the camera proper 12 so that the authentication command other than the authentication mode switching command can be received during the normal operation.

[Eleventh Embodiment]

Next, an eleventh embodiment of the invention will be explained.

Figure 54:
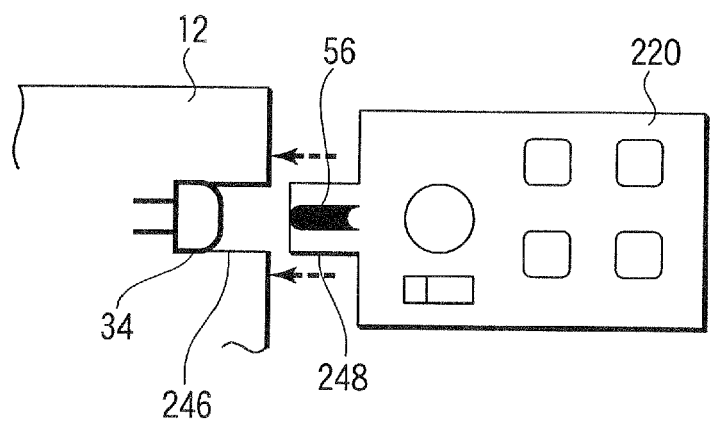
FIG. 54 is a diagram showing the form in which the image acquisition device and the commanding device are fitted with each other in an image acquisition system according to an eleventh embodiment of the invention.

According to this embodiment, as shown in FIG. 54, a depression (fitting portion 246) to receive the authentication command light 222 is formed on the light-receiving unit of the photodetector element 34 of the camera proper 12 constituting the image acquisition device. Also, a protrusion (fitting portion 248) corresponding to the depression of the camera proper 12 is formed on the light-emitting unit 56 of the remote controller 220 constituting the commanding device. The fitting portion 246 formed as the depression of the camera proper 12 has substantially the same shape and size as the fitting portion 248 formed as the protrusion of the remote controller 220, and by closely attaching them to each other in the direction along the dashed arrow shown in FIG. 54 at the time of receiving the authentication command light 222, wiretapping due to the leakage of the command information can be prevented on the one hand and the effect of the interference light can be minimized on the other hand.

The same function as the structure with the camera proper 12 and the remote controller 220 closely attached to each other can be realized also by forming a convex side of the camera proper 12 and a concave side of the remote controller 220, forming flat adhesive surfaces on both sides or forming a surrounding light shield member.

The fitting portions 246, 248 may be in any one of the shapes including the parallelepiped, solid cylinder, prism and the cone.

By forming the closely attached structure between the light emitting unit 56 for transmitting the command light of the remote controller 220 and the photodetector element 34 of the camera proper 12 for receiving the authentication command light 222 as described above, the receivable authentication command light can be limited to the command light of the remote controller while at the same time reducing the effect of other interference light. Also, the operator can perform the operation of transmitting/receiving the authentication command such as the authentication mode switching command, which is not as normal as image acquisition or reproduction, with a clear intention to carry out an important act. Therefore, the operation of receiving the authentication command light and switching the authentication mode can be performed more safely and positively.

Incidentally, a further photodetector element may of course be arranged on the front surface or the rear surface 12B of the camera proper 12 so that the authentication command other than the authentication mode switching command can be received during the normal operation.

[Twelfth Embodiment]

Next, a twelfth embodiment of the invention will be explained.

Figure 55:
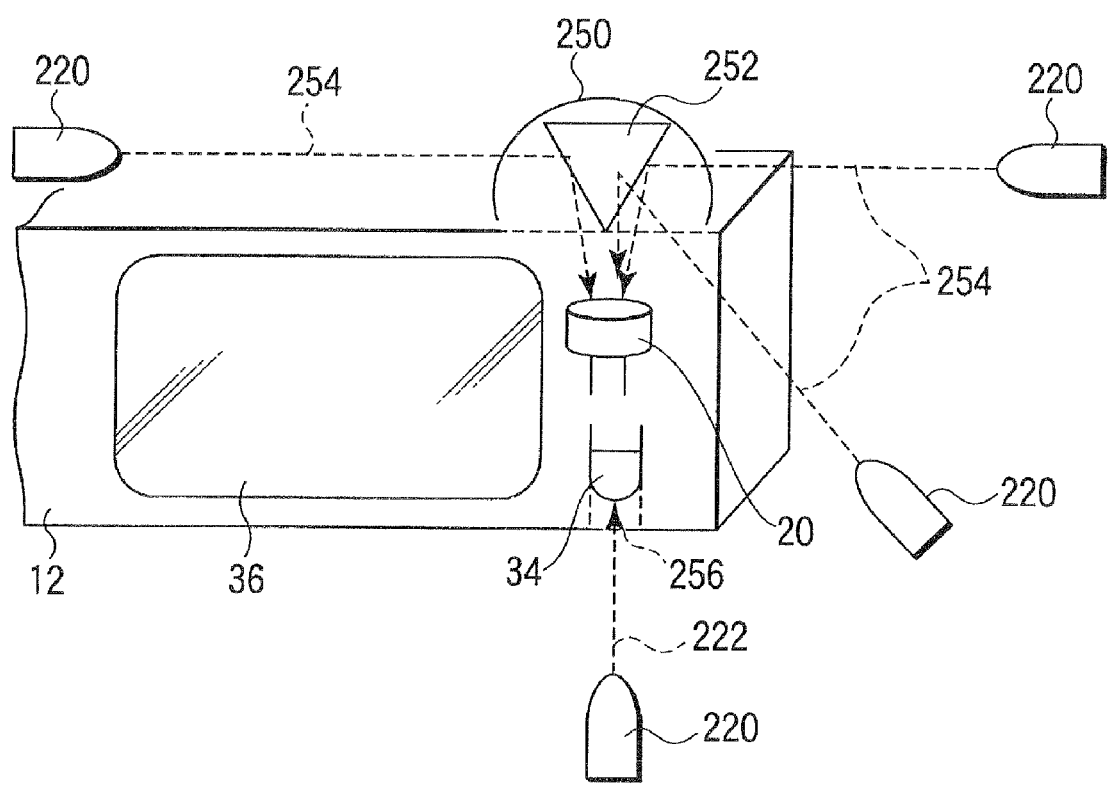
FIG. 55 is a diagram showing the layout of the photodetector elements of the image acquisition device for receiving the general command light and the authentication command light, respectively, in an image acquisition system according to a twelfth embodiment of the invention.

The image acquisition device according to this embodiment is so configured that as shown in FIG. 55, a translucent cover 250 and an inverted cone-shaped reflector 252 are arranged on the upper surface of the camera proper 12 to lead the general command light 254 of the remote controller 220 to the photodetector element 20 from a multiplicity of directions. The translucent cover 250 may have the function of the optical filter. Also, in order that the reflection surface of the reflector 252 may have the focusing function, the translucent cover 250 may be spherical or aspherical.

Also, in another part of the camera proper 12, the photodetector element 34 for receiving the authentication command light 222 from the remote controller 220 is arranged in a hole 256. Incidentally, the photodetector element 34 for receiving the authentication command light 222 may be configured in any of a variety of the ways shown in FIGS. 46 to 54.

As described above, the general command light 254 can be conveniently received over a wide range for the operation by the picture-taking person. The authentication command light for switching the authentication mode, etc., on the other hand, is received in a more limited form, with the result that the convenience for image acquisition and play operations is secured while at the same time maintaining the safety of transmission/reception of the authentication command such as the authentication mode switching command.

Incidentally, a photodetector element to receive the authentication command other than the authentication mode switching command during the normal operation may of course be arranged in addition to the photodetector element 20 for receiving the general command light 254 to make it possible to receive the authentication command light 222 from a multiplicity of directions through the translucent cover 250 and the inverted cone-shaped reflector 252.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image acquisition system comprising an image acquisition device having an image acquisition unit and a commanding device configured as a member separate from the image acquisition device to transmit a command for controlling the image acquisition device to the image acquisition device so that the image acquisition device can perform an operation corresponding to the command, the image acquisition device including:

an authentication command receiving unit configured to receive an authentication command which is transmitted from the commanding device and contains authentication information used by the image acquisition device to authenticate the commanding device;

a general command receiving unit, arranged separately from the authentication command receiving unit, configured to receive a general command which is transmitted from the commanding device and does not contain the authentication information;

an authentication command recognition unit configured to recognize the authentication command received by the authentication command receiving unit; and a function limiting unit configured to limit a function of the image acquisition device based on the authentication command recognized by the authentication command recognition unit;

wherein the commanding device includes an authentication command transmission unit configured to transmit one of an image acquisition command for the image acquisition operation of the image acquisition device and an authentication mode switching command for limiting the function of the image acquisition device, as the authentication command;

wherein the authentication command recognition unit of the image acquisition device further includes a command identification unit configured to identify contents of the authentication command received by the authentication command receiving unit; and wherein the image acquisition device further includes a mode setting unit configured to set the authentication mode of the image acquisition device in response to the authentication mode switching command identified by the command identification unit, and the function limiting unit of the image acquisition device limits the function of the image acquisition device in accordance with the authentication mode set by the mode setting unit.

2. The image acquisition system according to claim 1, wherein the image acquisition device further includes an image reproduction unit configured to reproduce the image acquired by the image acquisition unit, and the function limiting unit of the image acquisition device limits a function of the image reproduction unit.

3. The image acquisition system according to claim 1, wherein an authentication command sensor configured to receive the authentication command in the authentication command receiving unit is arranged separately from a general command sensor configured to receive the general command in the general command receiving unit.

4. The image acquisition system according to claim 3, wherein the authentication command sensor in the authentication command receiving unit and the general command sensor in the general command receiving unit are arranged at different positions from each other on the image acquisition device.

5. The image acquisition system according to claim 3, wherein one decoder is shared by an authentication command decoder unit configured to decode the authentication command received by the authentication command sensor in the authentication command receiving unit and a general command decoder unit configured to decode the general command received by the general command sensor in the general command receiving unit.

6. The image acquisition system according to claim 5, wherein the authentication command sensor in the authentication command receiving unit and the general command sensor in the general command receiving unit are arranged at different positions from each other on the image acquisition device.

7. The image acquisition system according to claim 1, wherein an authentication command decoder unit configured to decode the authentication command in the authentication command receiving unit is arranged separately from a general command decoder unit configured to decode the general command in the general command receiving unit.

8. The image acquisition system according to claim 7, wherein a single sensor is shared by an authentication command sensor configured to receive the authentication command in the authentication command receiving unit and a general command sensor configured to receive the general command in the general command receiving unit.

9. The image acquisition system according to claim 1, wherein an authentication command sensor configured to receive the authentication command and an authentication command decoder unit configured to decode the authentication command received by the authentication command sensor in the authentication command receiving unit are arranged separately from a general command sensor configured to receive the general command and a general command decoder unit configured to decode the general command received by the general command sensor in the general command receiving unit.

10. The image acquisition system according to claim 9, wherein the authentication command sensor in the authentication command receiving unit and the general command sensor in the general command receiving unit are arranged at different positions from each other on the image acquisition device.

11. The image acquisition system according to claim 1, wherein a method of transmitting the general command from the commanding device to the image acquisition device is different from a method of transmitting the authentication command from the commanding device to the image acquisition device.

12. The image acquisition system according to claim 11, wherein the general command is transmitted using one of light and a radio signal of a predetermined wavelength, and the authentication command is transmitted using the other of light and a radio signal of a predetermined wavelength.

13. The image acquisition system according to claim 11, wherein the general command is transmitted using light of a first wavelength, and the authentication command is transmitted using light of a second wavelength different from the first wavelength.

14. The image acquisition system according to claim 11, wherein the general command is transmitted using a radio signal of a first wavelength, and the authentication command is transmitted using a radio signal of a second wavelength different from the first wavelength.

15. The image acquisition system according to claim 1, wherein an authentication command sensor configured to receive the authentication command in the authentication command receiving unit and a general command sensor configured to receive the general command in the general command receiving unit are arranged at different positions from each other on the image acquisition device.

16. The image acquisition system according to claim 15, wherein the authentication command sensor is arranged on a bottom surface of the image acquisition device.

17. The image acquisition system according to claim 15, wherein the general command sensor is arranged on a lens surface side of the image acquisition device, and the authentication command sensor is arranged on the opposite side of the image acquisition device far from the lens surface side.

18. The image acquisition system according to claim 15, wherein the authentication command sensor is arranged inside of the surface of the image acquisition device.

19. The image acquisition system according to claim 18, wherein the authentication command sensor is arranged at a position where the authentication command can be received through the lens arranged on the image acquisition device.

20. The image acquisition system according to claim 18, wherein the authentication command sensor is arranged within a finder arranged on the image acquisition device.

21. The image acquisition system according to claim 18, wherein the authentication command sensor is arranged inside of an openable lid arranged on the image acquisition device.

22. The image acquisition system according to claim 18, wherein the authentication command sensor is arranged on a portion, arranged on the image acquisition device, configured to insert and remove a recording medium which records image information acquired by the image acquisition unit.

23. The image acquisition system according to claim 18, wherein the authentication command sensor is arranged in an accommodation unit, arranged on the image acquisition device, configured to accommodate a battery.

24. The image acquisition system according to claim 18, wherein the authentication command sensor is arranged in a tripod screw hole arranged on the image acquisition device.

25. The image acquisition system according to claim 15, wherein a receiving opening, arranged on the image acquisition device, configured to receive the authentication command is configured in a way adapted to be closely attached to a transmission opening, arranged on the commanding device, configured to transmit the authentication command.

26. The image acquisition system according to claim 15, wherein an angle at which the authentication command sensor is arranged to receive, the authentication command is smaller than an angle at which the general command sensor is arranged to receive the general command.

27. The image acquisition system according to claim 1, wherein the commanding device further includes a switching unit configured to switch the image acquisition command and the authentication mode switching command to be transmitted by the authentication command transmission unit.

28. An authentication method for an image acquisition device, wherein authentication is carried out between the image acquisition device having an image acquisition unit and a commanding device configured as a member separate from the image acquisition device to transmit a command to the image acquisition device to control the image acquisition device in such a manner that the image acquisition device can perform an operation corresponding to the command, the method comprising, in the image acquisition device:

- receiving an authentication command, which is transmitted from the commanding device and contains authentication information used by the image acquisition device to authenticate the commanding device, by an authentication command receiving unit configured to receive the authentication command, the authentication command receiving unit being separate from a general command receiving unit configured to receive a general command which is transmitted from the commanding device and does not contain the authentication information;
- recognizing the received authentication command; and
- limiting a function of the image acquisition device based on the recognized authentication command;
- wherein the commanding device includes an authentication command transmission unit configured to transmit one of an image acquisition command for an image acquisition operation of the image acquisition device and an authentication mode switching command for limiting the function of the image acquisition device, as the authentication command;
- wherein recognizing the received authentication command in the image acquisition device comprises identifying contents of the received authentication command; and
- wherein the method further comprises, in the image acquisition device, setting an authentication mode of the image acquisition device in response to the authentication mode switching command, wherein the function of the image acquisition device is limited in accordance with the set authentication mode.

* * * * *